US011563498B2

(12) United States Patent
Hand

(10) Patent No.: US 11,563,498 B2
(45) Date of Patent: *Jan. 24, 2023

(54) OPTICAL SUBCARRIER DUAL-PATH PROTECTION AND RESTORATION FOR OPTICAL COMMUNICATIONS NETWORKS

(71) Applicant: Infinera Corporation, Sunnyvale, CA (US)

(72) Inventor: Steven Joseph Hand, Sunnyvale, CA (US)

(73) Assignee: Infinera Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/077,811

(22) Filed: Oct. 22, 2020

(65) Prior Publication Data

US 2021/0111805 A1 Apr. 15, 2021

Related U.S. Application Data

(63) Continuation of application No. PCT/US2020/055107, filed on Oct. 9, 2020.

(60) Provisional application No. 62/913,253, filed on Oct. 10, 2019.

(51) Int. Cl.
*H04B 10/032* (2013.01)
*H04B 10/548* (2013.01)
*H04B 10/61* (2013.01)
*H04B 10/50* (2013.01)
(Continued)

(52) U.S. Cl.
CPC ......... *H04B 10/548* (2013.01); *H04B 10/032* (2013.01); *H04B 10/505* (2013.01);
(Continued)

(58) Field of Classification Search
None
See application file for complete search history.

(56) References Cited

U.S. PATENT DOCUMENTS

| 4,483,000 A | 11/1984 | Yamamoto et al. |
| 4,528,565 A | 7/1985 | Hauptmann |

(Continued)

FOREIGN PATENT DOCUMENTS

| EP | 0512642 | 11/1992 |
| EP | 3208957 | 8/2017 |

(Continued)

OTHER PUBLICATIONS

Wikipedia, Reconfigurable optical add-drop multiplexer, 2013 (Year: 2013).*

(Continued)

*Primary Examiner* — Jai M Lee
(74) *Attorney, Agent, or Firm* — David L. Soltz

(57) ABSTRACT

An example system includes a first network device having first circuitry. The first network device is configured to perform operations including receiving data to be transmitted to a second network device over an optical communications network, and transmitting first information and second information to the second device. The first information is indicative of the data, and is transmitted using a first communications link of the optical communications network and using a first subset of optical subcarriers. The second information is indicative of the data, and is transmitted using a second communications link of the optical communications network and using a second subset of optical subcarriers. The first subset of optical subcarriers is different from the second subset of optical subcarriers.

16 Claims, 27 Drawing Sheets

(51) Int. Cl.
*H04B 10/54* (2013.01)
*H04J 14/02* (2006.01)
(52) U.S. Cl.
CPC ......... *H04B 10/506* (2013.01); *H04B 10/541* (2013.01); *H04B 10/61* (2013.01); *H04J 14/0212* (2013.01); *H04J 14/0227* (2013.01); *H04J 14/0283* (2013.01); *H04J 14/0284* (2013.01); *H04J 14/0287* (2013.01); *H04J 14/0298* (2013.01)

(56) References Cited

U.S. PATENT DOCUMENTS

| | | | |
|---|---|---|---|
| 5,153,762 A | 10/1992 | Huber | |
| 5,208,692 A | 5/1993 | McMahon | |
| 5,491,576 A * | 2/1996 | Bergano | H04B 10/2572 |
| | | | 398/185 |
| 5,596,436 A | 1/1997 | Sargis | |
| 5,822,094 A | 10/1998 | O'Sullivan | |
| 5,825,857 A | 10/1998 | Reto | |
| 6,046,838 A | 4/2000 | Kou | |
| 6,362,913 B2 | 3/2002 | Ooi et al. | |
| 6,525,857 B1 | 2/2003 | Way | |
| 6,563,880 B1 | 5/2003 | Hunsinger et al. | |
| 6,580,544 B1 | 6/2003 | Lin et al. | |
| 6,687,044 B2 | 2/2004 | Paquet | |
| 7,266,306 B1 | 9/2007 | Harley et al. | |
| 7,466,919 B1 | 2/2008 | Birk et al. | |
| 7,346,284 B2 | 3/2008 | Wan | |
| 7,376,358 B2 | 5/2008 | Roberts et al. | |
| 7,447,436 B2 | 11/2008 | Yee | |
| 7,499,647 B2 * | 3/2009 | Way | H04L 12/42 |
| | | | 398/59 |
| 7,701,842 B2 | 4/2010 | Roberts et al. | |
| 7,715,710 B2 | 5/2010 | Wan | |
| 7,729,621 B2 | 6/2010 | Nahapetian et al. | |
| 7,756,421 B2 | 7/2010 | Roberts | |
| 7,826,752 B1 | 11/2010 | Zanoni | |
| 8,184,992 B2 | 5/2012 | Kikuchi | |
| 8,203,777 B2 | 6/2012 | Smith et al. | |
| 8,412,047 B2 | 4/2013 | Tanaka | |
| 8,437,645 B2 | 5/2013 | Boffi et al. | |
| 8,472,810 B2 | 6/2013 | Akiyama | |
| 8,477,056 B2 | 7/2013 | Sun et al. | |
| 8,477,656 B2 | 7/2013 | O'Mahony | |
| 8,478,137 B2 | 7/2013 | Komaki et al. | |
| 8,655,190 B2 | 2/2014 | Wu et al. | |
| 8,682,180 B1 | 3/2014 | Nimon et al. | |
| 8,730,079 B2 | 5/2014 | Tudose | |
| 8,768,177 B2 | 7/2014 | Wu et al. | |
| 8,861,977 B2 | 10/2014 | McNicol | |
| 8,929,750 B2 | 1/2015 | Ishihara | |
| 8,965,203 B1 | 2/2015 | Vahdat | |
| 8,971,723 B2 | 3/2015 | Le Taillandier De Gabory | |
| 8,989,593 B2 | 3/2015 | Sun et al. | |
| 9,020,363 B2 | 4/2015 | Yasuda | |
| 9,048,957 B2 | 6/2015 | Nakashima | |
| 9,112,609 B2 | 8/2015 | Kim et al. | |
| 9,154,231 B2 | 10/2015 | Kaneda | |
| 9,166,692 B1 | 10/2015 | Felderman | |
| 9,197,320 B2 | 11/2015 | Vassilieva | |
| 9,244,928 B1 | 1/2016 | Nishimoto | |
| 9,270,379 B2 | 2/2016 | Huang et al. | |
| 9,281,915 B2 | 3/2016 | Kaneda | |
| 9,363,585 B2 | 6/2016 | Carpini | |
| 9,419,720 B2 | 8/2016 | Akiyama | |
| 9,461,749 B2 | 10/2016 | Jansen et al. | |
| 9,485,554 B1 | 11/2016 | Kim | |
| 9,553,675 B2 | 1/2017 | Karar et al. | |
| 9,608,866 B2 | 3/2017 | Nagarajan | |
| 9,673,907 B1 | 6/2017 | Vassilieva | |
| 9,686,020 B2 | 6/2017 | Mochizuki et al. | |
| 9,705,592 B1 | 7/2017 | Schmogrow | |
| 9,723,385 B2 * | 8/2017 | Hu | H04J 14/021 |
| 9,735,881 B1 | 8/2017 | Agazzi et al. | |
| 9,991,953 B1 | 6/2018 | Fludger | |
| 10,014,975 B2 | 7/2018 | Krause et al. | |
| 10,027,424 B2 | 7/2018 | Zhuge et al. | |
| 10,243,653 B2 | 3/2019 | Wiswell | |
| 10,243,688 B2 | 3/2019 | Vassilieva | |
| 10,348,410 B1 | 7/2019 | Charlton | |
| 10,374,623 B1 | 8/2019 | Oveis Gharan | |
| 10,374,721 B2 | 8/2019 | Awdalla | |
| 10,389,447 B1 | 8/2019 | Khandani | |
| 10,397,190 B2 | 8/2019 | Akhavain Mohammadi | |
| 10,491,302 B1 | 11/2019 | Morris | |
| 10,523,315 B2 | 12/2019 | Jiang | |
| 10,547,388 B2 | 1/2020 | Ikeda | |
| 10,574,362 B2 | 2/2020 | Chen | |
| 10,587,358 B1 | 3/2020 | Ebrahimzad | |
| 2002/0003641 A1 | 1/2002 | Hall | |
| 2002/0005971 A1 | 1/2002 | Sasai | |
| 2002/0034194 A1 | 3/2002 | Shattil | |
| 2002/0067883 A1 | 6/2002 | Lo | |
| 2002/0114038 A1 | 8/2002 | Arnon | |
| 2002/0122518 A1 | 9/2002 | Yasuda et al. | |
| 2002/0145783 A1 | 10/2002 | Chang | |
| 2003/0020995 A1 | 1/2003 | Harasawa | |
| 2003/0223751 A1 | 12/2003 | Shimizu | |
| 2004/0016874 A1 | 1/2004 | Rao | |
| 2004/0019459 A1 | 1/2004 | Dietz | |
| 2004/0032643 A1 | 2/2004 | Chimfwembe | |
| 2004/0033074 A1 | 2/2004 | Hsu | |
| 2004/0105682 A1 | 6/2004 | Roberts | |
| 2004/0151109 A1 | 8/2004 | Batra | |
| 2004/0197103 A1 | 10/2004 | Roberts | |
| 2004/0198265 A1 | 10/2004 | Wallace | |
| 2004/0208614 A1 | 10/2004 | Price | |
| 2004/0252996 A1 | 12/2004 | McNicol | |
| 2005/0008085 A1 | 1/2005 | Lee | |
| 2005/0074037 A1 | 4/2005 | Rickard | |
| 2005/0111789 A1 | 5/2005 | Hayes | |
| 2005/0147415 A1 | 7/2005 | Fee | |
| 2005/0169585 A1 | 8/2005 | Aronson | |
| 2005/0175112 A1 | 8/2005 | Pisani | |
| 2005/0175339 A1 | 8/2005 | Herskowits | |
| 2006/0078336 A1 | 4/2006 | McNicol et al. | |
| 2006/0093052 A1 | 5/2006 | Cho | |
| 2006/0159454 A1 | 7/2006 | Bjornstad | |
| 2006/0215540 A1 | 9/2006 | Krishnamoorthi | |
| 2006/0233147 A1 | 10/2006 | Karabinis | |
| 2006/0269295 A1 | 11/2006 | Way | |
| 2006/0280510 A1 | 12/2006 | Onaka | |
| 2007/0004465 A1 | 1/2007 | Papasakellariou | |
| 2007/0025421 A1 | 2/2007 | Shattil | |
| 2007/0092263 A1 | 4/2007 | Agazzi | |
| 2008/0063409 A1 | 3/2008 | Toliver | |
| 2008/0085125 A1 | 4/2008 | Frankel | |
| 2008/0232816 A1 | 9/2008 | Hoshida | |
| 2008/0267630 A1 | 10/2008 | Qian | |
| 2009/0110033 A1 | 4/2009 | Shattil | |
| 2009/0154336 A1 | 6/2009 | Green | |
| 2009/0190929 A1 | 7/2009 | Khurgin | |
| 2009/0196603 A1 | 8/2009 | Zhou | |
| 2009/0214224 A1 | 8/2009 | Cho | |
| 2009/0232234 A1 | 9/2009 | Du | |
| 2009/0238578 A1 | 9/2009 | Taylor | |
| 2009/0238580 A1 | 9/2009 | Kikuchi | |
| 2009/0257344 A1 | 10/2009 | Huang | |
| 2009/0257755 A1 | 10/2009 | Buelow | |
| 2009/0092389 A1 | 11/2009 | Wei | |
| 2010/0021163 A1 | 1/2010 | Shieh | |
| 2010/0021166 A1 | 1/2010 | Way | |
| 2010/0028002 A1 | 2/2010 | Qian | |
| 2010/0086303 A1 | 4/2010 | Qian | |
| 2010/0142964 A1 | 6/2010 | Chang et al. | |
| 2010/0142967 A1 | 6/2010 | Perez | |
| 2010/0178057 A1 | 7/2010 | Shieh | |
| 2010/0189445 A1 | 7/2010 | Nakashima | |
| 2010/0215368 A1 | 8/2010 | Qian | |
| 2010/0246581 A1 | 9/2010 | Henry | |
| 2010/0254707 A1 | 10/2010 | Peng | |
| 2010/0329671 A1 | 12/2010 | Essiambre | |
| 2010/0329683 A1 | 12/2010 | Liu | |

(56) References Cited

U.S. PATENT DOCUMENTS

| | | |
|---|---|---|
| 2011/0097092 A1 | 4/2011 | Wagner et al. |
| 2011/0135301 A1 | 6/2011 | Myslinski |
| 2011/0142450 A1 | 6/2011 | Tanzi et al. |
| 2011/0150475 A1 | 6/2011 | Soto et al. |
| 2011/0176813 A1 | 7/2011 | Kim |
| 2011/0182577 A1 | 7/2011 | Wu |
| 2011/0249978 A1 | 10/2011 | Sasaki |
| 2011/0255870 A1 | 10/2011 | Grigoryan |
| 2012/0002703 A1 | 1/2012 | Yamashita |
| 2012/0033965 A1 | 2/2012 | Zhang |
| 2012/0045209 A1 | 2/2012 | Boyd |
| 2012/0082466 A1 | 4/2012 | Wu |
| 2012/0093510 A1 | 4/2012 | Zhang |
| 2012/0099864 A1 | 4/2012 | Ishihara |
| 2012/0141130 A1 | 6/2012 | Nakashima |
| 2012/0141135 A1 | 6/2012 | Yang |
| 2012/0148264 A1 | 6/2012 | Liu |
| 2012/0219285 A1 | 8/2012 | Dahan |
| 2012/0224851 A1* | 9/2012 | Takara ............... H04J 14/0221 398/45 |
| 2012/0251119 A1 | 10/2012 | McNicol |
| 2012/0251121 A1* | 10/2012 | McNicol ............... H04J 14/06 398/91 |
| 2012/0263471 A1 | 10/2012 | Buchali |
| 2012/0269510 A1 | 10/2012 | Hui |
| 2012/0269515 A1 | 10/2012 | Cvijetic |
| 2013/0070785 A1 | 3/2013 | Liu |
| 2013/0070786 A1 | 3/2013 | Liu |
| 2013/0101296 A1 | 4/2013 | Nishimoto |
| 2013/0108271 A1 | 5/2013 | Tang et al. |
| 2013/0136449 A1 | 5/2013 | Liu |
| 2013/0170834 A1 | 7/2013 | Cho et al. |
| 2013/0191877 A1 | 7/2013 | Rakib |
| 2013/0195452 A1 | 8/2013 | Hui |
| 2013/0202303 A1 | 8/2013 | Wilkinson |
| 2013/0251364 A1 | 9/2013 | Pachnicke |
| 2013/0286847 A1 | 10/2013 | Schmidt |
| 2014/0010543 A1 | 1/2014 | Lee |
| 2014/0056371 A1 | 2/2014 | Ji |
| 2014/0072303 A1 | 3/2014 | Pfau |
| 2014/0079390 A1 | 3/2014 | Kim |
| 2014/0079391 A1 | 3/2014 | Kim |
| 2014/0092924 A1 | 4/2014 | Krause et al. |
| 2014/0099116 A1 | 4/2014 | Bai |
| 2014/0126916 A1 | 5/2014 | Ota |
| 2014/0153925 A1 | 6/2014 | Nishihara et al. |
| 2014/0205286 A1* | 7/2014 | Ji ....................... H04J 14/0298 398/45 |
| 2014/0233963 A1 | 8/2014 | Le Taillandier De Gabory |
| 2014/0241727 A1 | 8/2014 | Lim et al. |
| 2014/0270759 A1 | 9/2014 | Djordjevic |
| 2014/0270761 A1 | 9/2014 | Xu |
| 2014/0270803 A1 | 9/2014 | Olsson |
| 2014/0294381 A1 | 10/2014 | McNicol |
| 2014/0314411 A1 | 10/2014 | Huang |
| 2014/0314416 A1 | 10/2014 | Vassilieva |
| 2014/0341587 A1 | 11/2014 | Nakashima |
| 2014/0363164 A1 | 12/2014 | Kim |
| 2014/0376930 A1 | 12/2014 | Shiba |
| 2015/0063808 A1 | 3/2015 | Xia |
| 2015/0071642 A1 | 3/2015 | Tanaka |
| 2015/0093118 A1* | 4/2015 | Jia ..................... H04J 14/06 398/140 |
| 2015/0098700 A1 | 4/2015 | Zhu |
| 2015/0117860 A1 | 4/2015 | Braun |
| 2015/0125141 A1* | 5/2015 | Hu ...................... H04J 14/0295 398/5 |
| 2015/0125160 A1 | 5/2015 | Wen |
| 2015/0188276 A1* | 7/2015 | Mitchell ............. H04J 14/0201 359/337.21 |
| 2015/0188637 A1 | 7/2015 | Tanimura |
| 2015/0188642 A1 | 7/2015 | Sun |
| 2015/0229332 A1 | 8/2015 | Yuan |
| 2015/0229401 A1 | 8/2015 | Tanaka |
| 2015/0280853 A1 | 10/2015 | Sun |
| 2015/0288456 A1 | 10/2015 | Zhu |
| 2015/0289035 A1 | 10/2015 | Mehrvar |
| 2015/0296278 A1 | 10/2015 | Liu |
| 2015/0333860 A1 | 11/2015 | Rahn |
| 2016/0013881 A1 | 1/2016 | Rejaly et al. |
| 2016/0029403 A1 | 1/2016 | Roy et al. |
| 2016/0050021 A1 | 2/2016 | Hua |
| 2016/0057516 A1 | 2/2016 | Hochberg |
| 2016/0094292 A1 | 3/2016 | Mochizuki |
| 2016/0099777 A1 | 4/2016 | Liu |
| 2016/0112141 A1 | 4/2016 | Rahn |
| 2016/0142150 A1 | 5/2016 | Lyubomirsky |
| 2016/0191168 A1 | 6/2016 | Huang |
| 2016/0192042 A1 | 6/2016 | Mitchell |
| 2016/0197681 A1 | 7/2016 | Sun |
| 2016/0218812 A1 | 7/2016 | Okabe |
| 2016/0233963 A1 | 8/2016 | Zhuge et al. |
| 2016/0261347 A1 | 9/2016 | Karar |
| 2016/0277816 A1 | 9/2016 | Yuang |
| 2016/0316281 A1 | 10/2016 | Keyworth |
| 2016/0323039 A1 | 11/2016 | Sun et al. |
| 2017/0005747 A1 | 1/2017 | Kim |
| 2017/0019168 A1 | 1/2017 | Menard |
| 2017/0033864 A1 | 2/2017 | Nagarajan |
| 2017/0033999 A1 | 2/2017 | Nagarajan |
| 2017/0041691 A1 | 2/2017 | Rickman |
| 2017/0054513 A1 | 2/2017 | Guo |
| 2017/0070313 A1* | 3/2017 | Kato ................... H04J 14/0298 |
| 2017/0078028 A1 | 3/2017 | Zhang |
| 2017/0078044 A1 | 3/2017 | Hino |
| 2017/0104535 A1 | 4/2017 | Hoshida |
| 2017/0134836 A1 | 5/2017 | Sindhy |
| 2017/0149507 A1 | 5/2017 | Le Taillandier De Gabory |
| 2017/0163347 A1 | 6/2017 | Akiyama |
| 2017/0222716 A1 | 8/2017 | Nakashima |
| 2017/0237500 A1 | 8/2017 | Nishimoto |
| 2017/0250775 A1 | 8/2017 | Kato |
| 2017/0250780 A1* | 8/2017 | Ge ......................... H04L 5/006 |
| 2017/0324480 A1 | 11/2017 | Elmirghani |
| 2017/0366267 A1 | 12/2017 | Campos |
| 2017/0367061 A1 | 12/2017 | Kim |
| 2018/0034555 A1 | 2/2018 | Goh |
| 2018/0115407 A1 | 4/2018 | Melikyan |
| 2018/0120520 A1 | 5/2018 | Kelly |
| 2018/0145761 A1 | 5/2018 | Zhuge |
| 2018/0198547 A1 | 7/2018 | Mehrvar |
| 2018/0219632 A1 | 8/2018 | Yoshida |
| 2018/0234285 A1 | 8/2018 | Djordjevic |
| 2018/0241476 A1 | 8/2018 | Johnson |
| 2018/0278331 A1 | 9/2018 | Cao |
| 2018/0324717 A1 | 11/2018 | Zhou |
| 2018/0359047 A1 | 12/2018 | Vassilieva |
| 2019/0020409 A1 | 1/2019 | Le Taillandier De Gabory |
| 2019/0097728 A1 | 3/2019 | Frankel |
| 2019/0123819 A1 | 4/2019 | Jiang |
| 2019/0149242 A1 | 5/2019 | Torbatian |
| 2019/0149389 A1 | 5/2019 | Torbatian |
| 2019/0181960 A1* | 6/2019 | Wu ...................... H04B 10/616 |
| 2019/0245627 A1* | 8/2019 | Rahn ................... H04J 14/0224 |
| 2019/0253153 A1* | 8/2019 | Sun ........................ H04J 14/06 |
| 2019/0260408 A1 | 8/2019 | Chimfwembe Patrick Chilufya |
| 2019/0288777 A1 | 9/2019 | Ishimura |
| 2019/0312640 A1 | 10/2019 | Binkai |
| 2019/0319713 A1* | 10/2019 | Hand ................... H04L 1/0041 |
| 2020/0076508 A1 | 3/2020 | Jia |
| 2020/0177525 A1 | 6/2020 | Morris |

FOREIGN PATENT DOCUMENTS

| | | |
|---|---|---|
| WO | WO 2012100714 | 8/2012 |
| WO | WO 2014114332 | 7/2014 |

OTHER PUBLICATIONS

J. Leuthold et al., "Super Channels Based on Nyquist Multiplexing," 2012 17th Opto-Electronics and Communications Conference (OECC 2012) Technical Digest, Jul. 2012, Busan, Kor.

(56) References Cited

OTHER PUBLICATIONS

S. Watanabe et al., "Optical Coherent Broad-Band Transmission for Long-Haul and Distribution Systems Using Subcarrier Multiplexing," Journal Of Lightwave Technology, vol. 11, No. 1, Jan. 1993, pp. 116-127.
M. Jinno et al., "Demonstration of Novel Spectrum-Efficient Elastic Optical Path Network with Per-Channel Variable Capacity of 40 Gb/s to Over 400 Gb/s," ECOC 2008, Sep. 21-25, 2008, Brussels, Belgium, Th.3.F.6.
Y. Chen et al., "Experimental Demonstration Of Roadm Functionality On An Optical Scfdm Superchannel," IEEE Photonics Technology Letters, vol. 24, No. 3, Feb. 1, 2012, pp. 215-217.
Adaptive Software Defined Terabit Transceiver For Flexible Optical Networks, Public executive summary of the Final Project Periodic Report, Jun. 16, 2016.
Hillerkus, Single-Laser Multi-Terabit/s Systems, KIT Scientific Publishing, 2013, Chapters 1, 3, and 6.
Hu et al., "Flexible and Concurrent All-Optical VPN in OFDMA PON," IEEE Photonics Technology Journal, vol. 5, No. 6, Dec. 2013.
Bosco et al., "On the Performance of Nyquist-WDM Terabit Superchannels Based on PM-BPSK, PM-QPSK, PM-8QAM or PM-16QAM Subcarriers," Journal Of Lightwave Technology, vol. 29, No. 1, Jan. 1, 2011, pp. 53-60.
K. Roberts et al., "Flexible Transceivers," ECOC Technical Digest, 2012, We.3.A.3.
K. Roberts et al., "High Capacity Transport—100G and Beyond," Journal Of Lightwave Technology, vol. 33, No. 3, Feb. 1, 2015, pp. 563-578.
J. Reis et al., "Performance Optimization Of Nyquist Signaling For Spectrally Efficient Optical Access Networks [Invited]," J. Opt. Commun. Netw./vol. 7, No. 2, Feb. 2015, pp. A200-A208.
R. Ferreira et al, Coherent Nyquist UDWDM-PON With Digital Signal Processing in Real Time, Journal Of Lightwave Technology, vol. 34, No. 2, Jan. 15, 2016, pp. 826-833.
A. Shahpari et al., "Coherent Access: A Review", Journal Of Lightwave Technology, vol. 35, No. 4, Feb. 15, 2017, pp. 1050-1058.
P. Layec et al., "Rate-Adaptable Optical Transmission And Elastic Optical Networks," Chapter 15, Enabling Technologies for High Spectral-efficiency Coherent Optical Communication Networks, First Edition, 2016 John Wiley & Sons, Inc. Published 2016, pp. 507-545.
J. Altabas, "Cost-effective Transceiver based on a RSOA and a VCSEL for Flexible uDWDM Networks," IEEE Photonics Technology Letters ( vol. 28 , Issue: 10, May15, 15 2016, pp. 1111-1114.
K. Roberts et al., "Beyond 100 GB/s: Capacity, Flexibility, and Network Optimization," J. Opt. Commun. Netw./vol. 9, No. 4/Apr. 2017, pp. C12-C24.
Lavery et al., "Digital Coherent Receivers for Long-Reach Optical Access Networks," Journal Of Lightwave Technology, vol. 31, No. 4, Feb. 15, 2013, pp. 609-620.
V. Vujicic, "Optical Multicarrier Sources for Spectrally Efficient Optical Networks," A Dissertation submitted in fulfilment of the requirements for the award of Doctor of Philosophy (Ph.D.) to the Dublin City University, Dec. 2015, Chapters 1, 2, and 6.
Straullu et al., "Single-Wavelength Downstream FDMA-PON at 32 Gbps and 34 dB ODN Loss," IEEE Photonics Technology Letters, vol. 27, No. 7, Apr. 1, 2015, pp. 774-777.
Y. Zhang et al., "Digital subcarrier multiplexing for flexible spectral allocation in optical transport network," Oct. 24, 2011 / vol. 19, No. 22 / Optics Express 21882.
R. Schmogrow et al., "Nyquist Frequency Division Multiplexing for Optical Communications," CLEO Technical Digest, OSA 2012, CTh1H.2.
P Khodashenas. "Investigation of Spectrum Granularity for Performance Optimization of Flexible Nyquist-WDM-Based Optical Networks." Journal Of Lightwave Technology, vol. 33, No. 23, Dec. 1, 2015 pp. 4767-4774.

Mishra et al., "Flexible RF-Based Comb Generator," IEEE Photonics Technology Letters, vol. 25, No. 7, Apr. 1, 2013, pp. 701-704.
M. Jinno et al., "Multiflow Optical Transponder for Efficient Multilayer Optical Networking," IEEE Communications Magazine • May 2012, pp. 56-65.
Kim Roberts, "100G and Beyond," OFC 2014, OSA 2014, Tu3J.1.
J. Fischer, "Digital signal processing for coherent UDWDM passive optical networks," ITG-Fachbericht 248: Photonische Netze May 5-6, 2014 in Leipzig, VDE Verlag GmbH Berlin Offenbach, Germany, ISBN 978-3-8007-3604-1.
Kottke et al., "Coherent UDWDM PON with joint subcarrier reception at OLT," Optics Express, Jul. 2, 2014.
Lavery et al., "Reduced Complexity Equalization for Coherent Long-Reach Passive Optical Networks," J. Opt. Commun. Netw./vol. 7, No. 1/Jan. 2015, pp. A16-A27.
Lazaro et al., "Flexible PON KeyTechnologies: Digital Advanced Modulation Formats and Devices," 2014 16th International Conference on Transparent Optical Networks (ICTON), TU.B3.2.
Optical Internetworking Forum—Technology Options for 400G Implementation OIF-Tech-Options-400G-01.0, Jul. 2015.
Riccardi et al., "Sliceable bandwidth variable transponder: the IDEALIST vision," 2015 European Conference on Networks and Communications (EuCNC), pp. 330-334.
Sambo et al., "Next Generation Sliceable Bandwidth Variable Transponders," IEEE Communications Magazine, Feb. 2015, pp. 163-171.
P. Schindler et al., "Colorless FDMA-PON With Flexible Bandwidth Allocation and Colorless, Low-Speed ONUs [Invited]," J. Opt. Commun. Netw./vol. 5, No. 10/Oct. 2013, pp. A204-A212.
Schmogrow et al., "Real-time Nyquist signaling with dynamic precision and flexible non-integer oversampling," Jan. 13, 2014 | vol. 22, No. 1 | DOI:10.1364/OE.22.000193 | Optics Express 193.
Schmogrow et al., "Real-Time Digital Nyquist-WDM and OFDM Signal Generation: Spectral Efficiency Versus DSP Complexity," ECOC Technical Digest, 2012 OSA, Mo.2.A.4.
Boutaba et al., "Elastic Optical Networking for 5G Transport," J Netw Syst Manage (2017) 25m pp. 819-847 123.
S. Smolorz et al., "Demonstration of a Coherent UDWDM-PON with Real-Time Processing," OFC/NFOEC 2011, PDPD4.
H. Rohde et al. "Coherent Ultra Dense WDM Technology for Next Generation Optical Metro and Access Networks," Journal Of Lightwave Technology, vol. 32, No. 10, May 15, 2014 pp. 2041-2052.
Ze Dong et al., "Very-High-Throughput Coherent Ultradense WDM-PON Based on Nyquist-ISB Modulation," IEEE Photonics Technology Letters, vol. 27, No. 7, Apr. 1, 2015, pp. 763-766.
Rohde et al., "Digital Multi-Wavelength Generation and Real Time Video Transmission in a Coherent Ultra Dense WDM PON," OFC/NFOEC Technical Digest, 2013 OSA, OM3H.3.
International Search Report issued in connection with PCT/US2020/023871 dated Sep. 24, 2020.
Guo-Wei Lu et al., "Optical subcarrier processing for Nyquist SCM signals via coherent spectrum overlapping in four-wave mixing with coherent multi-tone pump", Optics Express, vol. 26, No. 2, Jan. 22, 2018.
International Search Report issued in connection with PCT/US2020/018180 dated Sep. 18, 2020.
International Search Report issued in connection with PCT/US2020/036209 dated Oct. 1, 2020.
International Search Report issued in connection with PCT/US2020/018292 dated Jun. 4, 2020.
International Search Report issued in connection with PCT/US2020/021024 dated Aug. 3, 2020.
Wei et al: Mac Protocols for Optical Orthogonal Frequency Division Multiple Access (OFDMA)-based Passive Optical Networks, OFC/NFOEC 2008, paper JWA82, Feb. 24-28, 2008 (Year: 2008).
Cerisola et al., "Subcarrier multiplex of packet headers in a WDM optical network and a nouvel ultrafast header clock-recovery technique", 1995, OFC '95 Technical Digest, pp. 273-274 (Year: 1995).
Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.

(56) References Cited

OTHER PUBLICATIONS

K. Roberts, et al., "Performance of dual-polarization QPSK for optical transport system," JLT, vol. 27, No. 16, pp. 3546-3559, Aug. 2009.

S.J. Savory et al., "Digital equalisation of 40Gbit/s per wavelength transmission over 2480km of standard fibre without optical dispersion compensation, " European Conference on Optical Communications (ECOC) 2006, paper Th2.5.5.

H. Sun et al., "Real-time measurements of a 40 Gb/S coherent system," Jan. 21, 2008, vol. 16, No. 2, Optics Express, pp. 873-879.

Greshishchev et al., "A 5 6GS/s 6b DAC in 6 5nm CMOS with 256x6b Memory", ISSCC 2011/Session 1 0/Nyquist-Rate Converters/1 0.8, 2011 IEEE International Solid-State Circuits Conference, 3 pages.

Bingham, "Multicarrier Modulator for Data Transmission: An Idea Whose Time Has Come", IEEE Communications Magazine, pp. 5-14, May 1990, 8 pages.

Yan et al. "Experimental Comparison of No. Guard-lnterval-OFDM and Nyquist-WDM Superchannels", OFC/NFOEC Techincal Digest, 1/23/20212, 4 pages.

Zhuge et al., "Comparison of Intra-Channel Nonlinearity Tolerance Between Reduced-Guard-lnterval CO-OFDM Systems and Nyquist Single Carrier Systems", OFC/NFOEC Technical Digest, Jan. 23, 2012, 4 pages.

Zhang et al., "3760km, 100GSSMF Transmission over Commercial Terrestrial DWDM ROADM Systems using SD-FEC", OFC/NFOEC Postdeadline Papers, Mar. 2012, 3 pages.

Rahn et al., "250Gb/s Real-Time PIC-based Super-Channel Transmission Over a Gridless 6000km Terrestrial Link", OFC/NFOEC Posteadline Papers, Mar. 2012,3 pages.

* cited by examiner

Dual-Hub

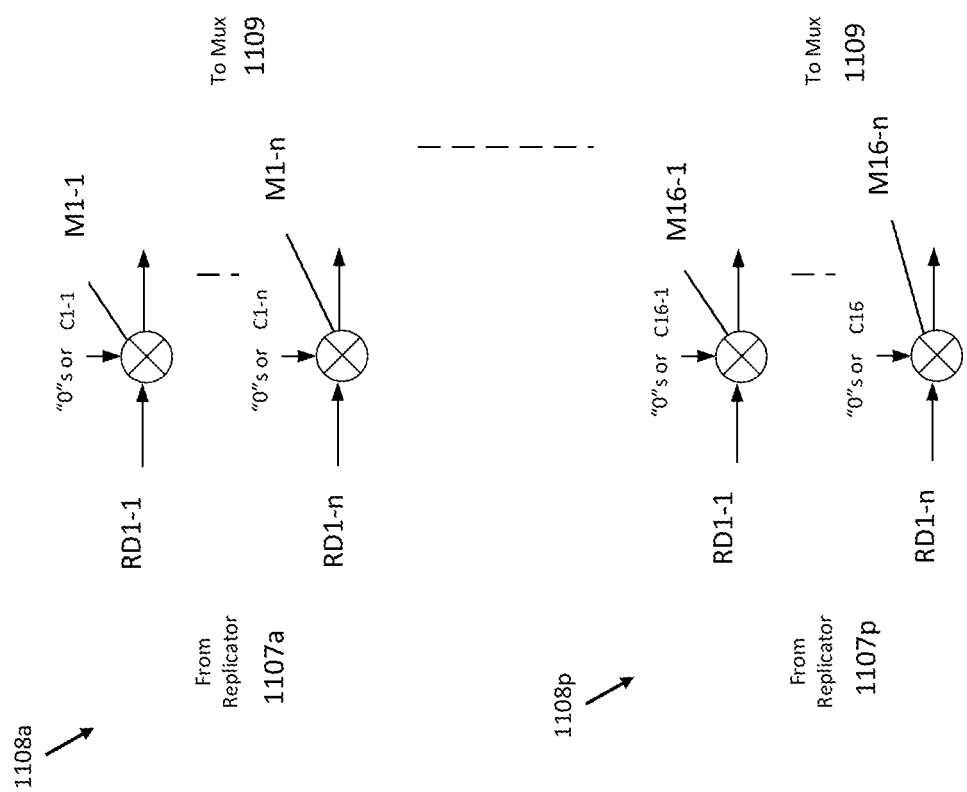

OPTICAL SUBCARRIER DUAL-PATH PROTECTION AND RESTORATION FOR OPTICAL COMMUNICATIONS NETWORKS

CROSS REFERENCE TO RELATED APPLICATIONS

This application is a continuation of International Application No. PCT/US2020/055107, filed Oct. 9, 2020, which claims the benefit of U.S. Provisional Patent Application No. 62/913,253, filed Oct. 10, 2019, which is incorporated herein by reference in its entirety.

TECHNICAL FIELD

This disclosure relates to optical communications networks.

BACKGROUND

In an optical communications network, network nodes (e.g., computer devices) can exchange information using one or more of optical links (e.g., lengths of optical fiber) extending between them. For example, a first network node and a second network node can be interconnected by one or more optical links. The first network node can transmit data to the second network node by generating an optical signal, modulating the optical signal based on the data (e.g., using one more optical sub-carriers), and transmitting the optical signal over the one or more optical links. The second node can demodulate the optical signal to recover the data.

However, in some cases, one or more of the optical links of an optical communications network may be severed or otherwise rendered inoperable. For example, an optical link may be physically severed (e.g., due to a "fiber cut"), such that it cannot convey optical signals from one end of the optical link to the other. As another example, an optical link and/or the equipment coupled along the optical fibers (e.g., "line system components") may be misconfigured or experience a malfunction, such that optical signals are not conveyed accurately (or not conveyed at all) through the optical communications network. Accordingly, the connectivity between nodes of the optical communications network may be interrupted, and the reliability of the communications network may be degraded.

SUMMARY

In an aspect, a system includes a first network device having first circuitry. The first network device is configured to perform operations including receiving data to be transmitted to a second network device over an optical communications network; and transmitting, to the second device: first information indicative of the data using a first communications link of the optical communications network, where the first information is transmitted using a first subset of optical subcarriers, and second information indicative of the data using a second communications link of the optical communications network, where the second information is transmitted using a second subset of optical subcarriers, and where the first subset of optical subcarriers is different from the second sub set of optical subcarriers.

Implementations of this aspect can include one or more of the following features.

In some implementations, the first information and the second information can be identical.

In some implementations, the first information can be different from the second information.

In some implementations, the first communications link and the second communications link can form at least a portion of a communications ring that communicatively interconnects the first network device and the second network device.

In some implementations, the first subset of optical subcarriers can be selected from a plurality of optical subcarriers allotted to the first network device.

In some implementations, the optical subcarriers of the first subset of optical subcarriers can be associated with respective frequencies that are contiguous with one another in a frequency domain.

In some implementations, the second subset of optical subcarriers can be selected from the plurality of optical subcarriers allotted to the first network device.

In some implementations, the optical subcarriers of the second subset of optical subcarriers can be associated with respective frequencies that are contiguous with one another in a frequency domain.

In some implementations, the first subset of optical subcarriers can be associated with one or more first frequencies. The second subset of optical subcarriers can be associated with one or more second frequencies. In some implementations, the one or more first frequencies are not contiguous with the one or more second frequencies in a frequency domain.

In some implementations, the first subset of optical subcarriers can be associated with one or more first frequencies, the second subset of optical subcarriers can be associated with one or more second frequencies, and one or more additional optical subcarriers can be associated with one or more additional frequencies. The one or more additional frequencies can be disposed between the one or more first frequencies and the one or more second frequencies in a frequency domain.

In some implementations, the first subset of optical subcarriers can be associated with one or more first frequencies, and the second subset of optical subcarriers can be associated with one or more second frequencies. The one or more first frequencies and the one or more second frequencies can be separated from one another by one or more additional frequencies in a frequency domain.

In some implementations, a number of optical subcarriers in the first subset of optical subcarriers can be the same as a number of optical subcarriers in the second subset of optical subcarriers.

In some implementations, a number of optical subcarriers in the first subset of optical subcarriers can be different from a number of optical subcarriers in the second subset of optical subcarriers.

In some implementations, the first network device can be configured to transmit the first information and the second information by modulating an output of a laser to generate a modulated optical signal including the first subset of optical subcarriers and the second subsets of optical subcarriers; providing the modulated optical signal to an optical splitter; splitting the modulated optical signal into a first portion and a second portion, where each of the first portion and the second portion includes the first subset of optical subcarriers and the second subset of optical subcarriers; selecting the first subset of optical subcarriers from the first portion of the modulated optical signal; selecting the second subset of subcarriers from the second portion of the modulated optical signal; transmitting the first subset of optical subcarriers to the second network device using the first communications link; and transmitting the second subset of optical subcarriers to the second network device using the second communications link.

In some implementations, the first network device can be configured to select the first subset of optical subcarriers by selecting the first subset of optical subcarriers with a wavelength selective switch.

In some implementations, the first network device can be configured to select the second subset of optical subcarriers by selecting the second subset of optical subcarriers with the wavelength selective switch.

In some implementations, the first network device can include one or more hub network devices. The second network device can include one or more leaf network devices.

In some implementations, each of the optical subcarriers in the first subset of optical subcarriers and the second subset of optical subcarriers can be a respective Nyquist subcarrier.

In another aspect, a system includes a first network device having first circuitry and a second network device having second circuitry. The first network device and the second network device are configured to perform operations including receiving, by the first network device and the second network device, data to be transmitted to a third network device over an optical communications network; transmitting, by the first network device to the third network device, first information indicative of the data using a first communications link of the optical communications network, where the first information is transmitted using a first subset of optical subcarriers; and transmitting, by the second network device to the third network device, second information indicative of the data using a second communications link of the optical communications network, where the second information is transmitted using a second subset of optical subcarriers, and where the first subset of optical subcarriers is different from the second sub set of optical subcarriers.

Implementations of this aspect can include one or more of the following features.

In some implementations, the first information and the second information can be identical.

In some implementations, the first information can be different from the second information.

In some implementations, the first communications link and the second communications link can form at least a portion of a communications ring that communicatively interconnects the first network device, the second network device, and the third network device.

In some implementations, the first subset of optical subcarriers can be selected from a plurality of optical subcarriers allotted to the first network device.

In some implementations, the optical subcarriers of the first subset of optical subcarriers can be associated with respective frequencies that are contiguous with one another in a frequency domain.

In some implementations, the second subset of optical subcarriers can be selected from the plurality of optical subcarriers allotted to the first network device.

In some implementations, the optical subcarriers of the second subset of optical subcarriers can be associated with respective frequencies that are contiguous with one another in a frequency domain.

In some implementations, the first subset of optical subcarriers can be associated with one or more first frequencies, and the second subset of optical subcarriers can be associated with one or more second frequencies. In some implementations, the one or more first frequencies are not contiguous with the one or more second frequencies in a frequency domain.

In some implementations, the first subset of optical subcarriers can be associated with one or more first frequencies, the second subset of optical subcarriers can be associated with one or more second frequencies, and one or more additional optical subcarriers can be associated with one or more additional frequencies. The one or more additional frequencies can be disposed between the one or more first frequencies and the one or more second frequencies in a frequency domain.

In some implementations, the first subset of optical subcarriers can be associated with one or more first frequencies, and the second subset of optical subcarriers can be associated with one or more second frequencies. The one or more first frequencies and the one or more second frequencies can be separated from one another by one or more additional frequencies in a frequency domain.

In some implementations, a number of optical subcarriers in the first subset of optical subcarriers can be the same as a number of optical subcarriers in the second subset of optical subcarriers.

In some implementations, a number of optical subcarriers in the first subset of optical subcarriers can be different from a number of optical subcarriers in the second subset of optical subcarriers.

In some implementations, the first network device can be configured to transmit the first information by modulating an output of a first laser to generate a first modulated optical signal including the first subset of optical subcarriers; and transmitting the first modulated optical signal to the third network device using the first communications link.

In some implementations, the second network device can be configured to transmit the second information by modulating an output of a second laser to generate a second modulated optical signal including the second subset of optical subcarriers; and transmitting the second modulated optical signal to the third network device using the first communications link.

In some implementations, each of the first network device and the second network device can include one or more hub network devices, and the third network device can include one or more leaf network devices.

In some implementations, each of the optical subcarriers in the first subset of optical subcarriers and the second subset of optical subcarriers can be a respective Nyquist subcarrier.

In another aspect, a system includes a first network device having first circuitry. The first network device is configured to perform operations including receiving data to be transmitted to a second network device over an optical communications network; transmitting, to the second device, first information indicative of the data using a first communications link of the optical communications network, where the first information is transmitted using a first subset of optical subcarriers; determining a fault in the first communications link; and responsive to determining the fault in the first communications link, transmitting, to the second network device, second information indicative of the data using a second communications link of the optical communications network, where the second information is transmitted using a second subset of optical subcarriers, and where the first subset of optical subcarriers is different from the second subset of optical subcarriers.

Implementations of this aspect can include one or more of the following features.

In some implementations, the first network device can be configured to determine the fault in the first communications link by determining that an optical fiber of the first communications link has been severed.

In some implementations, the first network device is configured to determine the fault in the first communications link by determining that a line system component of the first communications link is malfunctioning.

In some implementations, the first information and the second information can be identical.

In some implementations, the first information can be different from the second information.

In some implementations, the first communications link and the second communications link can form at least a portion of a communications ring that communicatively interconnects the first network device and the second network device.

In some implementations, the first subset of optical subcarriers can be selected from a plurality of optical subcarriers allotted to the first network device.

In some implementations, the optical subcarriers of the first subset of optical subcarriers can be associated with respective frequencies that are contiguous with one another in a frequency domain.

In some implementations, the second subset of optical subcarriers can be selected from the plurality of optical subcarriers allotted to the first network device.

In some implementations, the optical subcarriers of the second subset of optical subcarriers can be associated with respective frequencies that are contiguous with one another in a frequency domain.

In some implementations, the first subset of optical subcarriers can be associated with one or more first frequencies, and the second subset of optical subcarriers can be associated with one or more second frequencies. In some implementations, the one or more first frequencies are not contiguous with the one or more second frequencies in a frequency domain.

In some implementations, the first subset of optical subcarriers can be associated with one or more first frequencies, the second subset of optical subcarriers can be associated with one or more second frequencies, and one or more additional optical subcarriers can be associated with one or more additional frequencies. The one or more additional frequencies can be disposed between the one or more first frequencies and the one or more second frequencies in a frequency domain.

In some implementations, the first subset of optical subcarriers can be associated with one or more first frequencies, and the second subset of optical subcarriers can be associated with one or more second frequencies. The one or more first frequencies and the one or more second frequencies can be separated from one another by one or more additional frequencies in a frequency domain.

In some implementations, a number of optical subcarriers in the first subset of optical subcarriers can be the same as a number of optical subcarriers in the second subset of optical subcarriers.

In some implementations, a number of optical subcarriers in the first subset of optical subcarriers can be different from a number of optical subcarriers in the second subset of optical subcarriers.

In some implementations, the first network device can include one or more hub network devices, and the second network device can include one or more leaf network devices.

In some implementations, each of the optical subcarriers in the first subset of optical subcarriers and the second subset of optical subcarriers can be a respective Nyquist subcarrier.

In another aspect, a system includes a first network device including first circuitry. The first network device is configured to perform operations including monitoring for incoming optical signals on a first communications link and a second communications link of an optical communications network, where each of the first communications link and the second communications link communicatively interconnects the first network device and a second network device; receiving, by the first network device, at least one of: a first signal including first information indicative of data transmitted by the second network device using the first communications link and using a first subset of optical subcarriers, or a second signal including second information indicative of the data transmitted by the second network device using the second communications link and using a second subset of optical subcarriers, where the first subset of optical subcarriers is different from the second subset of optical subcarriers; and retrieving, by the first network device, the data from at least one of the first signal or the second signal.

Implementations of this aspect can include one or more of the following features.

In some implementations, the first network device can be further configured to perform at least one of: transmitting the data to a third network device, or transmitting the data to the third network device.

In some implementations, the first communications link and the second communications link can form at least a portion of a communications ring that communicatively interconnects the first network device and the second network device.

In some implementations, the optical subcarriers of the first subset of optical subcarriers can be associated with respective frequencies that are contiguous with one another in a frequency domain.

In some implementations, the optical subcarriers of the second subset of optical subcarriers can be associated with respective frequencies that are contiguous with one another in the frequency domain.

In some implementations, the first frequencies are not contiguous with the second frequencies in the frequency domain.

In some implementations, one or more additional optical subcarriers can be associated with one or more additional frequencies, and the one or more additional frequencies can be disposed between the one or more first frequencies and the one or more second frequencies in the frequency domain.

In some implementations, the first subset of optical subcarriers can be associated with one or more first frequencies, and the second subset of optical subcarriers can be associated with one or more second frequencies. The one or more first frequencies and the one or more second frequencies can be separated from one another by one or more additional frequencies in the frequency domain.

In some implementations, a number of optical subcarriers in the first subset of optical subcarriers can be the same as a number of optical subcarriers in the second subset of optical subcarriers.

In some implementations, a number of optical subcarriers in the first subset of optical subcarriers can be different from a number of optical subcarriers in the second subset of optical subcarriers.

In some implementations, wherein the first network device can be configured to retrieve the data from at least one of the first signal or the second signal by determining that the first signal was not received from the second network device; determining that the second signal was received from the second network device; and responsive to determining that the first signal was not received from the second network device and determining that the second signal was received from the second network device, retrieving the data from the second signal.

In some implementations, the first network device can be configured to monitor for incoming optical signals on the first communications link and the second communications link by tuning a receiver of the first network device to one or more first frequencies associated with the first subset of optical subcarriers, and responsive to determining that the first signal was not received from the second network device, tuning the receiver of the first network device to one or more second frequencies associated with the second subset of optical subcarriers.

In some implementations, the first network device can be configured to retrieve the data from at least one of the first signal or the second signal can include determining that the first signal was received from the second network device; determining one or more first quality metrics associated with the first signal; determining that the second signal was received from the second network device; determining one or more second quality metrics associated with the second signal; and retrieving, based on the one or more first quality metrics and the one or more second quality metrics, the data from one of the first signal or the second signal.

In some implementations, at least one of the one or more first quality metrics can include an indication of a latency associated with a transmission of the first signal using the first communications link.

In some implementations, at least one of the one or more first quality metrics can include an indication of a pre-forward error correction quality factor (pre-FEC Q) associated with a transmission of the first signal using the first communications link.

In some implementations, at least one of the one or more second quality can include an indication of a latency associated with a transmission of the second signal using the second communications link.

In some implementations, at least one of the one or more second quality can include an indication of a forward error correction quality factor (pre-FEC Q) associated with a transmission of the second signal using the second communications link.

In some implementations, the first network device can include one or more hub network devices, and the second network device can include one or more leaf network devices.

In some implementations, each of the optical subcarriers in the first subset of optical subcarriers and the second subset of optical subcarriers can be a respective Nyquist subcarrier.

In another aspect, an apparatus includes a digital signal processor that is operable to receive information signals including plurality of bits of information and provide a plurality of digital signals based on the information signals; digital-to-analog conversion circuitry operable to receive the digital signals from the digital signal processor and provide a plurality of analog signals based on the digital signals; driver circuitry operable to output drive signals based on the analog signals; a laser operable to provide an optical signal; and an optical modulator operable to modulate at least a portion of the optical signal based on the drive signals to provide a modulated optical signal. The modulated optical signal includes a first group of optical subcarriers and a second group of optical subcarriers. The first group of optical subcarriers includes a first optical subcarrier and the second group of optical subcarriers includes a second optical subcarrier. The first optical subcarrier carries first data and the second optical subcarrier carries second data. The first and second data are indicative of the plurality of bits of information.

Implementations of this aspect can include one or more of the following features.

In some implementations, the first data can be the same as the second data.

In some implementations, a guard band can spectrally separate first frequencies associated with the first group of optical subcarriers from second frequencies associated with the second group of optical subcarriers.

In some implementations, the apparatus can include an optical splitter. The splitter can have an input and first and second outputs. The input can be operable to receive the modulated optical signal. The first output can be operable to supply a first portion of the modulated optical signal. The second output can be operable to supply a second portion of modulated optical signal.

In some implementations, the first portion of the modulated optical signal can be a first power-split portion of the modulated optical signal and the second portion of the modulated optical signal can be a second power-split portion of the modulated optical signal.

In some implementations, the apparatus can include a wavelength selective switch that receives the first portion of the modulated optical signal.

In some implementations, the apparatus can include a first wavelength selective switch that receives the first portion of the modulated optical signal; and a second wavelength selective switch that receives the second portion of the modulated optical signal.

In some implementations, the first wavelength selective switch can supply the first group of optical subcarriers to a first optical communication path including a first optical fiber and the second wavelength selective switch can supply the second group of optical subcarriers to a second optical communication path including a second optical fiber.

In some implementations, each optical subcarrier in the first group of optical subcarriers can be a Nyquist subcarrier.

In some implementations, the apparatus can include a wavelength selective switch that receives the first portion of the modulated optical signal and the second portion of the modulated optical signal.

In some implementations, the wavelength selective switch can supply the first group of optical subcarriers to a first optical communication path including a first optical fiber, and the wavelength selective switch can supply the second group of optical subcarriers to a second optical communication path including a second optical fiber.

In some implementations, the apparatus can include an optical splitter. The optical splitter can receive the optical signal from the laser and supply said at least a portion of the optical signal to the modulator.

In another aspect, an apparatus includes a polarization beam splitter that is operable to receive a modulated optical signal. The modulated optical signal includes a plurality of optical subcarriers. The modulated optical signal includes a first group of optical subcarriers and a second group of optical subcarriers, The first group of optical subcarriers includes a first optical subcarrier and a second optical subcarrier. The second group of optical subcarriers includes a third optical subcarrier and a fourth optical subcarrier. The first optical subcarrier carries first data and the second optical subcarrier carrying second data. The third optical subcarrier carries third data and the fourth optical subcarrier carrying fourth data. The first data is indicative of a first plurality of bits of information and the third data is indicative of the first plurality of bits of information. The second data is indicative of a second plurality of bits of information and the fourth data is indicative of the second plurality of bits of information. The apparatus also includes optical hybrid circuitry operable to receive outputs from the polarization beam splitter and supply a plurality of optical mixing products; photodetector circuitry operable to supply electrical signals based on the plurality of optical mixing products; analog-to-digital conversion circuitry operable to provide digital signals based on the electrical signals; and a digital signal processor operable to output the first plurality of bits of information and the second plurality of bits of information based on digital signals.

Implementations of this aspect can include one or more of the following features.

In some implementations, the first data can be the same as the third data.

In some implementations, a guard band can spectrally separate first frequencies associated with the first group of optical subcarriers from second frequencies associated with the second group of optical subcarriers.

In some implementations, the apparatus can include an optical combiner having a first input that receives a first portion of the modulated optical signal and a second input that receives a second portion of the modulated optical signal. The first portion of the modulated optical signal can include the first plurality of optical subcarriers and the second portion of the modulated optical signal can include the second plurality of optical subcarriers. The optical combiner can have an output that supplies the modulated optical signal.

In some implementations, the apparatus can include a first wavelength selective switch operable to be coupled to a first optical communication path including a first optical fiber. The first wavelength selective switch can be operable to receive the first portion of the modulated optical signal from the first optical communication path and supply the first portion of the modulated optical signal to the first input of the optical combiner. The apparatus can also include a second wavelength selective switch operable to be coupled to a second optical communication path including a second optical fiber. Te second wavelength selective switch can be operable to receive the second portion of the modulated optical signal from the second optical communication path and supply the second portion of the modulated optical signal to the second input of the optical combiner.

In some implementations, the apparatus can include a wavelength selective switch operable to be coupled to a first optical communication path including a first optical fiber and a second optical communication path including a second optical fiber. The wavelength selective switch can be operable to receive the first portion of the modulated optical signal from the first optical communication path and supply the first portion of the modulated optical signal to the first input of the optical combiner. The wavelength selective switch can be operable to receive the second portion of the modulated optical signal from the second optical communication path and supply the second portion of the modulated optical signal to the second input of the optical combiner.

In some implementations, that apparatus can include a local oscillator laser that supplies light. At least a portion of the light can be supplied to the optical hybrid circuitry.

In some implementations, the apparatus can include an optical splitter that receives the light from the local oscillator laser and supplies to the portion of the light to the optical hybrid circuitry.

In another aspect, an apparatus includes a first digital signal processor that is operable to receive information signals including a first plurality of bits of information and provide a first plurality of digital signals based on the information signals; digital-to-analog conversion circuitry operable to receive the first plurality of digital signals from the first digital signal processor and provide a plurality of analog signals based on the digital signals; driver circuitry operable to output drive signals based on the analog signals; an optical modulator operable to modulate an optical signal based on the drive signals to provide a first modulated optical signal, the first modulated optical signal including a first group of optical subcarriers and a second group of optical subcarriers, the first group of optical subcarriers including a first optical subcarrier and the second group of optical subcarriers including a second optical subcarrier, the first optical subcarrier carrying first data and the second optical subcarrier carrying second data, the first and second data being indicative of the first plurality of bits of information; a polarization beam splitter that is operable to receive a second modulated optical signal, the second modulated optical signal including a third group of optical subcarriers and a fourth group of optical subcarriers, the third group of optical subcarriers including a third optical subcarrier and the fourth group of optical subcarriers including a fourth optical subcarrier, the third optical subcarrier carrying third data and the fourth optical subcarrier carrying fourth data, the third data being indicative of a second plurality of bits of information and the second data being indicative of the second plurality of bits of information; optical hybrid circuitry operable to receive outputs from the polarization beam splitter and supply a plurality of optical mixing products; photodetector circuitry operable to supply electrical signals based on the plurality of optical mixing products; analog-to-digital conversion circuitry operable to provide a second plurality of digital signals based on the electrical signals; and a digital signal processor operable to output the second plurality of bits based on the second plurality of digital signals.

Implementations of this aspect can include one or more of the following features.

In some implementations, each subcarrier of the first group of optical subcarriers can have a corresponding one of a first plurality of frequencies and each subcarrier of the third group of optical subcarriers can have a corresponding one of the first plurality of frequencies.

In some implementations, each subcarrier of the second group of optical subcarriers can have a corresponding one of a second plurality of frequencies and each subcarrier of the fourth group of optical subcarriers can have a corresponding one of the second plurality of frequencies.

In some implementations, each optical subcarrier of the first group of optical subcarriers, each optical subcarrier of the second group of optical subcarriers, each optical subcarriers of the third group of optical subcarriers, and each optical subcarrier of the fourth group of optical subcarriers can be a Nyquist subcarrier.

In some implementations, the first data can be the same as the second data and the third data can be the same as the fourth data.

In some implementations, a guard band can spectrally separate first frequencies associated with the first group of optical subcarriers from second frequencies associated with the second group of optical subcarriers.

In some implementations, the apparatus can include an optical splitter having an input that receives the first modulated optical signal, a first output that supplies a first portion of the first modulated optical signal and a second output that supplies a second portion of the first modulated optical signal.

In some implementations, the apparatus can include an optical combiner having a first input that receives a first portion of the second modulated optical signal including the third group of optical subcarriers and a second portion of the second modulated optical including the fourth group of the optical subcarriers.

In some implementations, the apparatus can include a first wavelength selective switch that receives the first portion of the first modulated optical signal and supplies the first group of optical subcarriers to a first optical communication path including a first optical fiber; and a second wavelength selective switch that receives the second portion of the first modulated optical signal and supplies the second group of optical subcarriers to a second optical communication path including a second optical fiber.

In some implementations, the apparatus can include a third wavelength selective switch operable to be coupled to the second optical communication path including the second optical fiber. The third wavelength selective switch can be operable to receive the first portion of the second modulated optical signal including the third group of optical subcarriers from the second optical communication path and supply the first portion of the second modulated optical signal to the first input of the optical combiner. The apparatus can also include a fourth wavelength selective switch operable to be coupled to the first optical communication path including the first optical fiber. The fourth wavelength selective switch can be operable to receive the second portion of the second modulated optical signal including the fourth group of subcarriers from the first optical communication path and supply the second portion of the second modulated optical signal to the second input of the optical combiner.

In some implementations, the apparatus can include a first wavelength selective switch operable to receive the first portion of the first modulated optical signal and the second portion of the first modulated optical signal. The first wavelength selective switch can supply the first group of optical subcarriers to a first optical communication path including a first optical fiber. The first wavelength selective switch can supply the second group of optical subcarriers to a second optical communication path including a second optical fiber. The apparatus can also include a second wavelength selective switch operable to be coupled to the second optical communication path including the second optical fiber and can be operable to receive the first portion of the second modulated optical signal from the second optical communication path and supply the first portion of the second modulated optical signal including the third group of optical subcarriers to the first input of the optical combiner. The second wavelength selective switch can be operable to be coupled to the first optical communication path including the first optical fiber. The second wavelength selective switch can be operable to receive the second portion of the second modulated optical signal including the fourth plurality of optical subcarriers from the first optical communication path and supply the second portion of the second modulated optical signal to the second input of the optical combiner.

In another aspect, an apparatus includes a digital signal processor that is operable to receive a plurality of bits of information and provide a plurality of digital signals based on the plurality of bits of information; digital-to-analog conversion circuitry operable to receive the digital signals from the digital signal processor and provide a plurality of analog signals based on the digital signals; driver circuitry operable to output drive signals based on the analog signals; a laser operable to provide an optical signal; and an optical modulator operable to modulate at least a portion of the optical signal based on the drive signals to provide a modulated optical signal. The modulated optical signal includes a first optical subcarriers and a second optical subcarrier. The first optical subcarrier carries first data and the second optical subcarrier carries second data. The first and second data are indicative of the plurality of bits of information.

Implementations of this aspect can include one or more of the following features.

In some implementations, the first data can be the same as the second data.

In some implementations, the apparatus can include an optical splitter. The splitter can have an input and first and second outputs. The input can be operable to receive the modulated optical signal. The first output can be operable to supply a first portion of the modulated optical signal. The second output can be operable to supply a second portion of modulated optical signal.

In some implementations, the first portion of the modulated optical signal can be a first power-split portion of the modulated optical signal and the second portion of the modulated optical signal can be a second power-split portion of the modulated optical signal.

In some implementations, the apparatus can include a wavelength selective switch that receives the first portion of the modulated optical signal.

In some implementations, the apparatus can include a first wavelength selective switch that receives the first portion of the modulated optical signal; and a second wavelength selective switch that receives the second portion of the modulated optical signal.

In some implementations, the first wavelength selective switch can supply the first optical subcarrier to a first optical communication path including a first optical fiber and the second wavelength selective switch can supply the second optical subcarrier to a second optical communication path including a second optical fiber.

In some implementations, each of the first and second optical subcarriers can be a Nyquist subcarrier.

In some implementations, the apparatus can include a wavelength selective switch that receives the first portion of the modulated optical signal and the second portion of the modulated optical signal.

In some implementations, the wavelength selective switch can supply the first optical subcarrier to a first optical communication path including a first optical fiber, and the wavelength selective switch can supply the second group of optical subcarriers to a second optical communication path including a second optical fiber.

In some implementations, the apparatus can include an optical splitter. The optical splitter can receive the optical signal from the laser and supply said at least a portion of the optical signal to the modulator.

In another aspect, an apparatus includes a polarization beam splitter that is operable to receive a first modulated optical signal and a second modulated optical signal. The first modulated optical signal includes a first group of optical subcarriers and the second modulated optical signal includes a second group of optical subcarriers. The first group of optical subcarriers includes a first optical subcarrier. The second group of optical subcarriers includes a second optical subcarrier. The first optical subcarrier carries first data and the second optical subcarrier carrying second data. The first data is indicative of a plurality of bits of information. The second data is indicative of the plurality of bits of information. The apparatus also includes optical hybrid circuitry operable to receive outputs from the polarization beam splitter and supply a plurality of optical mixing products; photodetector circuitry operable to supply electrical signals based on the plurality of optical mixing products; analog-to-digital conversion circuitry operable to provide digital signals based on the electrical signals; and a digital signal processor operable to output the plurality of bits based on the digital signals.

Implementations of this aspect can include one or more of the following features.

In some implementations, the first data can be the same as the second data.

In some implementations, a guard band can spectrally separate first frequencies associated with the first group of optical subcarriers from second frequencies associated with the second group of optical subcarriers.

In some implementations, the apparatus can include an optical combiner having a first input that receives the first modulated optical signal and a second input that receives the second modulated optical signal. The optical combiner can have an output that supplies the first and the second modulated optical signals.

In some implementations, the apparatus can include a first wavelength selective switch operable to be coupled to a first optical communication path including a first optical fiber. The first wavelength selective switch can be operable to receive the first modulated optical signal from the first optical communication path and supply the first modulated optical signal to the first input of the optical combiner. The apparatus can also include a second wavelength selective switch operable to be coupled to a second optical communication path including a second optical fiber. The second wavelength selective switch can be operable to receive the second modulated optical signal from the second optical communication path and supply the second modulated optical signal to the second input of the optical combiner.

In some implementations, the apparatus can include a wavelength selective switch operable to be coupled to a first optical communication path including a first optical fiber and a second optical communication path including a second optical fiber. The wavelength selective switch can be operable to receive the first modulated optical signal from the first optical communication path and supply the first modulated optical signal to the first input of the optical combiner. The wavelength selective switch can be operable to receive the second modulated optical signal from the second optical communication path and supply the second modulated optical signal to the second input of the optical combiner.

In some implementations, the apparatus can include a local oscillator laser that supplies light, at least a portion of the light being supplied to the optical hybrid circuitry.

In some implementations, the apparatus can include an optical splitter that receives the light from the local oscillator laser and supplies to the portion of the light to the optical hybrid circuitry.

In another aspect, an apparatus includes a first digital signal processor that is operable to receive a first plurality of bits of information and provide a first plurality of digital signals based on the first plurality of bits of information; digital-to-analog conversion circuitry operable to receive the first plurality of digital signals from the first digital signal processor and provide a plurality of analog signals based on the digital signals; driver circuitry operable to output drive signals based on the analog signals; an optical modulator operable to modulate an optical signal based on the drive signals to provide a first modulated optical signal, the first modulated optical signal including a first optical subcarrier and a second optical subcarrier, the first optical subcarrier carrying first data and the second optical subcarrier carrying second data, the first and second data being indicative of the first plurality of bits of information; a polarization beam splitter that is operable to receive a second modulated optical signal, the second modulated optical signal including a first group of optical subcarriers and a second group of optical subcarriers, the first group of optical subcarriers including a third optical subcarrier and the second group of optical subcarriers including a fourth optical subcarrier, the third optical subcarrier carrying third data and the fourth optical subcarrier carrying fourth data, the third data being indicative of a second plurality of bits of information and the second data being indicative of the second plurality of bits of information; optical hybrid circuitry operable to receive outputs from the polarization beam splitter and supply a plurality of optical mixing products; photodetector circuitry operable to supply electrical signals based on the plurality of optical mixing products; analog-to-digital conversion circuitry operable to provide a second plurality of digital signals based on the electrical signals; and a second digital signal processor operable to output the second plurality of bits based on the second plurality of digital signals.

Implementations of this aspect can include one or more of the following features.

In some implementations, each subcarrier of the first group of optical subcarriers can have a corresponding one of a first plurality of frequencies and each subcarrier of the second group of optical subcarriers can have a corresponding one of a second plurality of frequencies. The first optical subcarrier can have one of the first plurality of frequencies, and the second optical subcarrier can have said one of the first plurality of frequencies.

In some implementations, each of the first and second optical subcarriers can be a Nyquist subcarrier.

In some implementations, the first data can be the same as the second data and the third data is the same as the fourth data.

In some implementations, a guard band can spectrally separate first frequencies associated with the first group of optical subcarriers from second frequencies associated with the second group of optical subcarriers.

In some implementations, the apparatus can include an optical splitter having an input that receives the first modulated optical signal, a first output that supplies a first portion of the first modulated optical signal and a second output that supplies a second portion of the first modulated optical signal.

In some implementations, the apparatus can include an optical combiner having a first input that receives a first portion of the second modulated optical signal including the first group of optical subcarriers and a second portion of the second modulated optical including the second group of optical subcarriers.

In some implementations, the apparatus can include a first wavelength selective switch that is operable to receive the first portion of the first modulated optical signal and supply the first optical subcarrier to a first optical communication path including a first optical fiber; and a second wavelength selective switch that receives the second portion of the first modulated optical signal and supplies the second optical subcarrier to a second optical communication path including a second optical fiber.

In some implementations, the apparatus can include a third wavelength selective switch operable to be coupled to the second optical communication path including the second optical fiber. The third wavelength selective switch can be operable to receive the first portion of the second modulated optical signal including the first group of optical subcarriers from the second optical communication path and supply the first portion of the second modulated optical signal to the first input of the optical combiner. The apparatus can also include a fourth wavelength selective switch operable to be coupled to the first optical communication path including the first optical fiber. The fourth wavelength selective switch can be operable to receive the second portion of the second modulated optical signal including the fourth optical subcarrier from the first optical communication path and supply the second portion of the second modulated optical signal to the second input of the optical combiner.

In some implementations, the apparatus can include a first wavelength selective switch operable to receive the first portion of the first modulated optical signal and the second portion of the first modulated optical signal. The first wavelength selective switch can supply the first optical subcarrier to a first optical communication path including a first optical fiber. The first wavelength selective switch can supply the second optical subcarrier to a second optical communication path including a second optical fiber. The apparatus can also include a second wavelength selective switch operable to be coupled to the second optical communication path including the second optical fiber and operable to receive the first portion of the second modulated optical signal from the second optical communication path and supply the first portion of the second modulated optical signal including the first group of optical subcarriers to the first input of the optical combiner. The second wavelength selective switch can be operable to be coupled to the first optical communication path including the first optical fiber. The second wavelength selective switch can be operable to receive the second portion of the second modulated optical signal including the second group of optical subcarriers from the first optical communication path and supply the second portion of the second modulated optical signal to the second input of the optical combiner.

As another aspect, an apparatus includes a digital signal processor that is operable to receive a plurality of bits of information and provide a plurality of digital signals based on the plurality of bits of information; digital-to-analog conversion circuitry operable to receive the digital signals from the digital signal processor and provide a plurality of analog signals based on the digital signals; driver circuitry operable to output drive signals based on the analog signals; a laser operable to provide an optical signal; an optical modulator operable to modulate at least a portion of the optical signal based on the drive signals to provide a modulated optical signal, the modulated optical signal including a an optical subcarrier, the optical subcarrier carrying data indicative of the plurality of bits of information; and an optical splitter operable to receive the modulated optical signal, the optical splitter having first and second outputs, the first output supplying a first portion of modulated optical signal and the second output supplying a second portion of the modulated optical signal.

Implementations of this aspect can include one or more of the following features.

In some implementations, the first portion of the modulated optical signal can be supplied to a first optical communication path including a first optical fiber and the second portion of the modulated optical signal can be supplied to a second optical communication path including a second optical fiber.

In some implementations, the first portion of the modulated optical signal can be a first power-split portion of the modulated optical signal and the second portion of the modulated optical signal can be a second power-split portion of the modulated optical signal.

In some implementations, the apparatus can further include a wavelength selective switch that receives the first portion of the modulated optical signal and supplies the first portion of the modulated optical signal to an optical communication path including an optical fiber.

In some implementations, the apparatus can further include a first wavelength selective switch that receives the first portion of the modulated optical signal and provides the first portion of the modulated optical signal to a first optical communication path including a first optical fiber; and a second wavelength selective switch that receives the second portion of the modulated optical signal and provides the second portion of the modulated optical signal to a second optical communication path including a second optical fiber.

In some implementations, the optical subcarrier can be a Nyquist subcarrier.

In some implementations, the apparatus can further include a wavelength selective switch that receives the first portion of the modulated optical signal and the second portion of the modulated optical signal.

In some implementations, the wavelength selective switch can supply the first portion of the modulated optical signal to a first optical communication path including a first optical fiber, and the wavelength selective switch can supply the second portion of the modulated optical signal to a second optical communication path including a second optical fiber.

In some implementations, the optical splitter can be a first optical splitter, and the apparatus can further include a second optical splitter operable to receive the optical signal from the laser and supply said at least a portion of the optical signal to the modulator.

In another aspect, an apparatus includes a first digital signal processor that is operable to receive a first plurality of bits of information and provide a first plurality of digital signals based on the first plurality of bits of information; digital-to-analog conversion circuitry operable to receive the first plurality of digital signals from the first digital signal processor and provide a plurality of analog signals based on the digital signals; driver circuitry operable to output drive signals based on the analog signals; an optical modulator operable to modulate an optical signal based on the drive signals to provide a first modulated optical signal, the first modulated optical signal including a first optical subcarrier, the first optical subcarrier carrying data indicative of the first plurality of bits of information; a splitter operable to receive the first modulated optical signal, the splitter having first and second outputs, the first output being operable to provide a first portion of the first modulated optical signal and the second output being operable to provide a second portion of the first modulated optical signal; a polarization beam splitter that is operable to receive a second modulated optical signal and a third modulated optical signal, the second modulated optical signal including a group of second optical subcarriers and a group of third optical subcarriers, the group of second optical subcarriers including a second optical subcarrier and the group of third optical subcarriers including a third optical subcarrier, the second optical subcarrier carrying second data and the third optical subcarrier carrying third data, the second data being indicative of a second plurality of bits of information and the third data being indicative of the second plurality of bits of information; optical hybrid circuitry operable to receive outputs from the polarization beam splitter and supply a plurality of optical mixing products; photodetector circuitry operable to supply electrical signals based on the plurality of optical mixing products; analog-to-digital conversion circuitry operable to provide a second plurality of digital signals based on the electrical signals; and a second digital signal processor operable to output the second plurality of bits based on the second plurality of digital signals.

Implementations of this aspect can include one or more of the following features.

In some implementations, each subcarrier of the group of second optical subcarriers can have a corresponding one of a first plurality of frequencies and each subcarrier of the group of third optical subcarriers can have a corresponding one of a second plurality of frequencies. The first optical subcarrier can have one of the first plurality of frequencies, and the second optical subcarrier can have said one of the second plurality of frequencies.

In some implementations, each of the first optical subcarrier, the group of second optical subcarriers, and the group of third optical subcarriers can be a Nyquist subcarrier.

In some implementations, the second data can be the same as the third data.

In some implementations, a guard band can spectrally separate first frequencies associated with the first optical subcarrier from second frequencies associated with the second group of optical subcarriers.

In some implementations, the apparatus can further include an optical combiner having a first input that receives the group of second optical subcarriers and the group of third optical subcarriers.

In some implementations, the apparatus can further include a first wavelength selective switch operable to receive the first portion of the first modulated optical signal and supply the first portion of the first modulated optical signal to a first optical communication path including a first optical fiber; and a second wavelength selective switch that receives the second portion of the first modulated optical signal and supplies the second portion of the first modulated optical signal to a second optical communication path including a second optical fiber.

In some implementations, the apparatus can further include a third wavelength selective switch operable to be coupled to the second optical communication path including the second optical fiber, the third wavelength selective switch being operable to receive the second modulated optical signal including the group of second optical subcarriers from the second optical communication path and supply the second modulated optical signal to the first input of the optical combiner; and a fourth wavelength selective switch operable to be coupled to the first optical communication path including the first optical fiber, the fourth wavelength selective switch being operable to receive the third modulated optical signal including the group of third optical subcarriers from the first optical communication path and supply the third modulated optical signal to the second input of the optical combiner.

In some implementations, the apparatus can further include an optical combiner having a first and second inputs and an output; a first wavelength selective switch operable to receive the first portion of the first modulated optical signal and the second modulated optical signal, where the first wavelength selective switch supplies the first portion of the modulated optical signal to a first optical communication path including a first optical fiber, and the first wavelength selective switch supplies the second modulated optical signal to the first input of the optical combiner; and a second wavelength selective switch operable to receive the second portion of the second modulated optical signal and the third modulated optical signal, where the second wavelength selective switch supplies the second portion of the first modulated optical to a second optical communication path including a second optical fiber, and the second wavelength selective switch supplies the third modulated optical signal to the second input of the optical combiner, the output of the optical combiner providing the second and third modulated optical signals to the polarization beam splitter.

In some implementations, the apparatus can further include an optical combiner having a first input that receives the second modulated optical signal, a second input that receives the second modulated optical signal, and an output that provides the second and third modulated optical signals to the polarization beam splitter.

In another aspect, an apparatus includes a first transmitter and a second transmitter. The first transmitter includes a first laser operable to provide a first optical signal, and a first modulator operable to provide a first modulated optical signal based on the first optical signal and a plurality of data stream provided to the first transmitter, the first modulated optical signal including a first plurality of optical subcarriers, such that the first transmitter is operable to supply the first modulated optical signal to a first optical communication path, the first plurality of optical subcarriers being associated with the plurality of data streams. The second transmitter is operable to receive the plurality of data streams. The second transmitter includes a second laser operable to provide a second optical signal; and a second modulator operable to provide a second modulated optical signal based on the second optical signal and the plurality of data streams, the second modulated optical signal including a second plurality of optical subcarriers, such that the second transmitter is operable to supply the second modulated optical signal to a second optical communication path, the second plurality of optical subcarriers being associated with the plurality of data streams.

Implementations of this aspect can include one or more of the following features.

In some implementations, each optical subcarrier of the first plurality of optical subcarriers and each optical subcarrier of the second plurality of optical subcarriers can be a Nyquist subcarrier.

In some implementations, the apparatus can further include a first wavelength selective switch operable to receive the first plurality of optical subcarriers from the first transmitter and supply the first plurality of optical subcarriers to the first optical communication path; and a second wavelength selective switch operable to receive the second plurality of optical subcarriers and supply the second plurality of optical subcarriers to the second optical communication path.

In some implementations, the optical signal provided by the first laser can have a first wavelength and the optical signal provided by the second laser can have a second wavelength different than the first wavelength.

In some implementations, each of the first plurality of optical subcarriers can have a corresponding one of a first plurality of frequencies, and each of the second plurality of optical subcarriers can have a corresponding one of a second plurality of frequencies.

In some implementations, each of the first plurality of frequencies can be different than each of the second plurality of frequencies.

In some implementations, the first transmitter further can include a first digital signal processor operable to provide first digital signals based on the first plurality of data streams, first digital-to-analog circuitry operable to provide first analog signals based on the first digital signals, and first driver circuitry operable to provide first drive signals to the first modulator based on the first analog signals. The second transmitter can include a second digital signal processor operable to provide second digital signals based on the first plurality of data streams, second digital-to-analog circuitry operable to provide second analog signals based on the second digital signals, and second driver circuitry operable to provide second drive signals to the second modulator based on the second analog signals.

In another aspect, an apparatus includes a first receiver, a second receiver, and a selection circuit. The first receiver includes a first polarization beam splitter operable to receive a first modulated optical signal from a first optical communication path, the first modulated optical signal including a first plurality of optical subcarriers associated with a plurality of data streams, and a first digital signal processor operable to provide an output based on the first plurality of optical subcarriers, the output of the first digital signal processor including the plurality of data streams. The second receiver includes a second polarization beam splitter operable to receive a second modulated optical signal from a second optical communication path, the second modulated optical signal including a second plurality of optical subcarriers, each of which being associated with the plurality of data streams, a second digital signal processor operable to provide an output based on the second plurality of optical subcarriers, the output of the second digital processor including the plurality of data streams. The selection circuit is coupled to the first digital signal processor and the second digital processor. The selection circuit is configured to selectively supply one of the output of the first digital signal processor and the output of the second digital processor.

Implementations of this aspect can include one or more of the following features.

In some implementations, each optical subcarrier of the first plurality of optical subcarriers and each optical subcarrier of the second plurality of optical subcarriers can be a Nyquist subcarrier.

In some implementations, the apparatus can further include a first wavelength selective switch operable to the supply the first plurality of optical subcarriers to the first receiver; and a second wavelength selective switch operable to supply the second plurality of optical subcarriers to the second receiver.

In some implementations, the apparatus can further include a first laser operable to provide a first local oscillator signal; a first optical hybrid circuit operable to receive the first local oscillator signal and outputs from the first polarization beam splitter; a second laser operable to provide a second local oscillator signal; and a second optical hybrid circuit operable to receive the second local oscillator signal the outputs from the second polarization beam splitter.

In some implementations, the first local oscillator signal can have a first wavelength and the second local oscillator signal can have a second wavelength different than the first wavelength.

In some implementations, each of the first plurality of optical subcarriers can have a corresponding one of a first plurality of frequencies, and each of the second plurality of optical subcarriers can have a corresponding one of a second plurality of frequencies.

In some implementations, each of the first plurality of frequencies can be different than each of the second plurality of frequencies.

In another aspect, an apparatus includes a first transmitter, a second transmitter, a first receiver, a second receiver, and a selection circuit. The first transmitter includes a first laser operable to provide a first optical signal, and a first modulator operable to provide a first modulated optical signal based on the first optical signal and a first plurality of data stream provided to the first transmitter, the first modulated optical signal including a first plurality of optical subcarriers, such that the first transmitter is operable to supply the first modulated optical signal to a first optical communication path, the first plurality of optical subcarriers being associated with the first plurality of data stream. The second transmitter is operable to receive the plurality of data streams. The second transmitter includes a second laser operable to provide a second optical signal; a second modulator operable to provide a second modulated optical signal based on the second optical signal and the first plurality of data streams, the second modulated optical signal including a second plurality of optical subcarriers, such that the second transmitter is operable to supply the second modulated optical signal to a second optical communication path, the second plurality of optical subcarriers being associated with the first plurality of data streams. The first receiver includes a first polarization beam splitter operable to receive a third modulated optical signal from the second optical communication path, the third modulated optical signal including a third plurality of optical subcarriers associated with a second plurality of data streams, and a first digital signal processor operable to provide an output based on the third plurality of optical subcarriers, the output of the first digital signal processor including the second plurality of data streams. The second receiver includes a second polarization beam splitter operable to receive a fourth modulated optical signal from the first optical communication path, the fourth modulated optical signal including a fourth plurality of optical subcarriers, each of which being associated with the second plurality of data streams, and a second digital signal processor operable to provide an output based on the second plurality of optical subcarriers, the output of the second digital processor including the second plurality of data streams. The selection circuit is coupled to the first digital signal processor and the second digital processor. The selection circuit is configured to selectively supply one of the output of the first digital signal processor and the output of the second digital processor.

In some implementations, the apparatus can include a first wavelength selective switch coupled to the first and second optical communication paths, the first wavelength selective switch being operable to receive the first plurality of optical subcarrier from the first transmitter and supply the first plurality of optical subcarriers to the first optical communication path, and the first wavelength selective switch being operable to receive the third plurality of optical subcarriers from the second optical communication path and provide the third plurality of optical subcarriers to the first receiver; and a second wavelength selective switch coupled to the first and second optical communication paths, the second wavelength selective switch being operable to receive the second plurality of optical subcarrier from the second transmitter and supply the second plurality of optical subcarriers to the second optical communication path, and the second wavelength selective switch being operable to receive the fourth plurality of optical subcarriers from the first optical communication path and provide the fourth plurality of optical subcarriers to the second receiver.

In some implementations, each optical subcarrier of the first plurality of optical subcarriers and each optical subcarrier of the second plurality of optical subcarriers can be a Nyquist subcarrier.

In some implementations, the optical signal provided by the first laser can have a first wavelength and the optical signal provided by the second laser can have a second wavelength different than the first wavelength.

In some implementations, each of the first plurality of optical subcarriers can have a corresponding one of a first plurality of frequencies, and each of the second plurality of optical subcarriers can have a corresponding one of a second plurality of frequencies.

In some implementations, each of the first plurality of frequencies can be different than each of the second plurality of frequencies.

In some implementations, each of the third plurality of optical subcarriers can have a corresponding one of the first plurality of frequencies, and each of the fourth plurality of optical subcarriers can have a corresponding one of the second plurality of frequencies.

Other implementations are directed to systems, devices, and non-transitory, computer-readable media having instructions stored thereon, that when executed by one or more processors, cause the one or more processors to perform operations described herein.

The details of one or more implementations are set forth in the accompanying drawings and the description below. Other features and advantages will be apparent from the description and drawings, and from the claims.

BRIEF DESCRIPTION OF THE DRAWINGS

FIG. 11C is a diagram of example pulse shape filters.

Like reference numbers and designations in the various drawings indicate like elements.

DETAILED DESCRIPTION

Figure 1A:
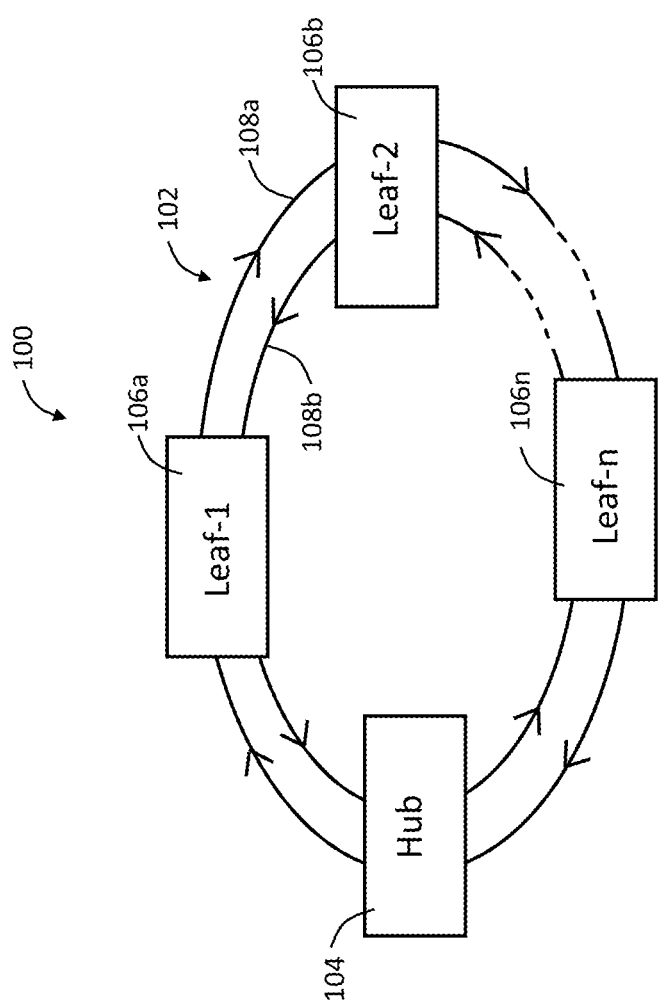
FIG. 1A is a diagram of an example optical communications network.

The present disclosure describes systems and methods for mitigating the effects of severed and/or malfunctioned optical links in an optical communications system.

In some implementations, a first network node (e.g., a first computer device) can transmit multiple instances of a particular portion of data to a second network node (e.g., a second computer device) concurrently using multiple different optical paths, each of the optical paths having one or more respective optical links. For example, the first network node can generate a first optical signal, modulate the first optical signal based on the data (e.g., using a first optical subcarrier), and transmit the optical signal to the second network node over a first optical path. Further, the first network node can generate a second optical signal based on the data (e.g., using a second optical subcarrier), and transmit the optical signal to the second network node over a second optical path different from the first optical path.

During normal operation (e.g., when both the first optical path and the second optical path are intact and do not have any malfunctioning optical links or equipment), the second network node can recover the data from the optical signal received from one of the optical links (e.g., by demodulating the optical signal received over that optical path). In some implementations, such an optical path may be referred to as a "working" path.

If one of the optical paths include severed or malfunctioning optical links or equipment, the second network node still can recover the data from the optical signals received from the other optical link (e.g., by demodulating the optical signal received over the other optical path). In some implementations, this other optical path may be referred to as a "protection" path. Accordingly, the connectivity between the first network node and the second network node can be maintained, despite severed or inoperable optical links.

In some implementations, one of the optical paths (e.g., a "working" path) may include malfunctioning optical links or equipment that enable optical signals to be conveyed between network nodes, but in a degraded form. For example, the optical signals exhibit a particular degree of attenuation, contain a particular amount of noise or other interference, or exhibit other characteristics that may make it more difficult to recover the data. In this situation, a network node can receive a second optical signal from another optical path (e.g., a "protection" path), compare the characteristics of the optical signals received from each optical path, and select one of the optical signals for further processing (e.g., based on an estimated quality of each of the optical signals). Accordingly, the connectivity between the first network node and the second network node can be maintained, despite malfunctioning optical links or equipment.

In some implementations, "working" paths and "protection" paths can be implemented as an access ring. For example, an access ring can include a first unidirectional optical path that communicatively couples multiple network nodes in a first sequence, and a second unidirectional optical path that communicatively couples the same network nodes in a second sequence, where the first sequence is the reverse of the second sequence. As a simplified example, if each of the network nodes are arranged in a circle, the first optical path can communicatively couple the network nodes by conveying optical signals to each of the network nodes in a sequence in a clockwise direction, and the second optical path can communicatively couple the network nodes by conveying optical signals to each of the same network nodes in a sequence in a counterclockwise direction. One of the optical paths can be implemented as a "working" path for at least some of the network nodes, and the other one of the optical paths can be implemented as a "protection" path for at least some of the network nodes.

In some implementations, at least some of the subcarriers described can be Nyquist subcarriers. A Nyquist subcarrier is a group of optical signals, each carrying data, where (i) the spectrum of each such optical signal within the group is sufficiently non-overlapping such that the optical signals remain distinguishable from each other in the frequency domain, and (ii) such group of optical signals is generated by modulation of light from a single laser. In general, each subcarrier may have an optical spectral bandwidth that is at least equal to the Nyquist frequency, as determined by the baud rate of such subcarrier.

Example systems and techniques for mitigating the effects of severed and/or malfunctioned optical links in an optical communications system are described in greater detail below and shown in the drawings.

I. Example System and Methods for Mitigating the Effects of Severed and/or Malfunctioned Optical Links in an Optical Communications System FIG. 1A shows an example optical communications network 100. The optical communications network 100 includes multiple network nodes that are communicatively coupled to one another by an access ring 102.

In this example, the network nodes include a hub node 104 ("Hub") and N leaf nodes 106a-106n ("Leaf-1," "Leaf-2," ... "Leaf-n"). Each of the network nodes can include one or more respective computer devices (e.g., server computers, client computers, etc.). In some implementations, the network nodes can be configured such that the hub node 104 transmits and/or receives data from each of the leaf nodes 106a-106n. For example, the hub node 104 can receive data (e.g., from another network node) that is intended for one of the leaf nodes 106a-106n, and route the data to that leaf node 106a-106n. As another example, a leaf node 106a-106n can generate data that is intended for another network device, and route the data to the hub node 104 for delivery to the intended network device. Although a single hub node 104, this is merely an illustrative example. In practice, an optical communications network can include any number of hub nodes. Similarly, an optical communications network can include any number of leaf nodes.

As shown in FIG. 1A, the network nodes are communicatively coupled to one another using an access ring 102. In this example, the access ring 102 includes two optical paths 108a and 108b (which may also be referred to as optical communication paths). The first optical path 108a communicatively couples the hub node 104 and the leaf nodes 106a-106n in a sequence in a first direction (e.g., a clockwise direction). The second optical path 108b communicatively couples the hub node 104 and the leaf nodes 106a-106n in a sequence in a second direction (e.g., a counterclockwise direction). Each of the optical paths 108a and 108b can be implemented using one or more optical links (e.g., optical fiber) and/or equipment interconnecting the optical links (e.g., line system components).

As described above, the optical communications network 100 can be configured to mitigate the effects of severed and/or malfunctioned optical links in the access ring 102.

Figure 2A:
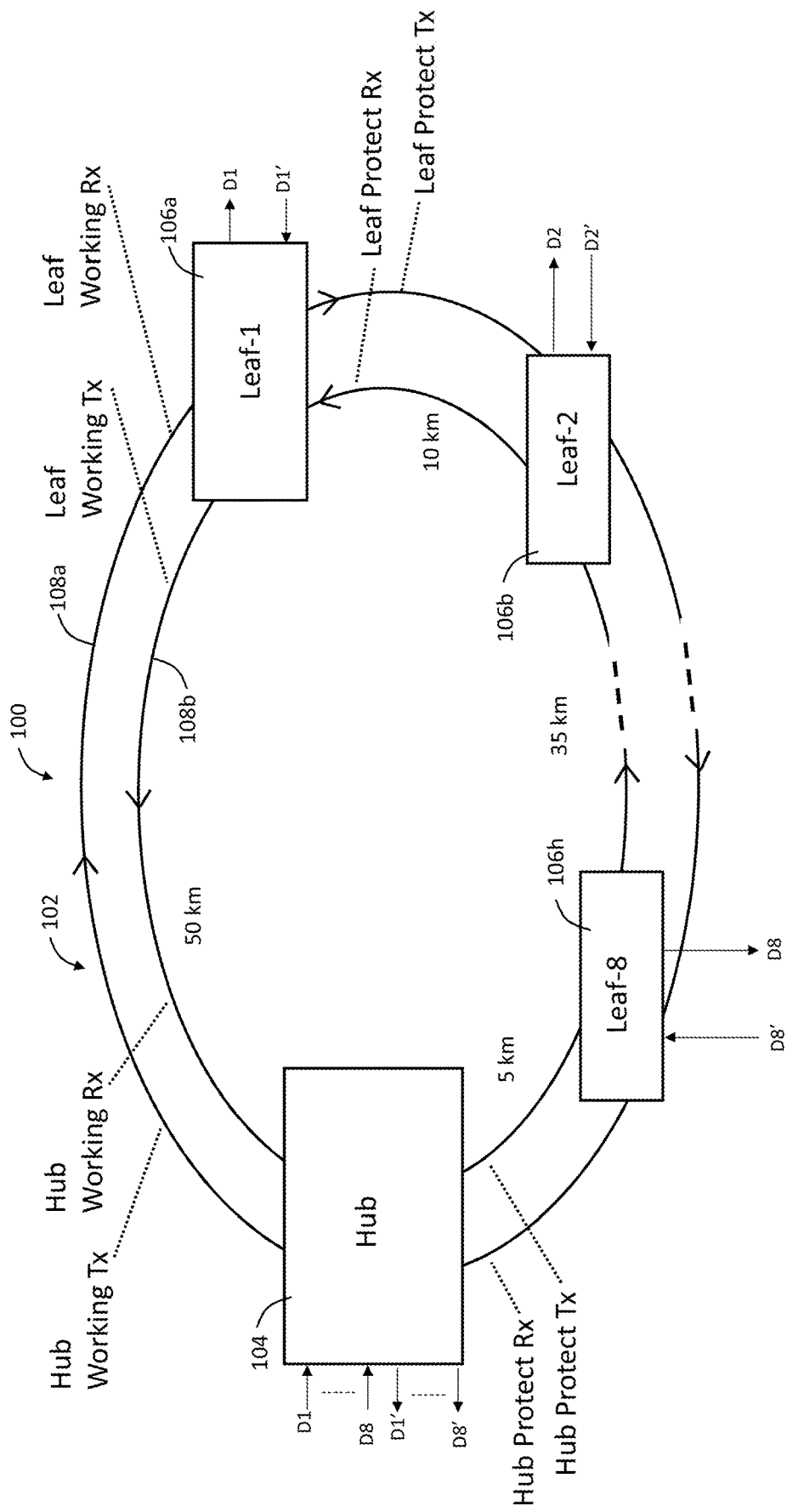
FIGS. 2A-2B are diagrams of an example process for transmitting data between nodes of an optical communications network.

For example, referring to FIG. 2A, the hub node 104 can be configured to transmit multiple instances of a particular portion of data to one of the more of the leaf nodes 106a-106n concurrently using the optical paths 108a and 108b. For instance, the hub node 104 can receive data intended for each of the leaf nodes 106a-106n (e.g., eight portions of data D1-D8 intended for eight leaf nodes 106a-106h, respectively). The hub node 104 can generate a first optical signal, modulate the first optical signal based on the data D1-D8 (e.g., using respective optical subcarriers assigned to or allotted to the leaf nodes 106a-106h), and transmit the first optical signal over the first optical path 108a. With reference to this data transmission, the first optical path 108a may be referred to as the "hub working Tx" path or the "leaf working Rx" path.

Further, the hub node 104 can generate a second optical signal, modulate the second optical signal based on the data D1-D8 (e.g., using respective optical subcarriers assigned to or allotted to the leaf nodes 106a-106h), and transmit the second optical signal over the second optical path 108b, concurrently with the transmission of the first optical signal over the optical path 108a. With reference to this data transmission, the second optical path 108b may be referred to as the "hub protect Tx" path or the "leaf protect Rx" path.

In some implementations, the information transmitted by the hub node 104 along the first optical path 108a can be identical to the information transmitted by the hub node 104 along the second optical path 108b.

In some implementations, the information transmitted by the hub node 104 along the first optical path 108a can be different from the information transmitted by the hub node 104 along the second optical path 108b. For example, the first information and the second information can include the same data modulated according to different digital subcarriers (e.g., as described above). As another example, the first information and the second information can include the same data transmitted according to different forward error correction (FEC) schemes (e.g., by including different FEC codes or bits). For instance, as shown in FIG. 2A, the length of the first optical path 108a from the hub node 104 to the leaf node 106b (e.g., 60 km) can be different from the length of the second optical path 108b from the hub node 104 and to leaf node 106b (40 km). Due to this difference, the hub node 104 can transmit data intended to the second leaf 106b according to different FEC schemes (e.g., by including different FEC codes or bits), depending on the optical path this is used.

During normal operation (e.g., when both the first optical path 108a and the second optical path 108b are intact and do not have any malfunctioning optical links or equipment), each of the leaf nodes 106a-106h can recover the respective data D1-D8 from the optical signal received from the first optical path 108a (e.g., by demodulating the optical signal received over that optical path, in particular the optical subcarrier that was assigned to or allotted to that leaf node). For example, referring to FIG. 2A, the leaf node 106a can recover the data D1, the leaf node 106b can recover the data D2, and so forth.

However, if the first optical path 108a includes severed or malfunctioning optical links or equipment, each of the leaf nodes 106a-106h can recover the respective data D1-D8 from the optical signal received from the second optical path 108b (e.g., by demodulating the optical signal received over that optical path, in particular the optical subcarrier that was assigned to or allotted to that leaf node. Accordingly, the connectivity between the hub node 104 and each of the leaf network 106a-106n can be maintained, despite malfunctioning optical links or equipment.

Further, each of the leaf nodes 106a-106n also can be configured to transmit multiple instances of a particular portion of data to the hub node 104 concurrently using the optical paths 108a and 108b. For instance, each of the leaf nodes 106a-106h can receive respective data D1'-D8' intended for the hub node 104. Each of the leaf nodes 106a-106h can generate a first optical signal, modulate the first optical signal based on a respective one of the data D1'-D8' (e.g., using respective optical subcarriers assigned to or allotted to the leaf nodes 106a-106h), and transmit the first optical signal over the second optical path 108b. With reference to this data transmission, the second optical path 108b may be referred to as the "leaf working Tx" path or the "hub working Rx" path.

Further, each of the leaf nodes 106a-106h can generate a second optical signal, modulate the second optical signal based on a respective one of the data D1'-D8' (e.g., using respective optical subcarriers assigned to or allotted to the leaf nodes 106a-106h), and transmit the second optical signal over the first optical path 108a, concurrently with the transmission of the first optical signal over the second optical path 108b. With reference to this data transmission, the first optical path 108a may be referred to as the "leaf protect Tx" path or the "hub protect Rx" path.

Similarly, in some implementations, the information transmitted by a leaf node 106a-106h along the first optical path 108a can be identical to the information transmitted by the leaf node 106a-106h along the second optical path 108b.

In some implementations, the information transmitted by a leaf node 106a-106h along the first optical path 108 can be different from the information transmitted by the leaf node 106a-106h along the second optical path 108b. For example, the first information and the second information can include the same data modulated according to different digital subcarriers (e.g., as described above). As another example, the first information and the second information can include the same data transmitted according to different forward error correction (FEC) schemes (e.g., by including different FEC codes or bits). For instance, as shown in FIG. 2A, the length of the first optical path 108a from the leaf node 106b to the hub node 104 (e.g., 40 km) can be different from the length of the second optical path 108b from the leaf node 106b to the hub node 104 (60 km). Due to this difference, the leaf node 106b can transmit data intended to the hub node 104 according to different FEC schemes (e.g., by including different FEC codes or bits), depending on the optical path this is used.

Similarly, during normal operation (e.g., when both the first optical path 108a and the second optical path 108b are intact and do not have any malfunctioning optical links or equipment), the hub node 104 can recover the data D1'-D8' from the optical signal received from the second optical path 108b (e.g., by demodulating the optical signal received over that optical path, in particular the optical subcarriers that are assigned to or allotted to each of the leaf nodes). For example, referring to FIG. 2A, the hub node 104 can recover the data D1'-D8'.

However, if the second optical path 108b includes severed or malfunctioning optical links or equipment, the hub node 104 can recover the data D1'-D8' from the optical signal received from the first optical path 108a (e.g., by demodulating the optical signal received over that optical path, in particular the optical subcarriers that are assigned to or allotted to each of the leaf nodes). Accordingly, the connectivity between the hub node 104 and each of the leaf network 106a-106n can be maintained, despite malfunctioning optical links or equipment.

As described above, each of the nodes can modulate an optical signal differently, depending on the intended destination of the data that is being transmitted. Further, each of the nodes can modulate an optical signal differently, depending on the optical path along which the optical signal is to be conveyed. The modulation of optical signals is described in greater detail with respect to FIG. 2B.

Figure 2B:
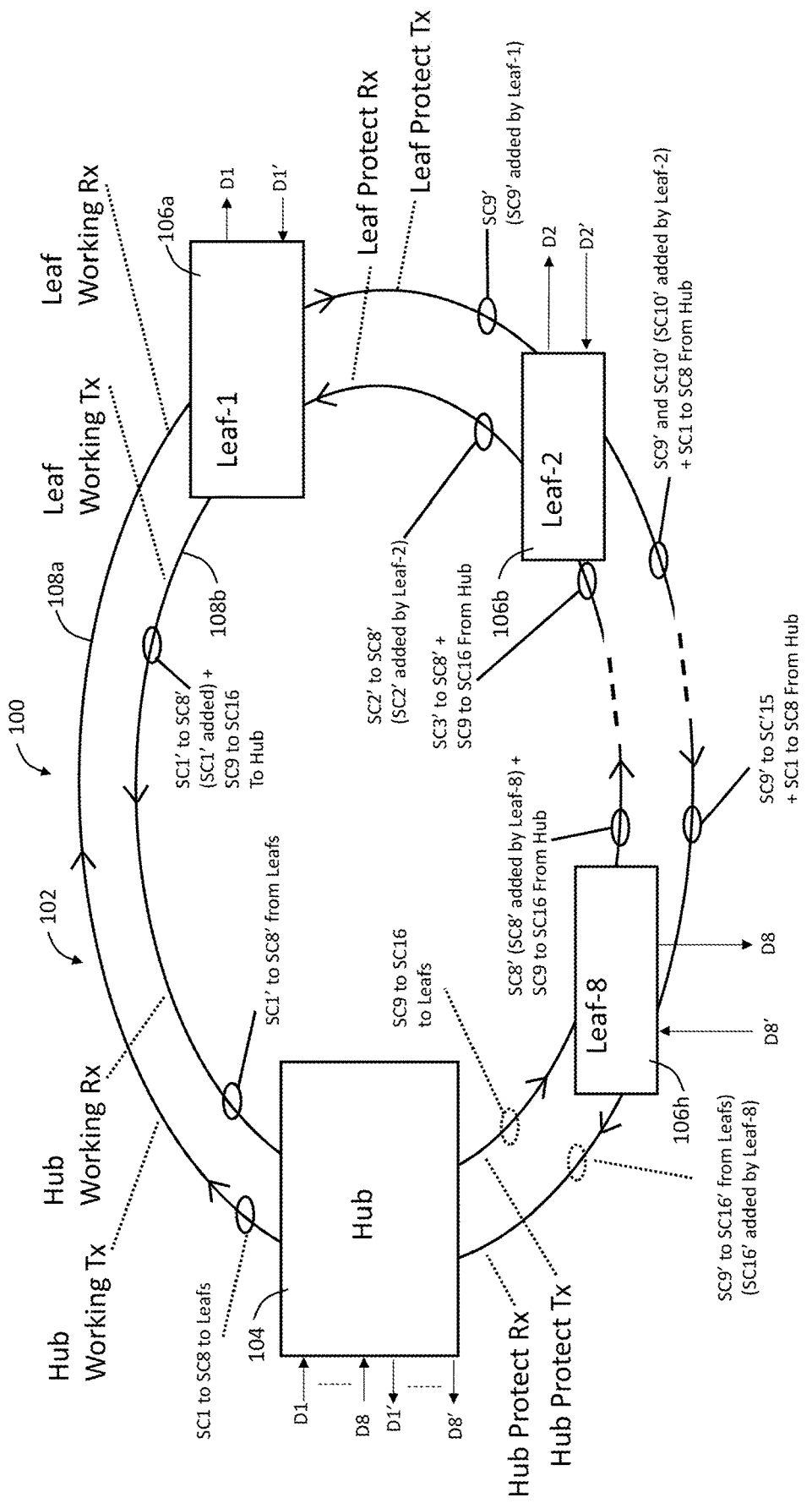
Figure 3:
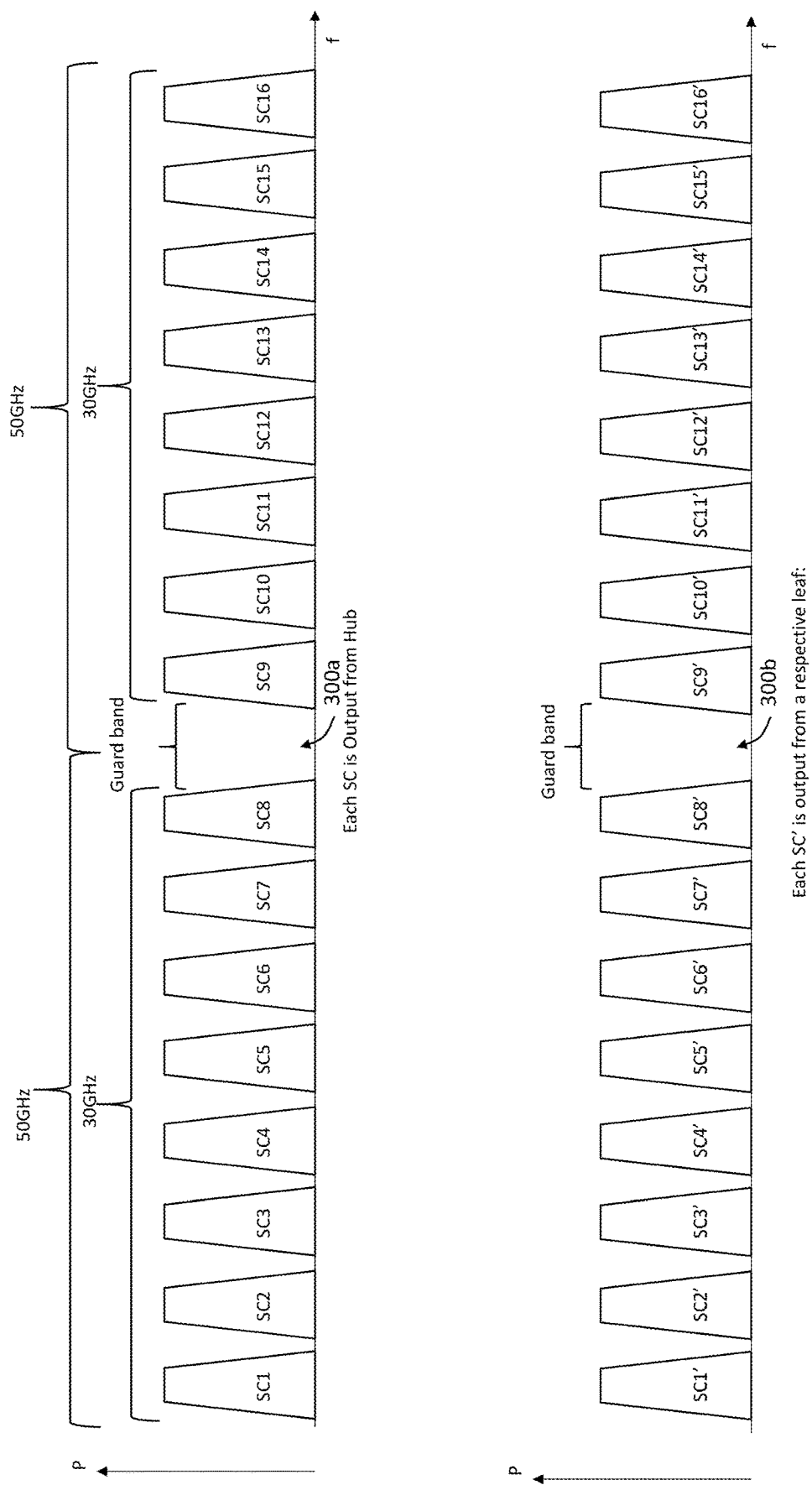
FIG. 3 is a diagram of example optical subcarriers according to a frequency domain.

Referring to FIG. 2B, the hub node 104 can be configured to transmit and receive data from each of the leaf nodes 106a-106h. Further, each of the leaf nodes 106a-106h is assigned respective optical subcarriers for transmitting and receiving data. For instance, a set of optical subcarriers SC1-SC16 and SC1'-SC'16 may be made available for use by the optical communication system 100 (e.g., as shown in FIG. 3), and each leaf node 106a-106h can be assigned respective optical subcarriers from the set for use. In this example, the leaf node 106a is assigned optical subcarriers SC1 and SC9 for receiving data, and optical subcarriers SC1' and SC9' for transmitting data. Further, the leaf node 106b is assigned optical subcarriers SC2 and SC10 for receiving data, and optical subcarriers SC2' and SC2' for transmitting data. Further, the leaf node 106h is assigned optical subcarriers SC8 and SC16 for receiving data, and optical subcarriers SC8' and SC16' for transmitting data.

The hub node 104 can transmit data to each of the leaf nodes 106a-106h using the optical paths 108a and 108b of the access ring 102. For example, the hub node 104 can transmit a first instance of the data D1 to the leaf node 106a by generating a first optical signal, modulating the first optical signal based on the data D1 using the optical subcarrier SC1, and transmitting the optical signal to the leaf node 106a using the first optical path 108a. Further, the hub node 104 can also transmit a second instance of the data D1 to the leaf node 106a, concurrently with the transmission of the first instance of the data D1, by generating a second optical signal, modulating the second optical signal based on the data D1 using the optical subcarrier SC9, and transmitting the optical signal to the leaf node 106a using the second optical path 108b.

The leaf node 106a can retrieve the data D1 by monitoring the first optical path 108a for optical signals, and demodulating any optical signals received along the first optical path 108a with respect to the optical subcarrier SC1. Further, the leaf node 106a can also retrieve the data D1 by monitoring the second optical path 108b for optical signals, and demodulating any optical signals received along the second optical path 108b with respect to the optical subcarrier SC9. During normal operation (e.g., when both the first optical path 108a and the second optical path 108b are intact and do not have any malfunctioning optical links or equipment), the leaf node 106a will receive multiple optical signals from the optical paths, each having a respective instance of the same data D1. The leaf node 106a can selectively recover the data D1 from the optical signal received over one of the optical paths (e.g., the first optical path 108a), and discard or otherwise ignore the optical signal received over the other optical path (e.g., the second optical path 108b).

The hub node 104 can transmit data to each of the other leaf nodes 106b-106h using a similar manner as described above, but using the optical subcarriers assigned to each of the leaf nodes 106b-106h instead. For example, the hub node 104 can transmit a first instance of the data D2 to the leaf node 106b by generating a first optical signal, modulating the first optical signal based on the data D2 using the optical subcarrier SC2, and transmitting the optical signal to the leaf node 106b using the first optical path 108a. Further, the hub node 104 can also transmit a second instance of the data D2 to the leaf node 106b, concurrently with the transmission of the first instance of the data D2, by generating a second optical signal, modulating the second optical signal based on the data D2 using the optical subcarrier SC10, and transmitting the optical signal to the leaf node 106b using the second optical path 108b.

Each of the leaf nodes 106b-106h can retrieve data from the hub node 104 in a similar manner as described above, but using the optical subcarriers assigned to each of the leaf nodes 106b-106h instead. For example, the leaf node 106b can retrieve the data D2 by monitoring the first optical path 108a for optical signals, and demodulating any optical signals received along the first optical path 108a with respect to the optical subcarrier SC2. Further, the leaf node 106b can also retrieve the data D2 by monitoring the second optical path 108b for optical signals, and demodulating any optical signals received along the second optical path 108b with respect to the optical subcarrier SC10. During normal operation (e.g., when both the first optical path 108a and the second optical path 108b are intact and do not have any malfunctioning optical links or equipment), the leaf node 106b will receive multiple optical signals from the optical paths, each having a respective instance of the same data D2. The leaf node 106b can selectively recover the data D2 from the optical signal received over one of the optical paths (e.g., the first optical path 108a), and discard or otherwise ignore the optical signal received over the other optical path (e.g., the second optical path 108b).

Further, each of the leaf nodes 106a-106h can also transmit data to the hub node 104 using the optical paths 108a and 108b of the access ring 102. For example, the leaf node 106a can transmit a first instance of the data D1' to the hub node 104 by generating a first optical signal, modulating the first optical signal based on the data D1' using the optical subcarrier SC1', and transmitting the optical signal to the hub node 104 using the second optical path 108b. Further, the leaf node 106a can also transmit a second instance of the data D1' to the hub node 104, concurrently with the transmission of the first instance of the data D1', by generating a second optical signal, modulating the second optical signal based on the data D1' using the optical subcarrier SC9', and transmitting the optical signal to the hub node 104 using the first optical path 108a.

The hub node 104 can retrieve the data D1' by monitoring the second optical path 108b for optical signals, and demodulating any optical signals received along the second optical path 108b with respect to the optical subcarrier SC1'. Further, the hub node can also retrieve the data D1' by monitoring the first optical path 108a for optical signals, and demodulating any optical signals received along the first optical path 108a with respect to the optical subcarrier SC9'. During normal operation (e.g., when both the first optical path 108a and the second optical path 108b are intact and do not have any malfunctioning optical links or equipment), the hub node will receive multiple optical signals from the optical paths, each having a respective instance of the same data D1'. The hub node 104 can selectively recover the data D1' from the optical signal received over one of the optical paths (e.g., the second optical path 108b), and discard or otherwise ignore the optical signal received over the other optical path (e.g., the first optical path 108a).

Each of the other leaf nodes 106b-106h can transmit data to the hub node 104 using a similar manner as described above, but using the optical subcarriers assigned to each of the leaf nodes 106b-106h instead. For example, the leaf node 106b can transmit a first instance of data D2' to the hub node 104 by generating a first optical signal, modulating the first optical signal based on the data D2' using the optical subcarrier SC2', and transmitting the optical signal to the hub node 104 using the second optical path 108b. Further, the leaf node 106b can also transmit a second instance of the data D2' to the hub node 104, concurrently with the transmission of the first instance of the data D2', by generating a second optical signal, modulating the second optical signal based on the data D2' using the optical subcarrier SC10', and transmitting the optical signal to the hub node 104 using the first optical path 108a.

The hub node 104 can retrieve data from each of the leaf nodes 106b-106h the hub node 104 in a similar manner as described above, but using the optical subcarriers assigned to each of the leaf nodes 106b-106h instead. For example, the hub node 104 can retrieve the data D2' by monitoring the second optical path 108b for optical signals, and demodulating any optical signals received along the second optical path 108b with respect to the optical subcarrier SC2'. Further, the leaf node 106b can also retrieve the data D2' by monitoring the first optical path 108a for optical signals, and demodulating any optical signals received along the first optical path 108a with respect to the optical subcarrier SC10'. During normal operation (e.g., when both the first optical path 108a and the second optical path 108b are intact and do not have any malfunctioning optical links or equipment), the hub node 104 will receive multiple optical signals from the optical paths, each having a respective instance of the same data D2'. The hub node 104 can selectively recover the data D2' from the optical signal received over one of the optical paths (e.g., the second optical path 108b), and discard or otherwise ignore the optical signal received over the other optical path (e.g., the first optical path 108a).

In some implementations, multiple optical signals can be transmitted by the nodes of the optical communications system 100 concurrently. For example, each of the nodes can receive optical signals along an optical path (e.g., from one or more other nodes preceding it in the access ring 102), and inject additional optical signals into the optical path (e.g., by multiplexing and/or superimposing the optical signals). For example, referring to FIG. 2B, the leaf node 106a can receive, from the first optical path 108a, optical signals having data modulated according to the optical subcarriers SC1-SC8 (e.g., corresponding to data transmitted by the hub node 104 to the leaf nodes 106a-106h, respectively). The leaf node 106a can inject an additional optical signal into the first optical path 106a (e.g., an optical signal having data modulated according to the optical subcarrier SC9'), such that the optical signal output from the leaf node 106a includes data modulated according to the optical subcarriers SC1-SC8 and SC9'.

FIG. 3 shows example sets of optical subcarriers SC1-SC16 and SC1'-SC'16 that may be made available for use by the optical communication system 100. In this example, the optical subcarriers SC1-SC16 are used to transmit data from the hub node 104 to the leaf nodes 106a-106h, and the optical subcarriers SC1'-SC16' are used to transmit data from the leaf nodes 106a-106h to the hub node 104. Further, the optical subcarriers SC1-SC8 are used to transmit data according to one optical path (e.g., the first optical path 108a, the "hub working Tx" path), whereas the optical subcarriers SC9-SC16 are used to transmit data according to the other optical path (e.g., the second optical path 108b, the "hub protect Tx" path). Similarly, the optical subcarriers SC1'-SC8' are used to transmit data according to one optical path (e.g., the second optical path 108b, the "leaf working Tx" path), whereas the optical subcarriers SC9'-SC16' are used to transmit data according to the other optical path (e.g., the first optical path 108a, the "leaf protect Tx" path).

In the example shown in FIG. 3, each of the optical subcarriers do not spectrally overlap one another in the frequency domain. Further, the subsets of optical subcarriers that are used by the hub node 104 to transmit data along different respective optical paths are spectrally continuous with one another, and do not spectrally overlap one another in the frequency domain. Further, the subsets of optical subcarriers that are used by the hub node 104 to transmit data along different respective optical paths are spectrally separated from one another in the frequency domain by a guard band 300a (e.g., a gap in the frequency domain). Further, the subsets of optical subcarriers that are used by the leaf nodes 106a-106h to transmit data along different respective optical paths are separated from one another in the frequency domain by a guard band 300b (e.g., a gap in the frequency domain). A guard band can be useful, for example, to eliminate or otherwise reduce signal interference between the different sets of optical subcarriers.

In some implementations, a guard band can be implemented by selectively "blocking" the optical subcarriers that are located spectrally between the two sets of optical subcarriers in the frequency domain. For example, if the subcarriers SC1 to SC16 are contiguous in the frequency domain, the optical subcarriers SC8 and SC9 can be "blocked," the optical subcarriers SC1 to SC7 can be used to transmit data along one optical path, and the optical subcarriers SC10 to SC16 can be used to transmit data along another optical path. In practice, the width of the guard band (e.g., the number of "blocked" optical subcarriers") can vary, depending on the implementation.

In some implementations, a guard band can be implemented by adjusting the frequency of the optical subcarriers, such that a frequency gap is formed between two sets of optical subcarriers in the frequency domain. For example, if the optical subcarriers SC1 to SC8 are used to transmit data along one optical path and the optical subcarriers SC9 to SC16 are used to transmit data along another optical path, the optical subcarriers SC1 and SC16 can be assigned different respective frequencies such that there is a frequency gap between the optical subcarriers SC8 and SC9. In practice, the width of the guard band (e.g., the frequency range of the guard band) can vary, depending on the implementation.

Additional details regarding selectively blocking optical subcarriers and/or selectively forming frequency gaps between optical subcarriers are described in further detail below.

Although FIG. 3 shows an example configuration of optical subcarriers, this is merely an illustrative example. In practice, any number of optical subcarriers can be used by each of the network nodes to transmit and/or receive data using the optical communications system 100. Further, although FIG. 3 shows an example configuration is which equal numbers of optical subcarriers are allotted for the transmission and/or reception of data along each of the optical paths, in practice, a different respective number of optical subcarriers are can allotted for the transmission and/or reception of data along different respective optical paths.

As an example, in some implementations, a subset of six optical subcarriers can allotted for the transmission and/or reception of data along a first optical path, and a subset of ten optical subcarriers can be allotted for the transmission and/or reception of data along a second optical path (with a guard band between the subsets of optical subcarriers).

As another example, in some implementations, four optical subcarriers can allotted for the transmission and/or reception of data along a first optical path, and twelve optical subcarriers can be allotted for the transmission and/or reception of data along a second optical path (with a guard band between the subsets of optical subcarriers).

As another example, in some implementations, a subset of eight optical subcarriers can allotted for the transmission and/or reception of data along a first optical path, some of which are not continuous with one another. Further, a subset of eight optical subcarriers can be allotted for the transmission and/or reception of data along a second optical path, some of which are not continuous with one another. For instance, optical subcarriers can be allotted for the transmission and/or reception of data along the optical paths according to an alternating pattern (e.g., the optical subcarriers SC1, SC3, SC5, . . . , etc. can be allotted for the transmission and/or reception of data along one of the optical paths, and the optical subcarriers SC2, SC4, SC6, . . . , etc. can be allotted for the transmission and/or reception of data along the other one of the optical paths).

Figure 4A:
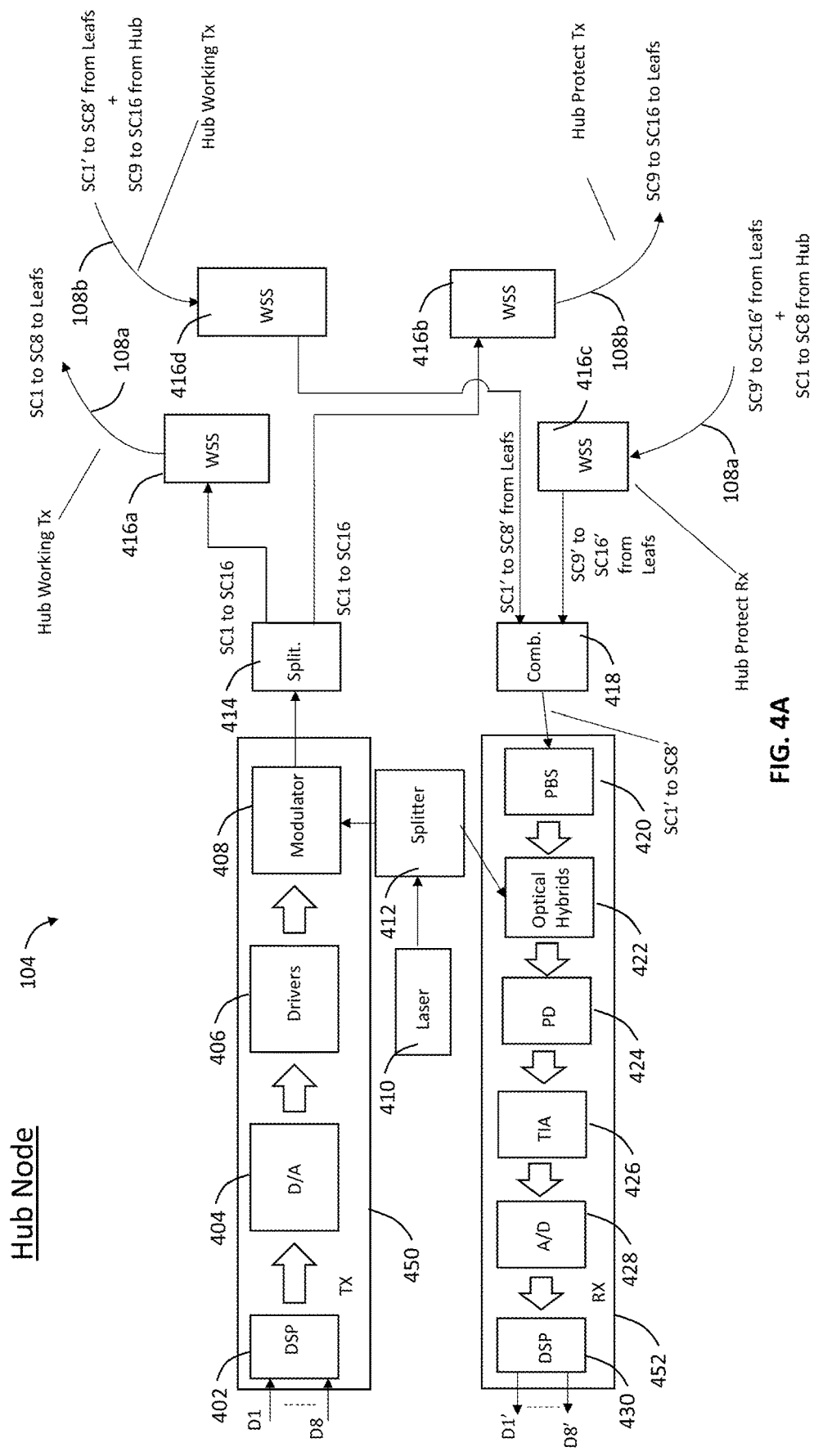
FIGS. 4A and 4B are diagrams of example hub nodes.

FIG. 4A shows an example of a hub node 104 in greater detail.

During an example data transmission operation of the hub node 104, a Tx processor 450 of the hub node 104 receives optical data D1 to D8 (intended for the leaf nodes 106a-106h, respectively) using an optical signal processor (DSP) 402. The data D1 to D8 is transmitted from the DSP 402 to an optical to analog converter (D/A) 404 (which also may be referred to as a digital-to-analog conversion circuitry). The D/A 404 converts the optical data into corresponding analog signal. The analog signals are provided to a laser driver 406 (which may also be referred to as driver circuitry). The driver 406 generates optical signals based on the analog signals. The generated optical signals are provided to a modulator 408, which modulates the optical signal with a carrier optical signal output by a laser 410 and an optical splitter 412. As an example, the modulated optical signal can include data modulated according to each of the optical subcarriers SC1 to SC16.

The modulated optical signal is provided to an optical splitter 414, which splits the modulated optical signal between two wavelength selective switches (WSSes) 416a and 416b (e.g., splits the modulated optical signal, such that the power of the optical signal is split among the WSSes 416a and 416b). The WSS 416a selects wavelengths of the modulated optical signal corresponding to a subset of the optical subcarriers (e.g., the optical subcarriers SC1-SC8), and injects the selected wavelengths of the modulated optical signal into the first optical signal path 108a (e.g., the "hub working Tx" path). The other WSS 416b selects wavelengths of the modulated optical signal corresponding to the other subset of the optical subcarriers (e.g., the optical subcarriers SC9-SC16), and injects the selected wavelengths of the modulated optical signal into the second optical signal path 108b (e.g., the "hub protect Tx" path).

During an example data receipt operation of the hub node 104, the hub node 104 receives a first optical signal from the first optical path 108a (e.g., the "hub protect Rx" path) using a WSS 416c, and receives a second optical signal from the second optical path 108b (e.g., the "hub working Tx" path) using a WSS 416d. The first optical signal can include, for example, a first instance of data D1'-D8' transmitted by the leaf nodes 106a-106h, respectively. Further, the second optical signal can include a second instance of the data D1'-D8' transmitted by the leaf nodes 106a-106h, respectively. The WSS 416c selects wavelengths of the first optical signal corresponding to a subset of the optical subcarriers (e.g., the optical subcarriers SC9'-SC16'), and provides the selected wavelengths to an optical combiner 420. Similarly, the WSS 416d selects wavelengths of the second optical signal corresponding to another subset of the optical subcarriers (e.g., the optical subcarriers SC1'-SC8'), and provides the selected wavelengths to the optical combiner 418.

The optical combiner 418 combines the selected wavelengths of light, and provides the combined wavelengths of light to one or more polarization beam splitters (PBSes) 420 of an Rx processor 452. The one or more PBSes 420 split the received light into different portions based on their polarization state (e.g., into TE and TM components), and provides the light to one or more optical hybrids 422 (which also may be referred to as optical hybrid circuitry). The one or more optical hybrids 422 demodulate the received wavelengths of light (e.g., based on a carrier signal provided by the laser 410 and the optical splitter 412), and outputs the demodulated light to a photodetector (PD) 424 (which may also be referred to as photodetector circuitry 424). The PD 424 generates electrical signals based on the received light. The electrical signals are provided to a trans-impedance amplifier (TIA) 426. The TIA 426 amplifies the received electrical signals, and provides the amplified electrical signals to an analog to an analog-to-digital converter (A/D) 428 (which may also be referred to as analog-to-digital conversion circuitry). The A/D 428 converts the amplified electrical signals to optical signals, and provides the optical signals to a DSP 42430. The DSP 430 processes the optical signals, and outputs the data D1'-D8'.

Although FIG. 4A shows an example hub node 104 having four WSSes 416a-416d, in some implementations, a hub node 104 can include a fewer number of WSSes. For example, referring to FIG. 4B, a hub node 104 can include two WSSes 416e and 416f. The WSS 416e can be configured to select wavelengths of light for transmission using the optical path 108a, and to select wavelengths of light received from the optical path 108b. The WSS 416f can be configured to select wavelengths of light for transmission using the optical path 108b, and to select wavelengths of light received from the optical path 108a.

As described above, during normal operation (e.g., when both the first optical path 108a and the second optical path 108b are intact and do not have any malfunctioning optical links or equipment), each of the leaf nodes 106a-106h can recover the respective data D1-D8 from the optical signal received from the first optical path 108a (e.g., by demodulating the optical signal received over that optical path, in particular the optical subcarrier that was assigned to or allotted to that leaf node). For example, the leaf node 106a can recover the data D1, the leaf node 106b can recover the data D2, and so forth. Similarly, the hub node 104 can recover the data D1'-D8' from the optical signal received from the second optical path 108b (e.g., by demodulating the optical signal received over that optical path, in particular the optical subcarriers that are assigned to or allotted to each of the leaf nodes). For example, the hub node 104 can recover the data D1'-D8'.

Figure 5:
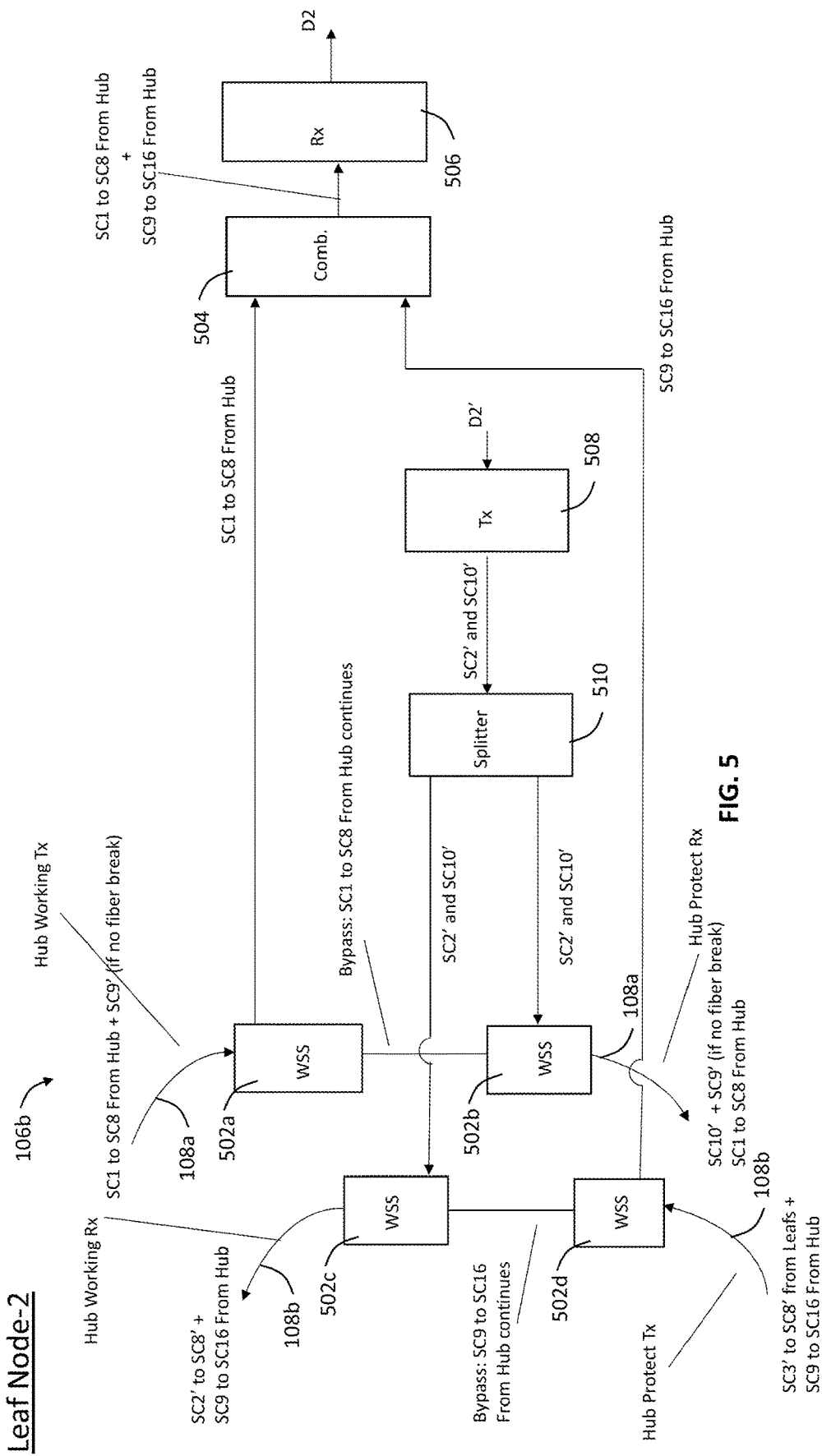
FIG. 5 is a diagram of an example leaf node.

As an illustrative example, the leaf node 106b is shown in greater detail in FIG. 5. During an example data receipt operation of the leaf node 106b, the leaf node 106b receives a first optical signal from the first optical path 108a (e.g., the "hub working Tx" path) at a WSS 502a. The WSS 502a selects the wavelengths of the optical signal corresponding to the subset of optical subcarriers used by the hub node 104 to transmit data along the first optical path 108a (e.g. SC1 to SC8), and provides the selected wavelengths to an optical combiner 504. Further, the leaf node 106b receives a second optical signal from the second optical path 108b (e.g., the "hub protect Tx" path) at a WSS 502b. The WSS 502b selects the wavelengths of the optical signal corresponding to another subset of optical subcarriers used by the hub node 104 to transmit data along the second optical path 108b (e.g. SC9 to SC16), and provides the selected wavelengths to the optical combiner 504. The optical combiner 504 combines the selected wavelengths, and provides the selected wavelengths to an Rx processor 506. The Rx processor 506 can be similar to the Rx processor 452 shown in FIG. 4A. The Rx processor 506 retrieves the data intended for the leaf node 106b (e.g., the data D2), and outputs the retrieved data for further processing. As an example, the Rx processor 506 can selectively demodulate the optical signal received from the optical combiner 504 according to the optical subcarriers SC2 and/or SC10 (e.g., to recover data D2), and discard or otherwise ignore the other portions of the optical signal. In some implementations, if the same instance of data is received using both of the optical subcarriers SC2 and SC10, the Rx processor 506 can select the instance of data received using one of the optical subcarriers (e.g., SC2, over the "hub working Tx" path), and discard or otherwise ignore the instance of the data received using the other optical subcarrier (e.g., SC10, over the "hub protect Tx" path).

Further, during an example data transmission operation of the leaf node 106b, the leaf node 106b receives optical data D2' (intended for the hub node 104) using a Tx processor 508. The Tx processor 508 can be similar to the Tx processor 450 shown in FIG. 4A. The Tx processor 508 generates an optical signal in which the data D2' is modulated according to the optical subcarriers SC2' and SC10', and provides the optical signal to an optical splitter 510. The optical splitter splits the optical signal between a WSS 502c and a WSS 502d. The WSS 502c selects wavelengths of light corresponding to one of the optical subcarriers used by the leaf node 106b to transmit data (e.g., the optical subcarrier SC2'), and injects the selected wavelengths of light into the second optical path 108b (e.g., the "hub working Rx" path). The WSS 502d selects wavelengths of light corresponding to the other one of the optical subcarriers used by the leaf node 106b to transmit data (e.g., the optical subcarrier SC10'), and injects the selected wavelengths of light into the first optical path 108a (e.g., the "hub protect Rx" path).

The hub node 104 can retrieve the data D2' based on the optical signals received from the optical path 108a and/or the optical path 108b (e.g., as described with respect to FIG. 4A). In some implementations, if the same instance of data is received using both of the optical subcarriers SC2' and SC10', the hub node 104 can select the instance of data received using one of the optical subcarriers (e.g., SC2', over the "hub working Rx" path), and discard or otherwise ignore the instance of the data received using the other optical subcarrier (e.g., SC10', over the "hub protect Rx" path).

Figure 6:
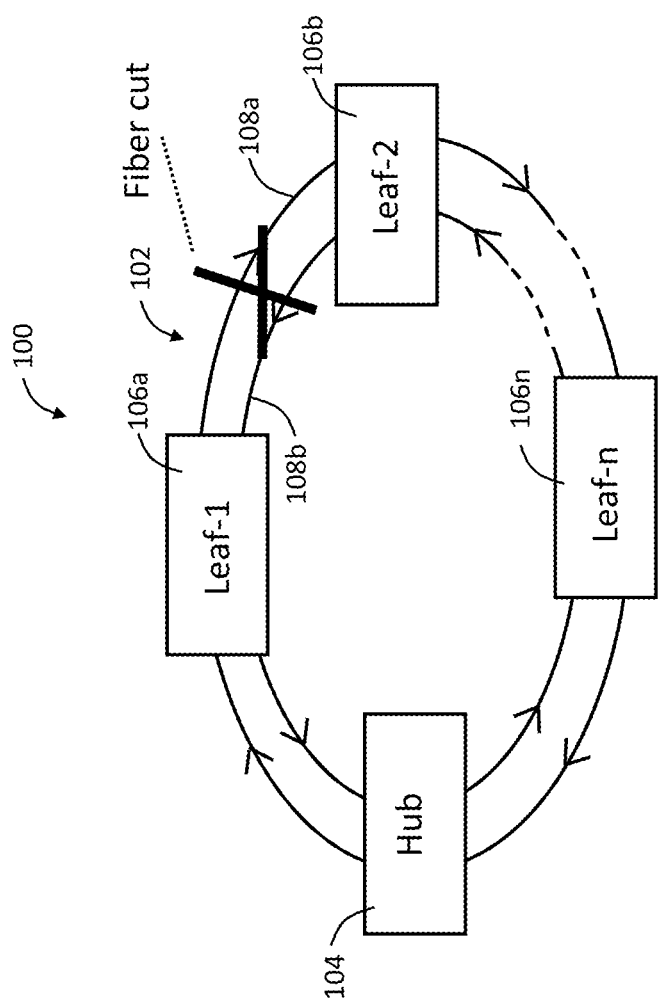
FIG. 6 is a diagram of an example severing of an optical path in an optical communications network.

However, if the first optical path 108a and/or the second optical path 108b include severed or malfunctioning optical links or equipment, one or more of the hub node 104 and/or the leaf nodes 106a-106h may not be able to receive optical signals in the manner described above. For example, referring to FIG. 6, if the first optical path 108a and the second optical path 108b are severed between the leaf nodes 106a and 106b (e.g., a "fiber cut" occurs between the leaf nodes 106a and 106b), the leaf node 106b may be unable to receive optical signals along the first optical path 108a. Further, optical signals transmitted by the leaf node 106b along the second optical path 108b may not reach the leaf node 106a or the hub node 104.

As described above, the leaf nodes 106a-106h can be configured to mitigate the effects of a severed optical link in the access ring 102. For example, if the first optical path 108a and the second optical path 108b are severed between the leaf nodes 106a and 106b, the leaf node 106b may be unable to receive optical signals along the first optical path 108a (e.g., no data is received from the "hub working Tx" path). However, the leaf node 106b can continue to receive optical signals from the second optical path 108b (e.g., the "hub protect Tx" path), and extract the data D2 from the received optical signal.

As another example, if the first optical path 108a and the second optical path 108b are severed between the leaf nodes 106a and 106b, the hub node 104 may be unable to receive optical signals from the leaf node 106b along the second optical path 108b (e.g., no data is received from the leaf node 1086 from the "hub working Rx" path). However, the hub node 104 can continue to receive optical signals from the leaf node 106b from the first optical path 108a (e.g., the "hub protect Rx" path), and extract the data D2' from the received optical signal.

As described above, in some implementations, the first optical path 108a and/or the second optical path 108b may include malfunctioning optical links or equipment that enable optical signals to be conveyed between network nodes, but in a degraded form. For example, the optical signals exhibit a particular degree of attenuation, contain a particular amount of noise or other interference, or exhibit other characteristics that may make it more difficult to recover the data. In this situation, a network node can receive a second optical signal from another optical path (e.g., a "protection" path), compare the characteristics of the optical signals received from each optical path, and select one of the optical signals for further processing (e.g., based on an estimated quality of each of the optical signals). Accordingly, the connectivity between the first network node and the second network node can be maintained, despite malfunctioning optical links or equipment.

For example, if the first optical path 108a and the second optical path 108b include malfunctioning optical links or equipment between the leaf nodes 106a and 106b, the leaf node 106b may receive degraded optical signals along the first optical path 108a. However, the leaf node 106b can continue to receive optical signals from the second optical path 108b (e.g., the "hub protect Tx" path). The leaf node 106b can compare the characteristics of optical signals received from each optical path, select one of the optical signals based on the comparison, and extract the data D2 from the selected optical signal. In some implementations, optical signals can be selected based on a measured or estimated latency associated with each of the optical signals (e.g., a latency associated with transmitting the optical signal from the hub node 104 to the leaf node 106b), a pre-forward error correction quality factor (pre-FEC Q) associated with each of the optical signals, one or more other factors, or any combination thereof. For example, optical signals having a lower latency and/or a higher pre-FEC Q may be selected over optical signals having a higher latency and/or a lower pre-FEC Q.

As another example, if the first optical path 108a and the second optical path 108b include malfunctioning optical links or equipment between the leaf nodes 106a and 106b, the hub node 104 may receive degraded optical signals along the second optical path 108b. However, the hub node 104 can continue to receive optical signals from the first optical path 108a (e.g., the "hub protect Rx" path) concurrently with the optical signals along the second optical path 108b. The hub node 104 can compare the characteristics of optical signals received from each optical path, select one of the optical signals based on the comparison, and extract the data D2' from the selected optical signal. In some implementations, optical signals can be selected based on a measured or estimated latency associated with each of the optical signals (e.g., a latency associated with transmitting the optical signal from the leaf node 106b to the hub node 104), a pre-FEC Q associated with each of the optical signals, one or more other factors, or any combination thereof. For example, optical signals having a lower latency and/or a higher pre-FEC Q may be selected over optical signals having a higher latency and/or a lower pre-FEC Q.

In some implementations, a leaf node 106a-106h can preferentially select optical signals transmitted by a source node (e.g., a hub 104) along a primary optical path having a shorter length from the source node to the leaf node 106a-106h, over optical signals transmitted by the source node along a secondary optical path having a longer length between the source node and the leaf node 106a-106h. Upon detecting an error in the reception of data along the primary optical path at a particular point in a data stream (e.g., an absence of data and/or the reception of degraded data due to a fiber cut or other malfunction), the leaf node 106a-106h can retrieve the remaining portion of the data stream from the secondary optical path instead. Accordingly, the leaf node 106a-106h can seamlessly retrieve data in a "hitless" matter, without the loss of data.

As an example, referring back to FIG. 2A, the length of the first optical path 108a from the hub node 104 to the leaf node 106b (e.g., 60 km) can be longer than the length of the second optical path 108b from the hub node 104 and to leaf node 106b (40 km). Due to this difference, the leaf node 106b can preferentially select optical signals transmitted by the hub node 104 along the second optical path 108b, over the optical signals transmitted along the first optical path 108a (e.g., by demodulating the optical signals received from the second optical path 108b to recover a stream of data packets 1 to N). Upon detecting an error in the reception of data along the second optical path 108b at a particular point of time (e.g., a data packet N+1 was not received the second optical path 108b within an expected time frame, or a degraded version of the data packet N+1 was received from the second optical path 108b), the leaf node 106b can retrieve the remaining portion of the data stream (data packets N+1, N+2, . . . etc.) from the first optical path 108a instead. Due to the differences in the length of the first optical paths 108a and 108b between the two nodes, the data that is transmitted by the hub node 104 to the leaf node 106b along the first optical path 108a is delayed relative to the data that is transmitted by the hub node 104 to the leaf node 106b along the second optical path 108b. This enables the leaf node 106b to switch from retrieving data from the second optical path 108b to the first optical path 108a upon to detection of an error, without missing any data in the data stream.

A similar technique can be used by a hub node to receive a stream of data packets from a leaf node. For example, a hub node can select optical signals transmitted by a leaf node along a primary optical path having a shorter length from leaf node to the hub node, over optical signals transmitted by the leaf node to the hub node along a secondary optical path having a longer length between the hub leaf node and the hub node. Upon detecting an error in the reception of data along the primary optical path at a particular point in a data stream (e.g., an absence of data and/or the reception of degraded data due to a fiber cut or other malfunction), the hub node can retrieve the remaining portion of the data stream from the secondary optical path instead.

In some implementations, a destination node can store data packets received from each of the optical paths in a respective data buffer. Further, the destination node can preferentially select, from the data buffers, data packets received from a primary optical path having a shorter length from the source node to the destination node, over data packets received from a secondary optical path having a longer length between the source node and the destination node. Upon detecting an error in the reception of data along the primary optical path at a particular point in a data stream (e.g., an absence of data and/or the reception of degraded data due to a fiber cut or other malfunction), the destination node can retrieve the remaining portion of the data stream from the secondary optical path instead.

This can be beneficial, for example, in implementations where the lengths of the optical paths between the source node and the destination node are similar or equal. For instance, in these implementations, the delay between the data streams received from the optical paths may be shorter than the time needed by the destination node to (i) detect an error in the transmission of the earlier data stream, and (ii) switch to retrieving data from the delayed data stream directly. In these implementations, (i) detect an error in the transmission of the earlier data stream, and (ii) retrieve a buffered version of the delayed data stream instead, such that no data is missed.

As described above, in some implementations, a network node can transmit multiple instances of the same data concurrently using multiple different optical paths. However, in some implementations, a network node can transmit one instance of data using one optical path. If a fault is detected in that optical path (e.g., the optical path is determined to have been severed or otherwise disrupted), the network node can transmit a second instance of the same data using a different optical path.

Figure 7A:
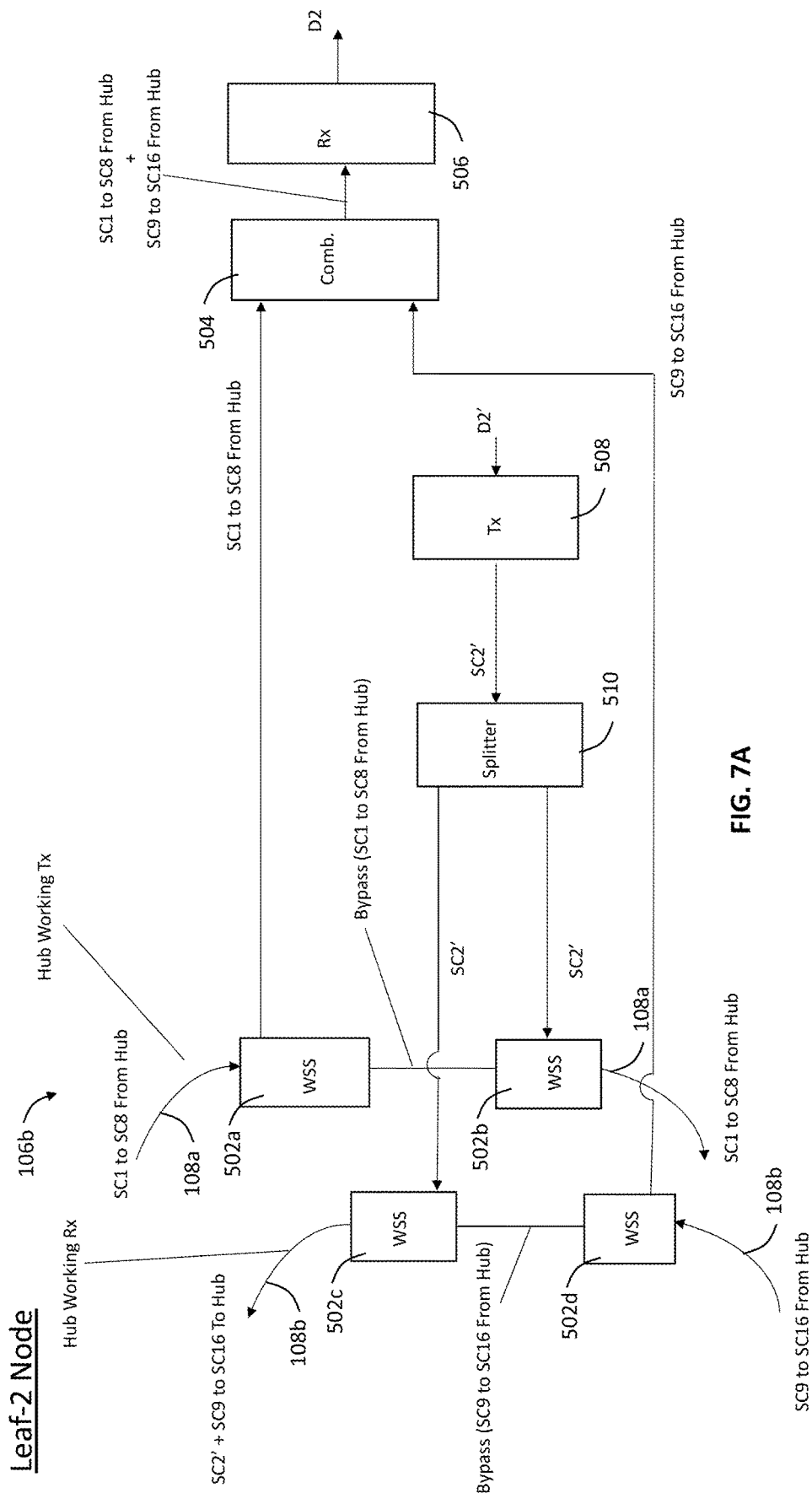
FIGS. 7A-7C are diagrams of example processes for receiving data using a leaf node.
Figure 7B:
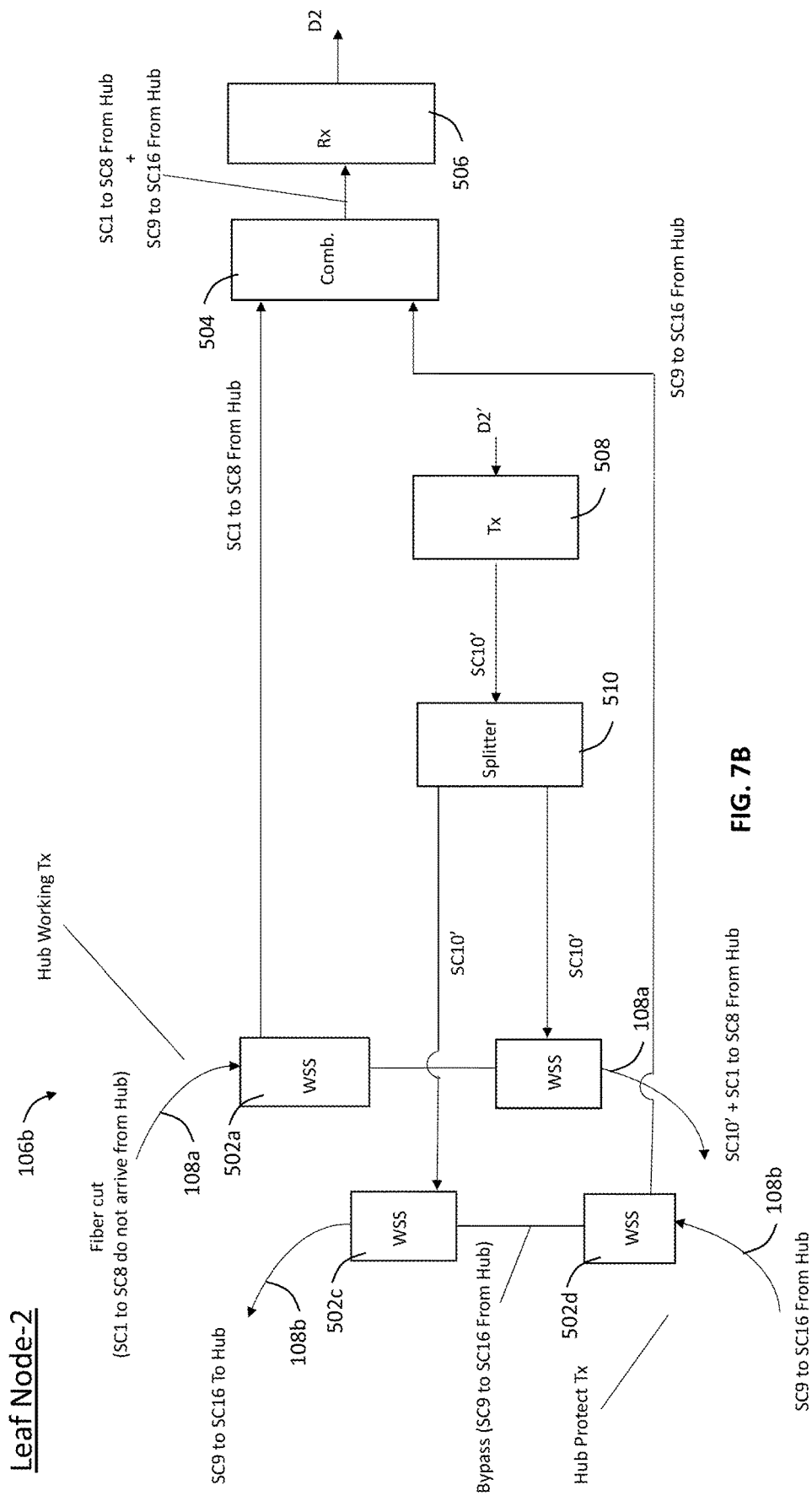

As an illustrative example, an example data receipt operation of the leaf node 106b is shown in FIGS. 7A and 7B. In general, one or more of the components shown in FIGS. 7A and 7B can be similar to those shown in FIG. 5.

As shown in FIG. 7A, during normal operation (e.g., when both the first optical path 108a and the second optical path 108b are intact and do not have any malfunctioning optical links or equipment), the leaf node 106b receives optical data D2' (intended for the hub node 104) using a Tx processor 508. The Tx processor 508 can be similar to the Tx processor 450 shown in FIG. 4A. The Tx processor 508 generates an optical signal in which the data D2' is modulated according to the optical subcarrier SC2', and provides the optical signal to the optical splitter 510. The optical splitter splits the optical signal between the WSS 502c and the WSS 502d. The WSS 502c selects wavelengths of light corresponding to the optical subcarrier SC2', and injects the selected wavelengths of light into the second optical path 108b (e.g., the "hub working Rx" path). The WSS 502d selectively blocks the wavelengths of light corresponding to the optical subcarrier SC2', such that it is not injected into the first optical path 108a (e.g., the "hub protect Rx" path). Accordingly, the leaf node 106b will not interfere with the optical signals received from the first optical path 108a, particularly the portion of the optical signal corresponding to the optical subcarrier SC2 generated by the hub node 104.

As described above, if the first optical path 108a and/or the second optical path 108b include severed or malfunctioning optical links or equipment, one or more of the hub node 104 and/or the leaf nodes 106a-106h may not be able to receive optical signals in the manner described above. For example, referring back to FIG. 6, if the first optical path 108a and the second optical path 108b are severed between the leaf nodes 106a and 106b (e.g., a "fiber cut" occurs between the leaf nodes 106a and 106b), any optical signals transmitted by the leaf node 106b along the second optical path 108b may not reach the leaf node 106a or the hub node 104.

Referring to FIG. 7B, to maintain connectivity with the hub node 104, the Tx processor 508 generates an optical signal in which the data D2' is modulated according to the optical subcarrier SC10', and provides the optical signal to the optical splitter 510. The optical splitter splits the optical signal between the WSS 502c and the WSS 502d. The WSS 502d selects wavelengths of light corresponding to the optical subcarrier SC10', and injects the selected wavelengths of light into the first optical path 108a (e.g., the "hub protect Rx" path). The WSS 502c selectively blocks the wavelengths of light corresponding to the optical subcarrier SC10', such that it is not injected into the second optical path 108b (e.g., the "hub protect Rx" path). Accordingly, the hub node 104 can continue to receive an instance of the data D2' from the leaf node 106b, despite a fiber cut in the access ring 102.

Figure 7C:
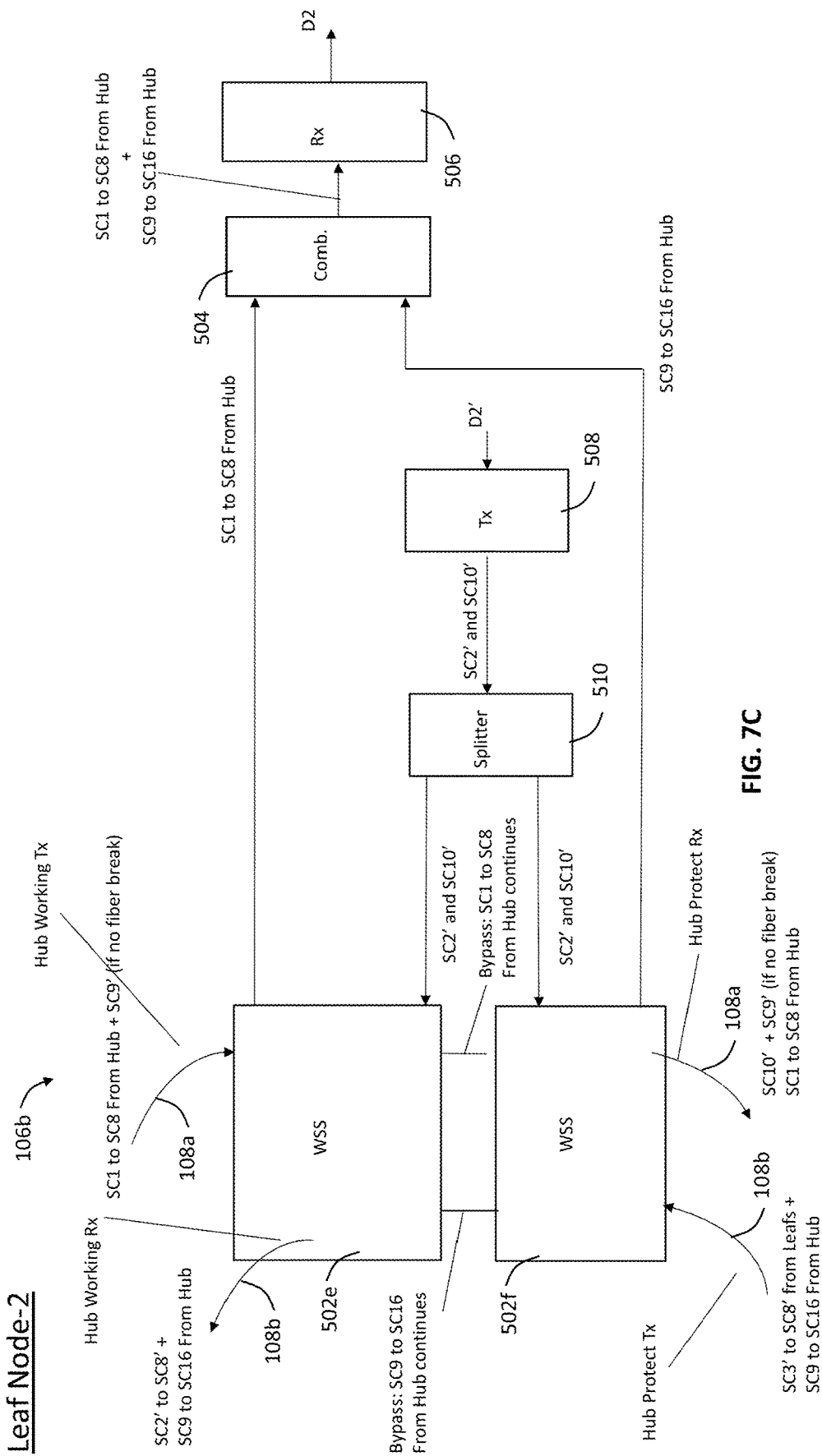

Although FIGS. 5, 7A, and 7B show an example leaf node 106b having four WSSes 502a-502d, in some implementations, a leaf node can include a fewer number of WSSes. For example, referring to FIG. 7C, a leaf node 106b can include two WSSes 502e and 502f. The WSS 502e can be configured to select wavelengths of light for transmission using the optical path 108b, and to select wavelengths of light received from the optical path 108a. The WSS 416f can be configured to select wavelengths of light for transmission using the optical path 108a, and to select wavelengths of light received from the optical path 108b.

In the examples shown above, a single hub node transmits and receives data from multiple leaf nodes. However, this need not be the case. For example, in some implementations, multiple hub nodes and transmit and receive data from multiple leaf nodes.

Figure 8:
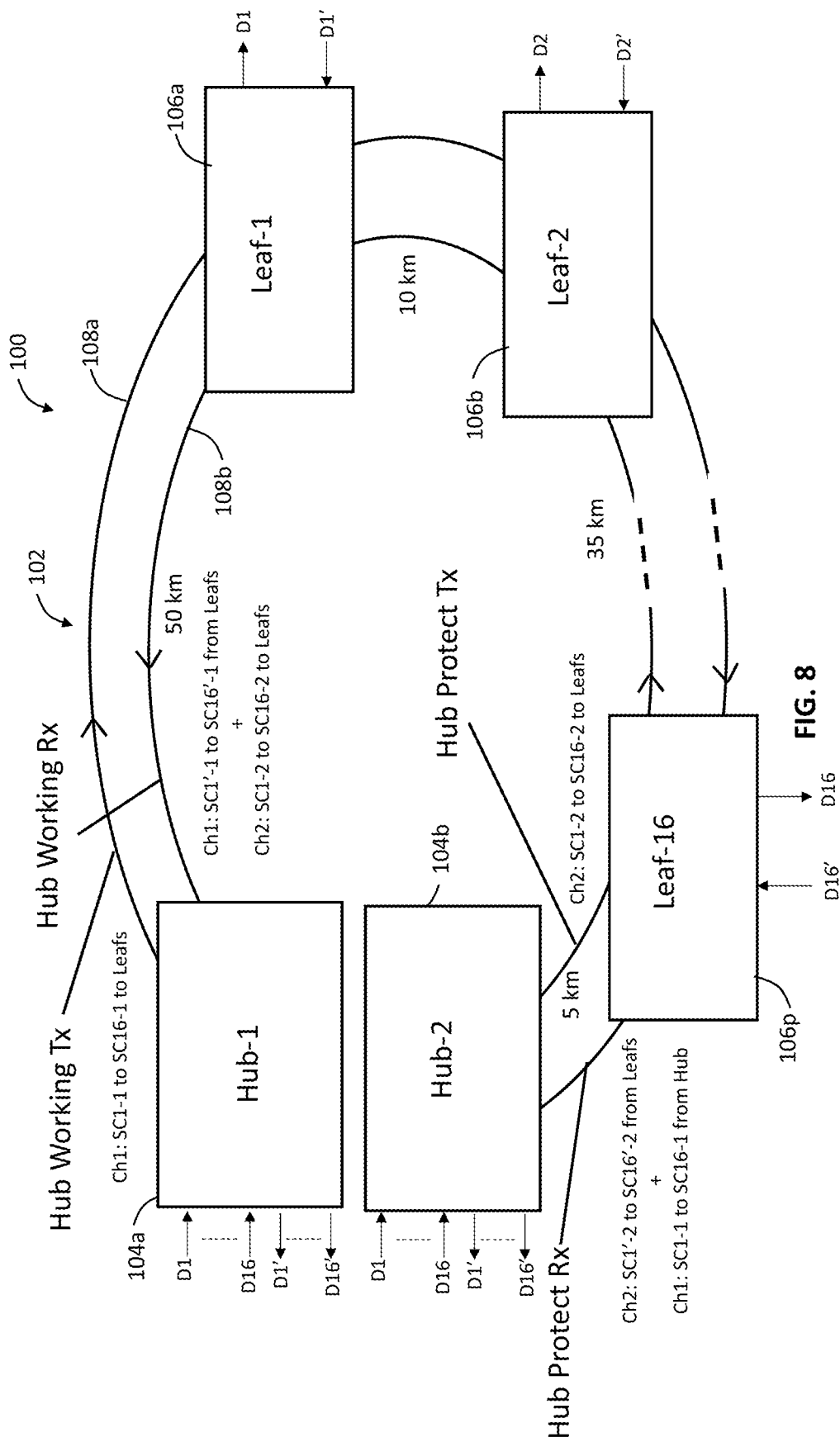
FIG. 8 is a diagram of another example process for transmitting data between nodes of an optical communications network.

An example optical communications system 100 having a dual hub node configuration is shown in FIG. 8. In general, each of the components shown in FIG. 8 can be similar to those shown in FIGS. 2A and 2B. However, in this example, the optical communication system 100 includes two hub nodes 104a and 104b instead of a single hub node 104, and sixteen leaf nodes 106a-106p instead of eight leaf nodes 106a-106h.

The two hub nodes 104a and 104b can coordinate with one another to send data to the leaf nodes 106h and/or to receive data from the leaf nodes 106a-106p. For instance, each of the hub nodes 104a and 104b can receive data intended for each of the leaf nodes 106a-106p (e.g., sixteen portions of data D1-D16 intended for sixteen leaf nodes 106a-106p, respectively). The first hub node 104a can generate a first optical signal, modulate the first optical signal based on the data D1-D16 (e.g., using respective optical subcarriers assigned to or allotted to the leaf nodes 106a-106p in a first channel "Ch1," SC1-1 to SC16-1), and transmit the first optical signal over the first optical path 108a (the "hub working Tx" path or the "leaf working Rx" path).

Further, the second hub node 104*b* can generate a second optical signal, modulate the second optical signal based on the data D1-D16 (e.g., using respective optical subcarriers assigned to or allotted to the leaf nodes 106*a*-106*p* in a second channel "Ch 2," SC1-2 to SC16-2), and transmit the second optical signal over the second optical path 108*b* (the "hub protect Tx" path or the "leaf protect Rx" path"), concurrently with the transmission of the first optical signal over the optical path 108*a*. In this manner, two hub nodes are used to transmit data concurrently to the leaf nodes 106*a*-106*p* along different respective optical paths, using optical subcarriers from two different channels.

In some implementations, the information transmitted by the first hub node 104*a* along the first optical path 108*a* can be identical to the information transmitted by the second hub node 104*b* along the second optical path 108*b*.

In some implementations, the information transmitted by the first hub node 104*a* along the first optical path 108*a* can be different from the information transmitted by the second hub node 104 along the second optical path 108*b*. For example, the first information and the second information can include the same data modulated according to different digital subcarriers (e.g., as described above). As another example, the first information and the second information can include the same data transmitted according to different forward error correction (FEC) schemes (e.g., by including different FEC codes or bits). For instance, as shown in FIG. 8A, the length of the first optical path 108*a* from the first hub node 104*a* to the leaf node 106*b* (e.g., 60 km) can be different from the length of the second optical path 108*b* from the second hub node 104*b* and to leaf node 106*b* (40 km). Due to this difference, the first hub node 104*a* and the second hub node 104*b* can transmit data intended to the second leaf 106*b* according to different FEC schemes (e.g., by including different FEC codes or bits), depending on the optical path this is used.

Further, the hub nodes 104*a* and 104*b* can receive data from the leaf nodes 106*a*-106*p* along different respective optical paths. For example, each of the leaf nodes 106*a*-106*p* can receive respective data D1'-D16' intended for the hub node 104. Each of the leaf nodes 106*a*-106*p* can generate a first optical signal, modulate the first optical signal based on a respective one of the data D1'-D16' (e.g., using respective optical subcarriers assigned to or allotted to the leaf nodes 106*a*-106*p* in the first channel "Ch1," SC1'-1 to SC16'-1), and transmit the first optical signal over the second optical path 108*b* (e.g., the "leaf working Tx" path or the "hub working Rx" path). The first optical signal is received by the hub node 104*a*, which demodulates the optical signal to retrieve the data D1'-D16'.

Further, each of the leaf nodes 106*a*-106*h* can generate a second optical signal, modulate the second optical signal based on a respective one of the data D1'-D16' (e.g., using respective optical subcarriers assigned to or allotted to the leaf nodes 106*a*-106*p* in the second channel "Ch2," SC1'-2 to SC16'-2), and transmit the second optical signal over the first optical path 108*a* ("leaf protect Tx" path or the "hub protect Rx" path), concurrently with the transmission of the first optical signal over the second optical path 108*b*. The second optical signal is received by the hub node 104*b*, which demodulates the optical signal to retrieve the data D1'-D16'. In this manner, two hub nodes are used to receive data concurrently from the leaf nodes 106*a*-106*p* along different respective optical paths, using optical subcarriers from two different channels.

In some implementations, the information transmitted by a leaf node 106*a*-106*h* along the first optical path 108*a* can be identical to the information transmitted by the leaf node 106*a*-106*h* along the second optical path 108*b*.

In some implementations, the information transmitted by a leaf node 106*a*-106*h* along the first optical path 108 can be different from the information transmitted by the leaf node 106*a*-106*h* along the second optical path 108*b*. For example, the first information and the second information can include the same data modulated according to different digital subcarriers (e.g., as described above). As another example, the first information and the second information can include the same data transmitted according to different forward error correction (FEC) schemes (e.g., by including different FEC codes or bits). For instance, as shown in FIG. 8A, the length of the first optical path 108*a* from the leaf node 106*b* to the second hub node 104*b* (e.g., 40 km) can be different from the length of the second optical path 108*b* from the leaf node 106*b* to the first hub node 104*a* (60 km). Due to this difference, the leaf node 106*b* can transmit data intended to the first and second hub nodes 104*a* and 104*b* according to different FEC schemes (e.g., by including different FEC codes or bits), depending on the optical path this is used.

If the first optical path 108*a* and/or the second optical path 108*b* include severed or malfunctioning optical links or equipment, one or more of the hub nodes 104*a* and 104*b* and/or the leaf nodes 106*a*-106*p* may not be able to receive optical signals in the manner described above. However, in a similar manner as described above, the components of the optical communication system 100 can be configured to mitigate the effects of a severed optical link in the access ring 102. For example, if the first optical path 108*a* and the second optical path 108*b* are severed between the leaf nodes 106*a* and 106*b*, the leaf node 106*b* may be unable to receive optical signals along the first optical path 108*a* (e.g., no data is received from the "hub working Tx" path). However, the leaf node 106*b* can continue to receive optical signals from the second optical path 108*b* (e.g., the "hub protect Tx" path), and extract the data D2 from the received optical signal.

As another example, if the first optical path 108*a* and the second optical path 108*b* are severed between the leaf nodes 106*a* and 106*b*, the first hub node 104*a* may be unable to receive optical signals from the leaf node 106*b* along the second optical path 108*b* (e.g., no data is received from the leaf node 108*b* from the "hub working Rx" path). However, the second hub node 104*b* can continue to receive optical signals from the leaf node 106*b* from the first optical path 108*a* (e.g., the "hub protect Rx" path), and extract the data D2' from the received optical signal. In some implementations, the second hub node 104*b* can provide the data to the first hub node 104*a*, such that it also has a record of the data.

Further, as described above, in some implementations, the first optical path 108*a* and/or the second optical path 108*b* may include malfunctioning optical links or equipment that enable optical signals to be conveyed between network nodes, but in a degraded form. For example, the optical signals exhibit a particular degree of attenuation, contain a particular amount of noise or other interference, or exhibit other characteristics that may make it more difficult to recover the data. In this situation, a network node can receive a second optical signal from another optical path (e.g., a "protection" path), compare the characteristics of the optical signals received from each optical path, and select one of the optical signals for further processing (e.g., based on an estimated quality of each of the optical signals). Accordingly, the connectivity between the first network node and the second network node can be maintained, despite malfunctioning optical links or equipment.

For example, if the first optical path 108a and the second optical path 108b include malfunctioning optical links or equipment between the leaf nodes 106a and 106b, the leaf node 106b may receive degraded optical signals along the first optical path 108a. However, the leaf node 106b can continue to receive optical signals from the second optical path 108b (e.g., the "hub protect Tx" path). The leaf node 106b can compare the characteristics of optical signals received from each optical path, select one of the optical signals based on the comparison, and extract the data D2 from the selected optical signal. In some implementations, optical signals can be selected based on a measured or estimated latency associated with each of the optical signals, a pre-FEC Q associated with each of the optical signals, one or more other factors, or any combination thereof. For example, optical signals having a lower latency and/or a higher pre-FEC Q may be selected over optical signals having a higher latency and/or a lower pre-FEC Q.

As another example, if the first optical path 108a and the second optical path 108b include malfunctioning optical links or equipment between the leaf nodes 106a and 106b, the first hub node 104a may receive degraded optical signals along the second optical path 108b. However, the second hub node 104b can continue to receive optical signals from the first optical path 108a (e.g., the "hub protect Rx" path) concurrently with the first hub node 104a receiving optical signals along the second optical path 108b. The hub nodes 104a and/or 104b can compare the characteristics of optical signals received from each optical path, select one of the optical signals based on the comparison, and extract the data D2' from the selected optical signal. In some implementations, optical signals can be selected based on a measured or estimated latency associated with each of the optical signals, a pre-FEC Q associated with each of the optical signals, one or more other factors, or any combination thereof. For example, optical signals having a lower latency and/or a higher pre-FEC Q may be selected over optical signals having a higher latency and/or a lower pre-FEC Q. In some implementations, the hub nodes 104a and 104b can exchange the data that they receive from the leaf nodes, such that each hub node 104a and 104b has a record of the data.

Figure 9:
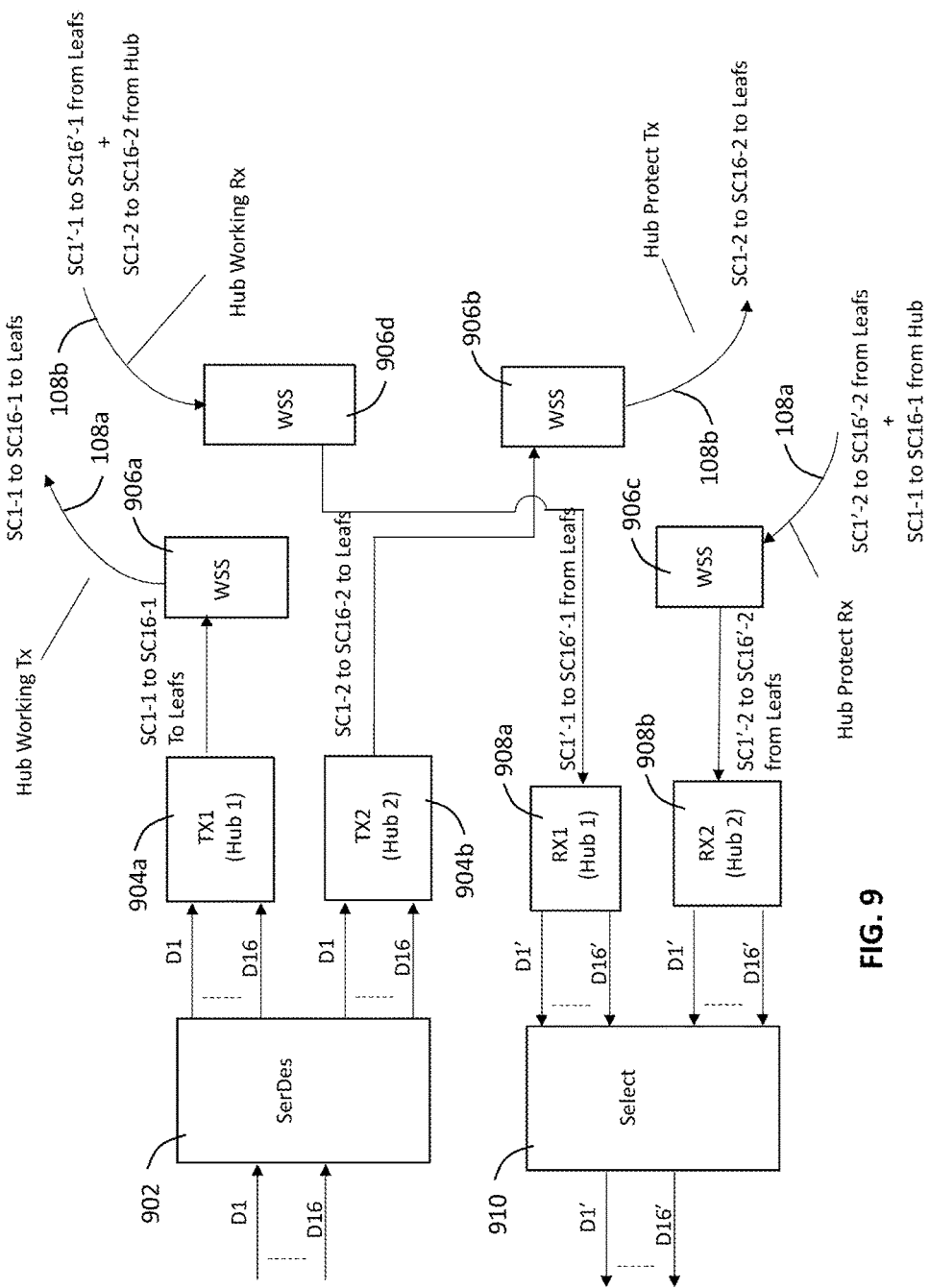
FIG. 9 is a diagram of example hub nodes.

FIG. 9 shows an example configuration of the hub nodes 104a and 104b for receiving data to be transmitted to the leaf nodes 106a-106p and receiving data from the leaf nodes 106a-106p (e.g., as described with respect to FIG. 8).

During an example data transmission operation of the hub nodes 104a and 104b, a Serializer/Deserializer (SerDes) 902 receives data optical data D1 to D16 (intended for the leaf nodes 106a-106p, respectively). The data D1 to D8 is transmitted from the SerDes 902 to a Tx processor 904a of the first hub node 104a, and to a Tx processor 904b of the second hub node 104b. In general, the Tx processors 904a and 904b can be similar to the Tx processor 450 shown in FIG. 4A. The Tx processor 904a generates a first optical signal including the data D1-D16 modulated according to each of the optical subcarriers SC1-1 to SC16-1 and provides it a WSS 906a. The Tx processor 904b generates a second optical signal including the data D1-D16 modulated according to each of the optical subcarriers SC1-2 to SC16-2 and provides it a WSS 906b.

The WSS 906a selects wavelengths of the modulated optical signal corresponding to a subset of the optical subcarriers (e.g., the optical subcarriers SC1-1-SC16-1), and injects the selected wavelengths of the modulated optical signal into the first optical signal path 108a (e.g., the "hub working Tx" path). The other WSS 906b selects wavelengths of the modulated optical signal corresponding to the other subset of the optical subcarriers (e.g., the optical subcarriers SC1-2-SC16-2), and injects the selected wavelengths of the modulated optical signal into the second optical signal path 108b (e.g., the "hub protect Tx" path).

During an example data receipt operation of the hub nodes 104a and 104b, a WSS 906c receives a first optical signal from the first optical path 108a (e.g., the "hub protect Rx" path), and a WSS 906d receives a second optical signal from the second optical path 108b (e.g., the "hub working Tx" path). The first optical signal can include, for example, a first instance of data D1'-D16' transmitted by the leaf nodes 106a-106p, respectively. Further, the second optical signal can include a second instance of the data D1'-D16' transmitted by the leaf nodes 106a-106p, respectively. The WSS 416c selects wavelengths of the first optical signal corresponding to a subset of the optical subcarriers (e.g., the optical subcarriers SC1'-2-SC16'-2), and provides the selected wavelengths to Rx processor 908b. Further, the WSS 416d selects wavelengths of the second optical signal corresponding to a subset of the optical subcarriers (e.g., the optical subcarriers SC1'-1-SC16'-1), and provides the selected wavelengths to Rx processor 908a. In general, the Rx processors 908a and 908b can be similar to the Rx processor 452 shown in FIG. 4A.

The Rx processors 908a and 908b demodulate the selected wavelengths of light to retrieve respective instances of the data D1'-D16', and provides the instances of the data D1'-D16' to a selection module 910. For each of the data D1'-D16', the selection module 910 can select the instance of the data provided by one of the Rx processors over the other. For example, as described above, if the selection module 910 only receives a single instance of data from a particular leaf node (e.g., due to a fiber cut in the access ring 102), the selection module 910 can select that instance of data and output it for further processing (e.g., via an output port 912). Further, as described above, if the selection module 910 receives multiple instances of data from a particular leaf node, the selection module 910 can select one of the instances of data based on one more section factors, and output the selected instance of data for further processing (e.g., via an output port 912). For example, as described above, optical signals can be selected based on a measured or estimated latency associated with each of the optical signals received by the hub nodes 104a and 104b, a pre-FEC Q associated with each of the optical signals, one or more other factors, or any combination thereof.

Examples of data allocation and subcarrier transmission are described next with reference to FIGS. 10 and 11A-11C.

Figure 10:
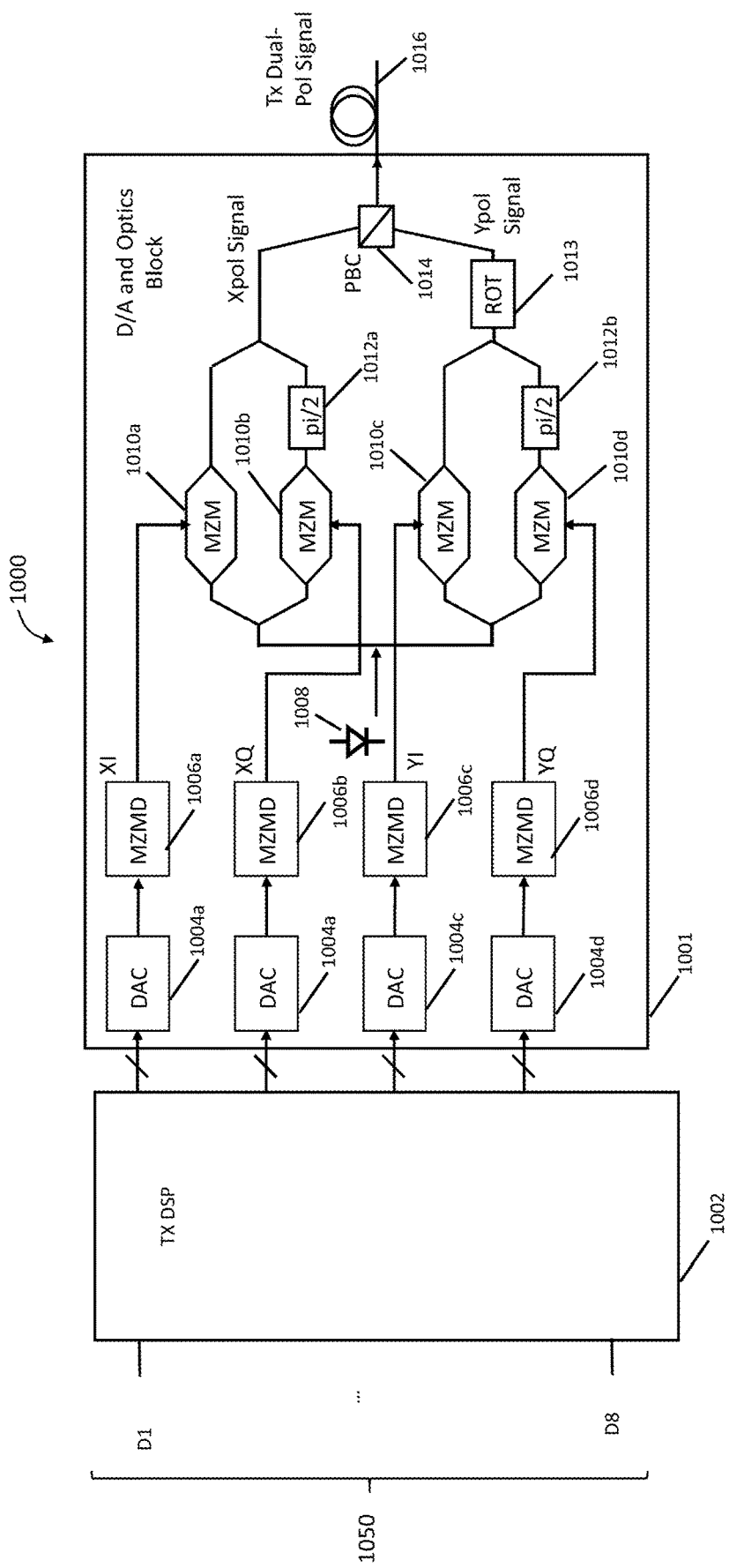
FIG. 10 is a diagram of an example transmitter than can be included in a network node.

FIG. 10 illustrates an example transmitter 1000 than can be included in a network node (e.g., one or more of the hub nodes 104, 104a, and 104b, or leaf nodes 106a-106n described above). The transmitter 1000 includes several inputs 1050 (e.g., to receiving respective data D1-D8), as well as a transmitter DSP (Tx DSP) 1002 and a D/A and optics block 1001. In this example, 8 inputs 1050 are shown, although more or fewer inputs may be provided than that shown in FIG. 10.

Based on the signal received from the inputs 1050, the DSP 1002 may supply several outputs to D/A and optics block 1001 including optical-to-analog conversion (DAC) circuits 1004a 1004d (which may be referred to collectively as DACs 1004), which convert optical signal received from the DSP 1002 into corresponding analog signals. The D/A and optics block 1001 also includes driver circuits 1006a to 1006d (which may be referred to collectively as driver circuits 1006) that receive the analog signals from the DACs 1004a to 1004d and adjust the voltages or other characteristics thereof to provide drive signals to a corresponding one of the modulators 1010a to 1010d.

The D/A and optics block 1001 further includes modulators 1010a to 1010d (which may be referred to collectively as modulators 1010 or optical modulators 1010), each of which may be, for example, a Mach-Zehnder modulator (MZM) that modulates the phase and/or amplitude of the light output from a laser 1008. As further shown in FIG. 10, light output from the laser 1008, also included in the block 1001, is split such that a first portion of the light is supplied to a first MZM pairing, including MZMs 1010a and 1010b, and a second portion of the light is supplied to a second MZM pairing, including MZMs 1010c and 1010d. The first portion of the light is split further into third and fourth portions, such that the third portion is modulated by MZM 1010a to provide an in-phase (I) component of an X (or TE) polarization component of a modulated optical signal, and the fourth portion is modulated by MZM 1010b and fed to phase shifter 1012a to shift the phase of such light by 90 degrees in order to provide a quadrature (Q) component of the X polarization component of the modulated optical signal. Similarly, the second portion of the light is further split into fifth and sixth portions, such that the fifth portion is modulated by MZM 1010c to provide an I component of a Y (or TM) polarization component of the modulated optical signal, and the sixth portion is modulated by MZM 1010d and fed to phase shifter 1012b to shift the phase of such light by 90 degrees to provide a Q component of the Y polarization component of the modulated optical signal.

The optical outputs of the MZMs 1010a and 1010b are combined to provide an X polarized optical signal including I and Q components and are fed to a polarization beam combiner (PBC) 1014 provided in the block 1001. In addition, the outputs of the MZMs 1010c and 1010d are combined to provide an optical signal that is fed to a polarization rotator 1013, further provided in the block 1001, that rotates the polarization of such optical signal to provide a modulated optical signal having a Y (or TM) polarization. The Y polarized modulated optical signal also is provided to the PBC 1014, which combines the X and Y polarized modulated optical signals to provide a polarization multiplexed ("dual-pol") modulated optical signal onto optical fiber 1016, for example, which may be included as a segment of optical fiber in the optical paths 108a and/or 108b.

The polarization multiplexed optical signal output from D/A and optics block 1001 includes subcarriers SC1-SC8 noted above, such that each subcarrier has X and Y polarization components and I and Q components. Moreover, each subcarrier SC1 to SC8 may be associated with or corresponds to a respective one of the inputs 1150.

In some implementations, the DSP 1002 can be similar to the DSP 450 shown in FIG. 4A.

Figure 11A:
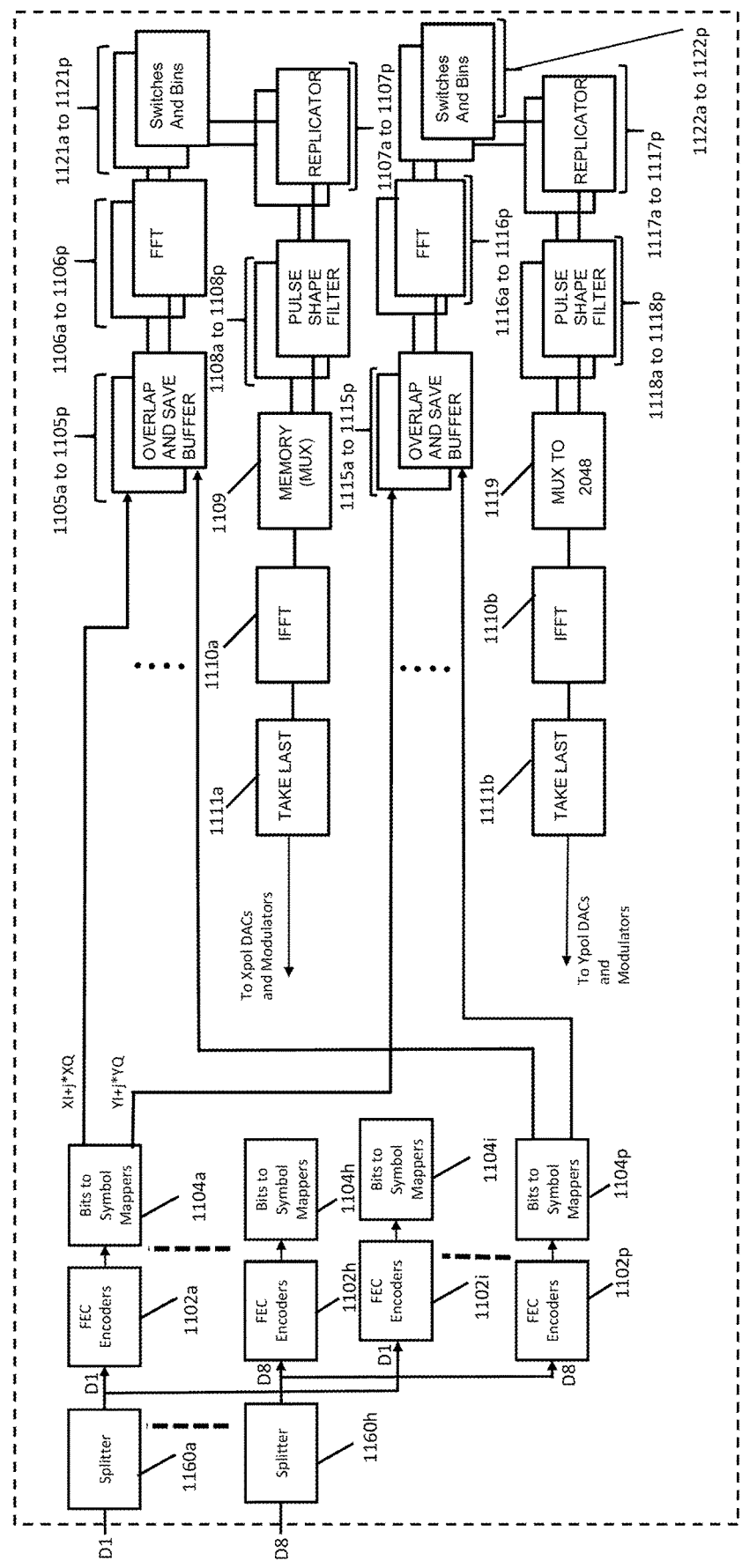
FIG. 11A is a diagram of an example digital signal processor (DSP).

FIG. 11A shows an example of DSP 1002 in greater detail. The DSP 1002 can include splitters 1160a to 1160h (which may be referred to collectively as splitters 1160). Each of the splitters 1160a to 1160h receives a respective one of the inputs 1050 (e.g., one of data D1-D8), splits the received input into two signals, and provides each of the signals to a respective one of FEC encoders 1102a to 1002p (which may be referred to collectively as FEC encoders 1102). FEC encoders 1102a to 1102p carry out forward error correction coding on a corresponding one of the signals, such as, by adding parity bits to the received data. The FEC encoders 1102a to 1102p may also provide timing skew between the subcarriers to correct for skew induced by link between network nodes (e.g., one or more of the hub nodes 104, 104a, and 104b, or leaf nodes 106a-106n described above). In addition, the FEC encoders 1102a to 1102p may interleave the received data.

Each of the FEC encoders 1102a-1102p provides an output to a corresponding one of a plurality of bits-to-symbol circuits, 1104a-1104p. Each of the bits-to-symbol circuits 1104a-1104p (which may be referred to collectively as bits-to-symbol circuits 1104) may map the encoded bits to symbols on a complex plane. For example, bits-to-symbol circuits 1104a-1104p may map four bits to a symbol in a dual-polarization QPSK constellation. Each of bits-to-symbol circuits 1104a-1104p provides first symbols, having the complex representation XI+j*XQ, associated with a respective one of the inputs 1150, such as D1, to DSP portion 1103. Data indicative of such first symbols is carried by the X polarization component of each subcarrier SC-1-SC-16.

Each of bits-to-symbol circuits 1104a-1104p further can provide second symbols having the complex representation YI+j*YQ, also associated with a corresponding output of outputs. Data indicative of such second symbols, however, is carried by the Y polarization component of each of subcarriers SC-1 to SC-16.

Such mapping, as carried by about circuit 1104a to 1004p define, in one example, a particular modulation format for each subcarrier. That is, such circuit may define a mapping for all the optical subcarrier that is indicative of a binary phase shift keying (BPSK) modulation format, a quadrature phase shift keying (QPSK) modulation format, or an m-quadrature amplitude modulation (QAM, where m is a positive integer, e.g., 4, 8, 16, or 64) format. In another example, one or more of the optical subcarriers may have a modulation format that is different than the modulation format of other optical subcarriers. That is, one of the optical subcarriers have a QPSK modulation format and another optical subcarrier has a different modulation format, such as 8-QAM or 16-QAM. In another example, one of the optical subcarriers has an 8-QAM modulation format and another optical subcarrier has a 16 QAM modulation format. Accordingly, although all the optical subcarriers may carry data at the same data and or baud rate, consistent with an aspect of the present disclosure one or more of the optical subcarriers may carry data at a different data or baud rate than one or more of the other optical subcarriers. Moreover, modulation formats, baud rates and data rates may be changed over time depending on capacity requirements, for example. Adjusting such parameters may be achieved, for example, by applying appropriate signals to mappers 1104 based on control information or data described herein and the communication of such data as further disclosed herein between hub and leaf nodes.

As further shown in FIG. 11A, each of the first symbols output from each of bits-to-symbol circuits 1104a-1104p is supplied to a respective one of first overlap and save buffers 1105a-1105p (which may be referred to collectively as overlap and save buffers 1105) that may buffer 256 symbols, for example. Each of the overlap and save buffers 1105a-1105p may receive 128 of the first symbols or another number of such symbols at a time from a corresponding one of bits to symbol circuits 1104a-1104p. Thus, overlap and save buffers 1105a-1105p may combine 128 new symbols from bits to symbol circuits 1104a-1104p, with the previous 128 symbols received from bits to symbol circuits 1104a-1104p.

Each overlap and save buffer 1105a-1105p supplies an output, which is in the time domain, to a corresponding one of fast Fourier Transform (FFT) circuits 1106a-1106p (which may be referred to collectively as FFT circuits 1106).

In one example, the output includes 256 symbols or another number of symbols. Each of the FFTs 1106a-1106p converts the received symbols to the frequency domain using or based on, for example, a fast Fourier transform. Each of the FFTs 1106a-1106p can provide the frequency domain data to bins and switches blocks 1121a-1121p (which may be referred to collectively as bins and switches blocks 1121). As discussed in greater detail below, bins and switches blocks 1121a-1121p can include, for example, memories or registers, also referred to as frequency bins (FB) or points, that store frequency components associated with each subcarrier SC.

Figure 11B:
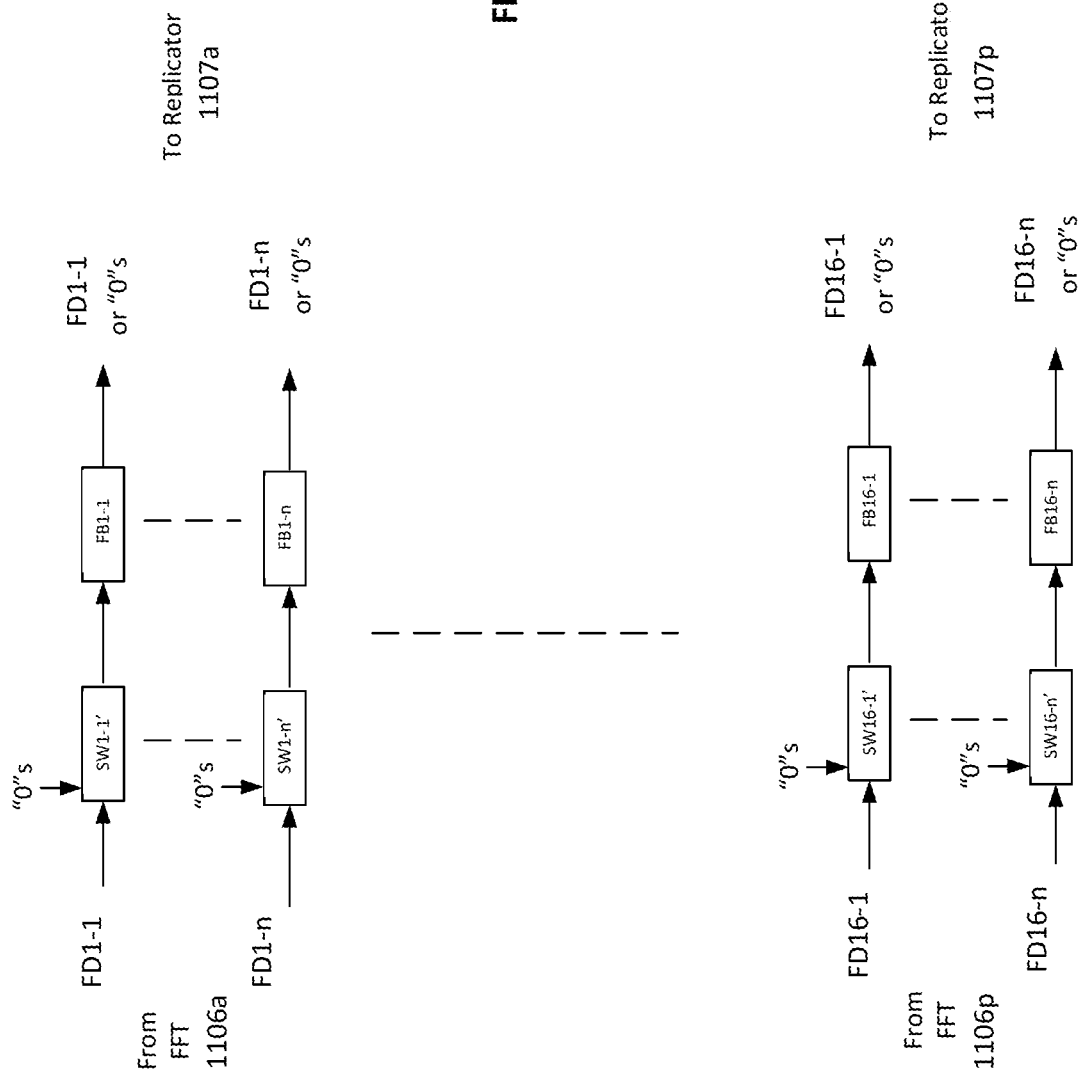
FIG. 11B is a diagram of example frequency bins.

Selected frequency bins FB are shown in FIG. 11B. In some implementations, the frequency bins FB can be included, for example, in a DSP (e.g., the DSP 1002 described with respect to FIG. 11A). Groups of such frequency bins FB are associated with given subcarriers. Accordingly, for example, a first group of frequency bins, FB1-1 to FB1-n is associated with SC1 and a second group of frequency bins FB16-1 to FB16-n with SC16 (where n is a positive integer). As further shown in FIG. 11B, each of frequency bins FB is further coupled to a respective one of the outputs from switches SW1-1' to SW1-n' and SW16-1' to SW16-n'.

Each of the inputs 1050 selectively supplies either frequency domain data output from one of FFT circuits 1106a to 1106p or a predetermined value, such as 0. In order to block or eliminate transmission of a particular subcarrier, the outputs from switches SW that associated with the group of frequency bins FB that associated with that subcarrier are configured to supply the zero value to corresponding frequency bins. Accordingly, for example, in order to block subcarrier SC1, switches SW1-1' to SW1-n' supply zero (0) values to a respective one of frequency bins FB1-1 to FB1-n. Further processing, as described below, of the zero (0) values by replicator components 1107 as well as other components and circuits in DSP 1002 result in drive signals supplied to modulators 1010, such that subcarrier SC1 is omitted from the optical output from the modulators.

On the other hand, switches SW' may be configured to supply the outputs of FFTs 1106a-1106p (e.g., frequency domain data FD), to corresponding frequency bins FB. Further processing of the contents of frequency bins FB by replicator components 1107 and other circuits in DSP 1002 result in drive signals supplied to modulators 1010, whereby, based on such drive signals, optical subcarriers are generated that correspond to the frequency bin groupings associated with that subcarrier.

In the example discussed above, the switches SW1-1' to SW1-n' supply frequency domain data FD1-1 to FD-n from FFT 1106a to a respective one of the switches SW1-1 to SW1-n. These switches, in turn, supply the frequency domain data to a respective one of the frequency bins FB1-1 to FB1-n for further processing, as described in greater detail below.

Each of the replicator components or circuits 1107a to 1007p (which may be referred to collectively as replicator components or circuits 1107) can replicate the contents of the frequency bins FB and store such contents (e.g., for T/2 based filtering of the subcarrier) in a respective one of the plurality of replicator components. Such replication can increase the sample rate. In addition, the replicator components or circuits 1107a-1007p may arrange or align the contents of the frequency bins to fall within the bandwidths associated with the pulse shaped filter circuits 1108a to 1108p described below.

Each of the pulse shape filter circuits 1108a to 1108p (which may be referred to collectively as pulse shape filter circuits 1108) can apply a pulse shaping filter to the data stored in the 512 frequency bins of a respective one of the replicator components or circuits 1107a-1107p to thereby provide a respective one of a plurality of filtered outputs, which are multiplexed and subject to an inverse FFT, as described below. The pulse shape filter circuits 1108a-1108p calculate the transitions between the symbols and the desired subcarrier spectrum so that the subcarriers can be packed together spectrally for transmission, e.g., with a close frequency separation. The pulse shape filter circuits 1108a-1108p also may be used to introduce timing skew between the subcarriers to correct for timing skew induced by links between network nodes (e.g., one or more of the hub nodes 104, 104a, and 104b, or leaf nodes 106a-106n described above). The multiplexer component 1109, which may include a multiplexer circuit or memory, can receive the filtered outputs from pulse shape filter circuits 1108a to 1108p, and multiplex or combine such outputs together to form an element vector.

Next, the IFFT circuit or component 1110a can receive the element vector and provide a corresponding time domain signal or data based on an inverse fast Fourier transform (IFFT). In one example, the time domain signal may have a rate of 64 GSample/s. A take last buffer or memory circuit 1111a, for example, can select the last 1024 samples, or another number of samples, from an output of the IFFT component or circuit 1110a and supply the samples to DACs 1004a and 1004b (see FIG. 10) at 64 GSample/s, for example. As noted above, the DAC 1004a is associated with the in-phase (I) component of the X pol signal, and the DAC 1004b is associated with the quadrature (Q) component of the Y pol signal. Accordingly, consistent with the complex representation XI+jXQ, the DAC 1004a receives values associated with XI and the DAC 1004b receives values associated with jXQ. As indicated by FIG. 10, based on these inputs, the DACs 1004a and 1004b provide analog outputs to the MZMD 1006a and the MZMD 1006b, respectively, as discussed above.

As further shown in FIG. 11A, each of bits-to-symbol circuits 1104a to 1104p outputs a corresponding one of symbols indicative of data carried by the Y polarization component of the polarization multiplexed modulated optical signal output on fiber 1016. As further noted above, these symbols may have the complex representation YI+j*YQ. Each such symbol may be processed by a respective one of overlap and save buffers 1115a-1115p (which may be referred to collectively as overlap and save buffers 1115), a respective one of the FFT circuits 1116a-1016p (which may be referred to collectively as FFT circuits 1116), a respective one of the replicator components or circuits 1117a-1117p (which may be referred to collectively as replicator components or circuits 1117), the pulse shape filter circuits 1118a-1118p (which may be referred to collectively as pulse shape filter circuits 1118), the multiplexer or memory 1119, the IFFT 1110b, and the take last buffer or memory circuit 1111b, to provide processed symbols having the representation YI+j*YQ in a manner similar to or the same as that discussed above in generating processed symbols XI+j*XQ output from the take last circuit 1111a. In addition, symbol components YI and YQ are provided to the DACs 1004c and 1004d (FIG. 10), respectively. Based on these inputs, the DACs 1004c and 1004d provide analog outputs to the MZMD 1006c and the MZMD 1006d, respectively, as discussed above.

While FIG. 11A shows the DSP 1002 as including a particular number and arrangement of functional components, in some implementations, the DSP 1002 may include additional functional components, fewer functional components, different functional components, or differently arranged functional components. In addition, typically the number of overlap and save buffers, FFTs, replicator circuits, and pulse shape filters associated with the X component may be equal to the number of switch outputs, and the number of such circuits associated with the Y component may also be equal to the number of switch outputs. However, in other examples, the number of switch outputs may be different from the number of these circuits.

As noted above, based on the outputs of the MZMDs 1006a to 1006d, a plurality of optical subcarriers SC1 to SC16 may be output onto the optical fiber 1016 (FIG. 10).

Consistent with an aspect of the present disclosure, the number of subcarriers transmitted by the network nodes (e.g., the hub nodes 104, 104a, and 104b and/or leaf nodes 106a-106n described above) can vary over time based, for example, on capacity requirements at the network nodes. For example, if less downstream capacity is required initially at one or more of the network nodes, a transmitter may be may be configured to output fewer optical subcarriers. On the other hand, if further capacity is required later, a transmitter may provide more optical subcarriers.

In addition, if based on changing capacity requirements, a particular network node needs to be adjusted, for example, the output capacity of such network node may be increased or decreased by, in a corresponding manner, increasing or decreasing the number of optical subcarriers output from the network node.

As noted above, by storing and subsequently processing zeros (0s) or other predetermined values in frequency bin FB groupings associated with a given subcarrier SC, that subcarrier may be removed or eliminated. To add or reinstate such subcarrier, frequency domain data output from the FFTs 1106a-1106p may be stored in frequency bins FB and subsequently processed to provide the corresponding subcarrier. Thus, subcarriers may be selectively added or removed from the optical outputs of the transmitters of network nodes, such that the number of subcarriers output from such transmitters may be varied, as desired.

In the above example, zeros (0s) or other predetermined values are stored in selected frequency bins FBs to prevent transmission of a particular subcarrier SC. Such zeroes or values may, instead, be provided, for example, in a manner similar to that described above, at the outputs of corresponding replicator components 1107a-1107p or stored in corresponding locations in memory or multiplexer 1109. Alternatively, the zeroes or values noted above may be provided, for example, in a manner similar to that described above, at corresponding outputs of pulse shape filters 1108a-1108p.

In a further example, a corresponding one of the pulse shape filters 110a to 1108p may selectively generate zeroes or predetermined values that, when further processed, also cause one or more subcarriers SC to be omitted from the output of the transmitter of a network node. In particular, as shown in FIG. 11C, pulse shape filters 1108a-1108p are shown as including groups of multiplier circuits M1-1 to M1-$n$ M16-1 to M16-$n$ (also individually or collectively referred to as M). In some implementations, the pulse shape filters 1108a-1108p can be included, for example, in a DSP (e.g., the DSP 1002 described with respect to FIG. 11A). Each multiplier circuit M constitutes part of a corresponding butterfly filter. In addition, each multiplier circuit grouping is associated with a corresponding one of subcarriers SC.

Each multiplier circuit M receives a corresponding one of output groupings RD1-1 to RD1-$n$ . . . RD16-1 to RD16-$n$ from replicator components 1107a-1107p. In order to remove or eliminate one of subcarriers SC, multiplier circuits M receiving the outputs within a particular grouping associated with that subcarrier multiply such outputs by zero (0), such that each multiplier M within that group generates a product equal to zero (0). The zero products then are subject to further processing similar to that described above to provide drive signals to the modulators 1010 that result in a corresponding subcarrier SC being omitted from the output of a transmitter.

On the other hand, in order to provide a subcarrier SC, each of the multiplier circuits M within a particular groping may multiply a corresponding one of replicator outputs RD by a respective one of coefficients C1-1 to C1-$n$ C16-1 to C16-$n$, which results in at least some non-zero products being output. Based on the products output from the corresponding multiplier grouping, drive signals are provided to the modulators 1010 to output the desired subcarrier SC from a transmitter.

Accordingly, for example, in order to block or eliminate subcarrier SC1, each of multiplier circuits M1-1 to M1-$n$ (associated with subcarrier SC1) multiplies a respective one of replicator outputs RD1-1 to RD1-$n$ by zero (0). Each such multiplier circuit, therefore, provides a product equal to zero, which is further processed, as noted above, such that resulting drive signals cause modulators 1010 to provide an optical output without SC1. In order to reinstate SC1, multiplier circuits M1-1 to M1-$n$ multiply a corresponding one of appropriate coefficients C1-1 to C1-$n$ by a respective one of replicator outputs RD1-1 to RD1-$n$ to provide products, at least some of which are non-zero. Based on these products, as noted above, modulator drive signals are generated that result in subcarrier SC1 being output.

The above examples are described in connection with generating or removing the X component of a subcarrier SC. The processes and circuitry described above is employed or included in DSP 1002 and optical circuitry used to generate the Y component of the subcarrier to be blocked. For example, switches and bins circuit blocks 1122a-1122p, have a similar structure and operate in a similar manner as switches and bins circuit blocks 1121 described above to provide zeroes or frequency domain data as the case may be to selectively block the Y component of one or more subcarriers SC. Alternatively, multiplier circuits, like those described above in connection with FIG. 11C may be provided to supply zero products output from selected pulse shape filters 1118 in order to block the Y component of a particular subcarrier or, if non-zero coefficients are provided to the multiplier circuits instead, generate the subcarrier.

Optical subcarriers SC1 to SC16 may be provided to network nodes, such as the leaf nodes 106a-106h, as described above. An example of receiver circuit of one of a network node will be described next with reference to FIG. 12.

Figure 12:
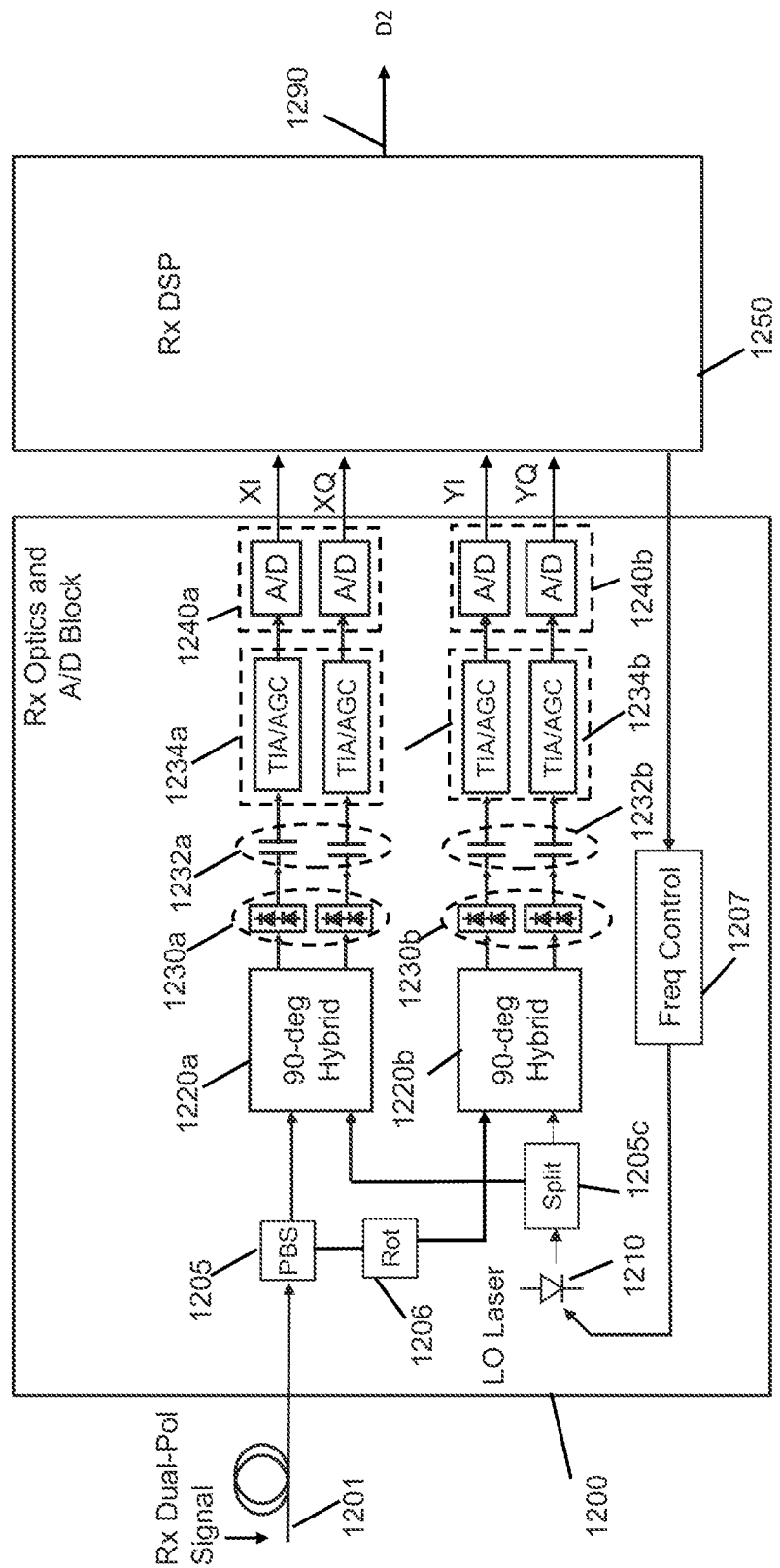
FIG. 12 is a diagram of an example optical receiver.

As shown in FIG. 12, an optical receiver may include an Rx optics and A/D block 1200, which, in conjunction with DSP 1250, may carry out coherent detection. Block 1200 may include a polarization splitter (PBS) 1205 with first (1205a) and second (1105b) outputs, a local oscillator (LO) laser 1210, 90 degree optical hybrids or mixers 1220a and 1220b, detectors 1230a and 1230b (each including either a single photodiode or balanced photodiode), AC coupling capacitors 1232a and 1232b, transimpedance amplifiers/automatic gain control circuits TIA/AGC 1234a and 1234b, ADCs 1240a and 1240b.

Polarization beam splitter (PBS) 1205 may include a polarization splitter that receives an input polarization multiplexed optical signal including optical subcarriers SC1 to SC16 supplied by optical fiber link 1201, which may be, for example, an optical fiber segment as part of one of optical paths 108a and 108b described above. The PBS 1205 may split the incoming optical signal into the two X and Y orthogonal polarization components. The Y component may be supplied to a polarization rotator 1206 that rotates the polarization of the Y component to have the X polarization. Hybrid mixers 1220 may combine the X and rotated Y polarization components with light from local oscillator laser 1210, which, in one example, is a tunable laser. For example, hybrid mixer 1220a may combine a first polarization signal (e.g., the component of the incoming optical signal having a first or X (TE) polarization output from a first PBS port with light from local oscillator 1210, and hybrid mixer 1220b may combine the rotated polarization signal (e.g., the component of the incoming optical signal having a second or Y (TM) polarization output from a second PBS port) with the light from local oscillator 1210. In one example, polarization rotator 1206 may be provided at the PBS output to rotate Y component polarization to have the X polarization.

Detectors 1230 may detect mixing products output from the optical hybrids, to form corresponding voltage signals, which are subject to AC coupling by capacitors 1232a and 1232b as well as amplification and gain control by TIA/AGCs 1234a and 1234b. The outputs of TIA/AGCs 1234a and 1234b and ADCs 1240 may convert the voltage signals to optical samples. For example, two detectors (e.g., photodiodes) 1230a may detect the X polarization signals to form the corresponding voltage signals, and a corresponding two ADCs 1240a may convert the voltage signals to optical samples for the first polarization signals after amplification, gain control and AC coupling. Similarly, two detectors 1230b may detect the rotated Y polarization signals to form the corresponding voltage signals, and a corresponding two ADCs 1240b may convert the voltage signals to optical samples for the second polarization signals after amplification, gain control and AC coupling. RX DSP 1250 may process the optical samples associated with the X and Y polarization components to output data associated with one or more subcarriers within a group of subcarriers SC1 to SC16 encompassed by the bandwidth associated with the secondary node housing the particular DSP 1250.

While FIG. 12 shows an optical receiver as including a particular number and arrangement of components, in some implementations, an optical receiver may include additional components, fewer components, different components, or differently arranged components. The number of detectors 1230 and/or ADCs 1240 may be selected to implement an optical receiver that is capable of receiving a polarization multiplexed signal. In some instances, one of the components illustrated in FIG. 12 can carry out a function described herein as being carry out by another one of the components illustrated in FIG. 12.

Consistent with the present disclosure, in order to select a particular subcarrier or group of subcarriers at a network node, the local oscillator 1210 may be tuned to output light having a wavelength or frequency relatively close to the selected subcarrier wavelength(s) to thereby cause a beating between the local oscillator light and the selected subcarrier(s). Such beating will either not occur or will be significantly attenuated for the other non-selected subcarriers so that data carried by the selected subcarrier(s) is detected and processed by the DSP 1250.

In some implementations, certain subcarriers SC may be detected by multiple leaf nodes. If the data associated with such subcarriers SC is intended for one of those leaf nodes, but not the other, switch circuitry, as noted above, may be provided in the leaf nodes to output the data selectively at the intended secondary node but not the others. For example, as further shown in FIG. 12, an output 1290 can be provided at the output of DSP 1250 to selectively output the data detected from the received subcarriers (e.g., one of D1-D8). For example, if the Rx optics and A/D block 1200 and the DSP 1250 shown in FIG. 12 is implemented in the leaf node 106b shown in FIGS. 2A and 2B, the DSP 1250 can output the data D2 via the output 1290.

Figure 13:
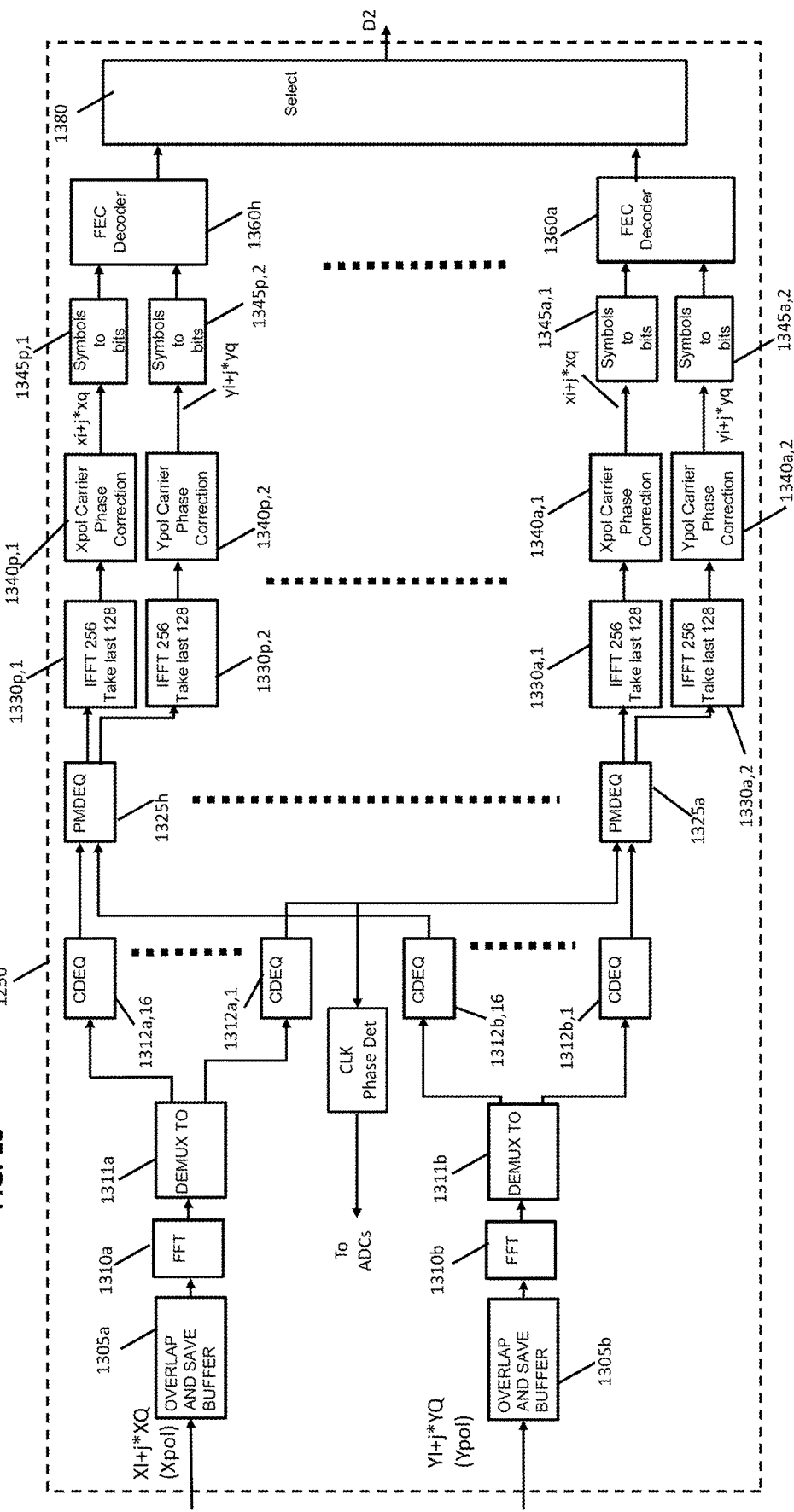
FIG. 13 is a diagram of an example receiver DSP.

FIG. 13 illustrates exemplary components of receiver optical signal processor (DSP) 1250. As noted above, analog-to-optical (A/D) circuits 1240a and 1240b (FIG. 12) output optical samples corresponding to the analog inputs supplied thereto. In one example, the samples may be supplied by each A/D circuit at a rate of 64 GSamples/s. The optical samples correspond to symbols carried by the X polarization of the optical subcarriers and may be represented by the complex number XI+jXQ. The optical samples may be provided to overlap and save buffer 1305a, as shown in FIG. 13. FFT component or circuit 1310a may receive the 2048 vector elements, for example, from the overlap and save buffer 1305a and convert the vector elements to the frequency domain using, for example, a fast Fourier transform (FFT). The FFT component 1310a may convert the 2048 vector elements to 2048 frequency components, each of which may be stored in a register or "bin" or other memory, as a result of carrying out the FFT.

The frequency components then may be demultiplexed by demultiplexer 1311a, and groups of such components may be supplied to a respective one of chromatic dispersion equalizer circuits CDEQ 1312a,1 to 1312a,16, each of which may include a finite impulse response (FIR) filter that corrects, offsets or reduces the effects of, or errors associated with, chromatic dispersion of the transmitted optical subcarriers. Each of CDEQ circuits 1312a,1 to 1312a,16 supplies an output to a corresponding polarization mode dispersion (PMD) equalizer circuit 1325a to 1325p (which individually or collectively may be referred to as 1225).

Optical samples output from A/D circuits 1340b associated with Y polarization components of subcarrier SC1 may be processed in a similar manner to that of optical samples output from A/D circuits 1340a and associated with the X polarization component of each subcarrier. Namely, overlap and save buffer 1305b, FFT 1310b, demultiplexer 1311b, and CDEQ circuits 1312b,1 to 1312b,16 may have a similar structure and operate in a similar fashion as buffer 1305a, FFT 1310a, demultiplexer 1322a, and CDEQ circuits 1312a,1 to 1312a,16, respectively. For example, each of CDEQ circuits 1312b,1 to 1312b,16 may include an FIR filter that corrects, offsets, or reduces the effects of, or errors associated with, chromatic dispersion of the transmitted optical subcarriers. In addition, each of CDEQ circuits 1312b,1 to 1312b,16 provide an output to a corresponding one of PMDEQ 1325a to 1325p.

As further shown in FIG. 13 the output of one of the CDEQ circuits, such as CDEQ 1312a,1 can be supplied to clock phase detector circuit 1313 to determine a clock phase or clock timing associated with the received subcarriers. Such phase or timing information or data may be supplied to ADCs 1240a and 1240b to adjust or control the timing of the optical samples output from ADCs 1240a and 1240b.

Each of PMDEQ circuits 1325 may include another FIR filter that corrects, offsets or reduces the effects of, or errors associated with, PMD of the transmitted optical subcarriers. Each of PMDEQ circuits 1325 may supply a first output to a respective one of IFFT components or circuits 1330a,1 to 1330p,1 and a second output to a respective one of IFFT components or circuits 1330a,2 to 1330p,2, each of which may convert a 256-element vector, in this example, back to the time domain as 256 samples in accordance with, for example, an inverse fast Fourier transform (IFFT).

Time domain signals or data output from IFFT 1330a,1 to 1330p,1 are supplied to a corresponding one of Xpol carrier phase correction circuits 1340a,1 to 1340p,1, which may apply carrier recovery techniques to compensate for X polarization transmitter (e.g., laser 1008) and receiver (e.g., local oscillator laser 1210) linewidths. In some implementations, each carrier phase correction circuit 1340a,1 to 1340p,1 may compensate or correct for frequency and/or phase differences between the X polarization of the transmit signal and the X polarization of light from the local oscillator 1200 based on an output of Xpol carrier recovery circuit 1340a,1, which performs carrier recovery in connection with one of the subcarrier based on the outputs of IFFT 1330a,1. After such X polarization carrier phase correction, the data associated with the X polarization component may be represented as symbols having the complex representation $xi+j*xq$ in a constellation, such as a QPSK constellation or a constellation associated with another modulation formation, such as an m-quadrature amplitude modulation (QAM), m being an integer. In some implementations, the taps of the FIR filter included in one or more of PMDEQ circuits 1325 may be updated based on the output of at least one of carrier phase correction circuits 1340a,1 to 1340p,1.

In a similar manner, time domain signals or data output from IFFT 1330a,2 to 1330p,2 are supplied to a corresponding one of Ypol carrier phase correction circuits 1340a,2 to 1340p,2, which may compensate or correct for Y polarization transmitter (e.g., laser 1008) and receiver (e.g., local oscillator laser 1210) linewidths. In some implementations, each carrier phase correction circuit 1340a,2 to 1340p,2 also may correct or compensate for frequency and/or phase differences between the Y polarization of the transmit signal and the Y polarization of light from the local oscillator 1210. After such Y polarization carrier phase correction, the data associated with the Y polarization component may be represented as symbols having the complex representation $yi+j*yq$ in a constellation, such as a QPSK constellation or a constellation associated with another modulation formation, such as an m-quadrature amplitude modulation (QAM), m being an integer. In some implementations, the output of one of circuits 1340a,2 to 1340p,2 may be used to update the taps of the FIR filter included in one or more of PMDEQ circuits 1325 instead of, or in addition to, the output of at least one of the carrier recovery circuits 1340a,1 to 1340p,1.

As further shown in FIG. 13, the output of carrier recovery circuits, e.g., carrier recovery circuit 1340a,1, also may be supplied to carrier phase correction circuits 1340a,1 to 1340p,1 and 1340a,2 to 1340p,2, whereby the phase correction circuits may determine or calculate a corrected carrier phase associated with each of the received subcarriers based on one of the recovered carriers, instead of providing multiple carrier recovery circuits, each of which is associated with a corresponding subcarrier. The equalizer, carrier recovery, and clock recovery may be further enhanced by utilizing the known (training) bits that may be included in control signals CNT, for example by providing an absolute phase reference between the transmitted and local oscillator lasers.

Each of the symbols-to-bits circuits or components 1345a,1 to 1345p,1 may receive the symbols output from a corresponding one of circuits 1340a,1 to 1340p,1 and map the symbols back to bits. For example, each of the symbol-to-bits components 1345a,1 to 1345p,1 may map one X polarization symbol, in a QPSK or m-QAM constellation, to Z bits, where Z is an integer. For dual-polarization QPSK modulated subcarriers, Z is four. Bits output from each of component 1345a,1 to 1345p,1 are provided to a corresponding one of FEC decoder circuits 1360a to 1360p.

Y polarization symbols are output form a respective one of circuits 134a,2 to 1340p,2, each of which has the complex representation $yi+j*yq$ associated with data carried by the Y polarization component. Each Y polarization, like the X polarization symbols noted above, may be provided to a corresponding one of bit-to-symbol circuits or components 1345a,2 to 1345h,2, each of which has a similar structure and operates in a similar manner as symbols-to-bits component 1345a,1 to 1345h,1. Each of circuits 1345a,2 to 1345p,2 may provide an output to a corresponding one of FEC decoder circuits 1360a to 1360p.

Each of FEC decoder circuits 1360 may remove errors in the outputs of symbol-to-bit circuits 1345 using, for example, forward error correction. Such error corrected bits, which may include user data for output from a leaf node, may be supplied to a corresponding one of switch circuits SW-0 to SW-8. As noted above, switch circuits SW-0 to SW-16 (e.g., as shown in FIG. 11B) in each leaf node may selectively supply or block data based on whether such data is intended to be output from the secondary node.

Consistent with another aspect of the present disclosure, data may be blocked from output from DSP 1250 without the use of switches SW-0 to SW-16. In one example similar to an example described above, zero (0) or other predetermined values may be stored in frequency bins associated with the blocked data, as well as the subcarrier corresponding to the blocked data. Further processing described above of such zeroes or predetermined data by circuitry in DSP 1250 will result in null or zero data outputs, for example, from a corresponding one of FEC decoders 1260. Switch circuits provided at the outputs of FFTs 1310a and 1310b, like switch circuits SW described above in FIG. 11B, may be provided to selectively insert zeroes or predetermined values for selectively blocking corresponding output data from DSP 1250. Such switches also may be provided at the output of or within demultiplexers 1311a and 1311b to selectively supply zero or predetermined values.

In another example, zeroes (0s) may be inserted in chromatic dispersion equalizer (CDEQ) circuits 1312 associated with both the X and Y polarization components of each subcarrier. In particular, multiplier circuits (provided in corresponding butterfly filter circuits), like multiplier circuits M described above, may selectively multiply the inputs to the CDEQ circuit 1312 by either zero or a desired coefficient. As discussed above in connection with FIG. 11C, multiplication by a zero generates a zero product. When such zero products are further processed by corresponding circuitry in DSP 1250, e.g., corresponding IFFTs 1330, carrier phase correction components 1340, symbol-to-bits components 1345, and FEC decoder, a corresponding output of DSP 1250 will also be zero. Accordingly, data associated with a subcarrier SC received by a leaf node, but not intended for output from that leaf node, can be blocked.

If, on the other hand, capacity requirements change and such previously blocked data is to be output from a given leaf node receiver DSP 1250, appropriately coefficients may be supplied to the multiplier circuits, such that at least some of the inputs thereto are not multiplied by zero. Upon further processing, as noted above, data associated with the inputs to the multiplier circuits and corresponding to a particular subcarrier SC is output from leaf node receiver DSP 1250.

As described above, a node may receive one or more signals that include information indicative of the same data, and select one of the signals from which the retrieve the data. As an example, referring to FIG. 13, the output of the DSP 1250 can be selected by selection circuitry 1380 from among the outputs of the FEC decoders 1360*a*-1360*h*. The selection circuitry 1380 can select between the outputs of one or more of the FEC decoders 1360*a*-1360*h* based on one or more criteria. For example, as described above, the selection circuitry 1380 can make a selected based on criteria such as a measured or estimated latency associated with each of the optical signals received by the node (e.g., a latency associated with transmitting the optical signal to the node from another node), a pre-forward error correction quality factor (pre-FEC Q) associated with each of the optical signals, one or more other factors, or any combination thereof. For example, the selection circuitry 1380 can select an instance of the data that was included in an optical signal having a lower latency and/or a higher pre-FEC Q over an instance of the data that was included in an optical signal having a higher latency and/or a lower pre-FEC Q.

As an example, if the DSP 1250 shown in FIG. 13 is implemented in the leaf node 106*b* shown in FIGS. 2A and 2B, the selection circuitry 1380 can receive one or more instances of the data D2. The selection circuitry 1380 can select between the received instances of the data D2, and output it from the DSP 1250.

While FIG. 13 shows DSP 1250 as including a particular number and arrangement of functional components, in some implementations, DSP 1250 may include additional functional components, fewer functional components, different functional components, or differently arranged functional components.

Upstream transmission from a leaf node to hub node will be described next with reference to FIGS. 14 and 15.

Figure 14:
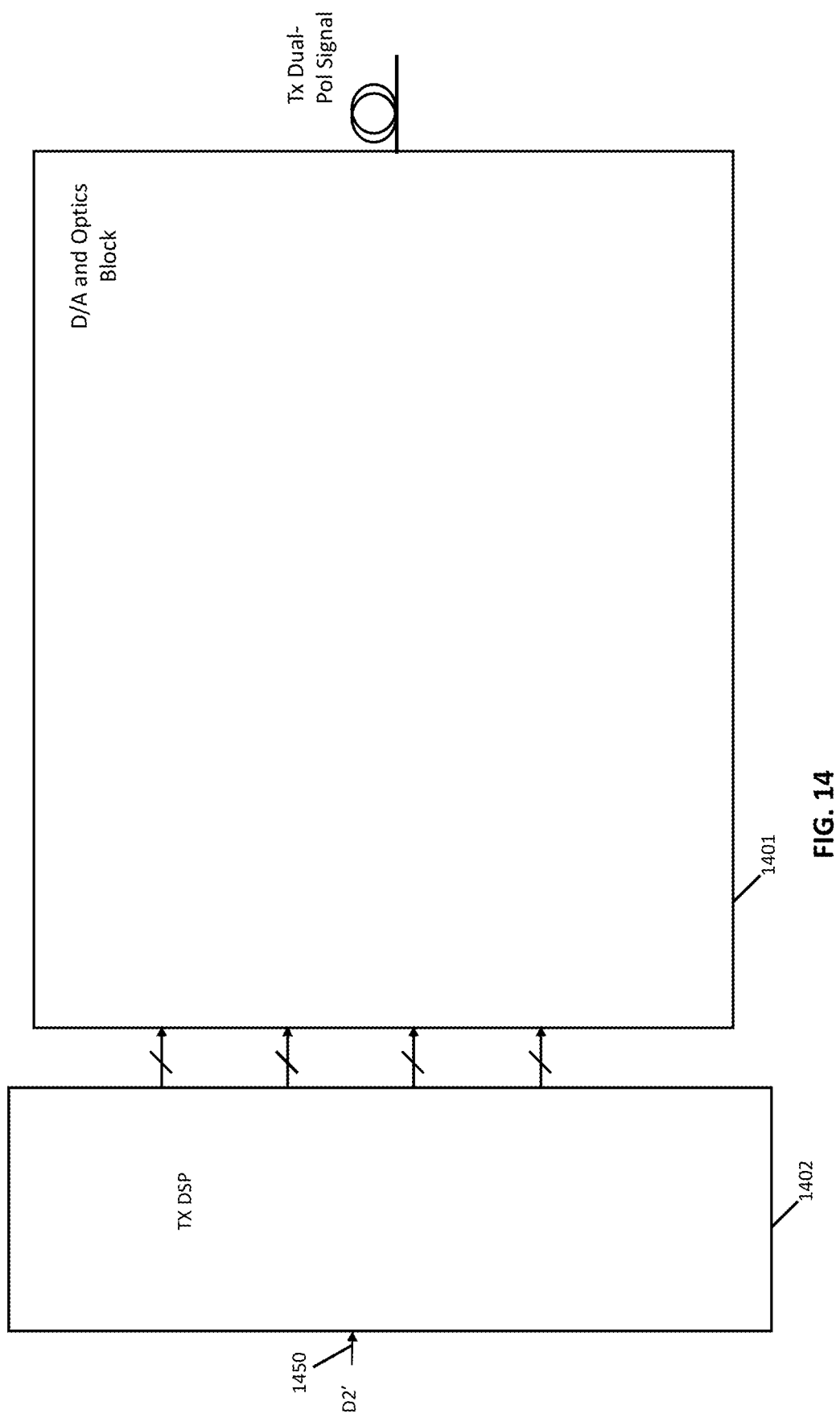
FIG. 14 is a diagram of an example leaf node transmitter

FIG. 14 shows an example of leaf node transmitter 1400 in greater detail. The transmitter 1400 includes an input 1450 for receiving data (e.g., one of data D1' to D8'). As an example, if the transmitter 1400 is implemented in leaf node 106*b* shown in FIGS. 2A and 2B, the input 1450 can be configured to receive data D2'. The transmitter 1400 also includes a DSP 1402 and a D/A and optics block 1401.

DSP 1402 may have a similar structure as the Tx processor 508 described above with reference to FIGS. 5A, 7A, and 7B, and/or the DSP 1002 described above with reference to FIGS. 10 and 11A. In some instances, however, DSP 1402 may have a lower capacity than DSP 1002. For example, the number of circuits, such as FEC encoders, bits-to-symbol mappers, overlap and save buffers, FFT circuits, replicator circuits, and pulse shape filters may be reduced in accordance with the number of inputs to DSP 1402. Accordingly, fewer subcarriers may be output from each of the leaf nodes compared to the number of subcarriers output from hub node.

Based on the data received from the inputs 1450, DSP 1302 may supply a plurality of outputs to D/A and optics block 1401, which may have a similar construction as D/A and optics block 1001 described above to supply X and Y polarized optical signals, each including I and Q components, that are combined by a PBC and output onto an optical fiber segment 1416 included in one of optical paths (e.g., optical paths 108*a* and 108*b*).

Alternatively, based on zeroes (0s) stored or generated in DSP 1402, subcarriers may be blocked or added in a manner similar to that described above.

Figure 15:
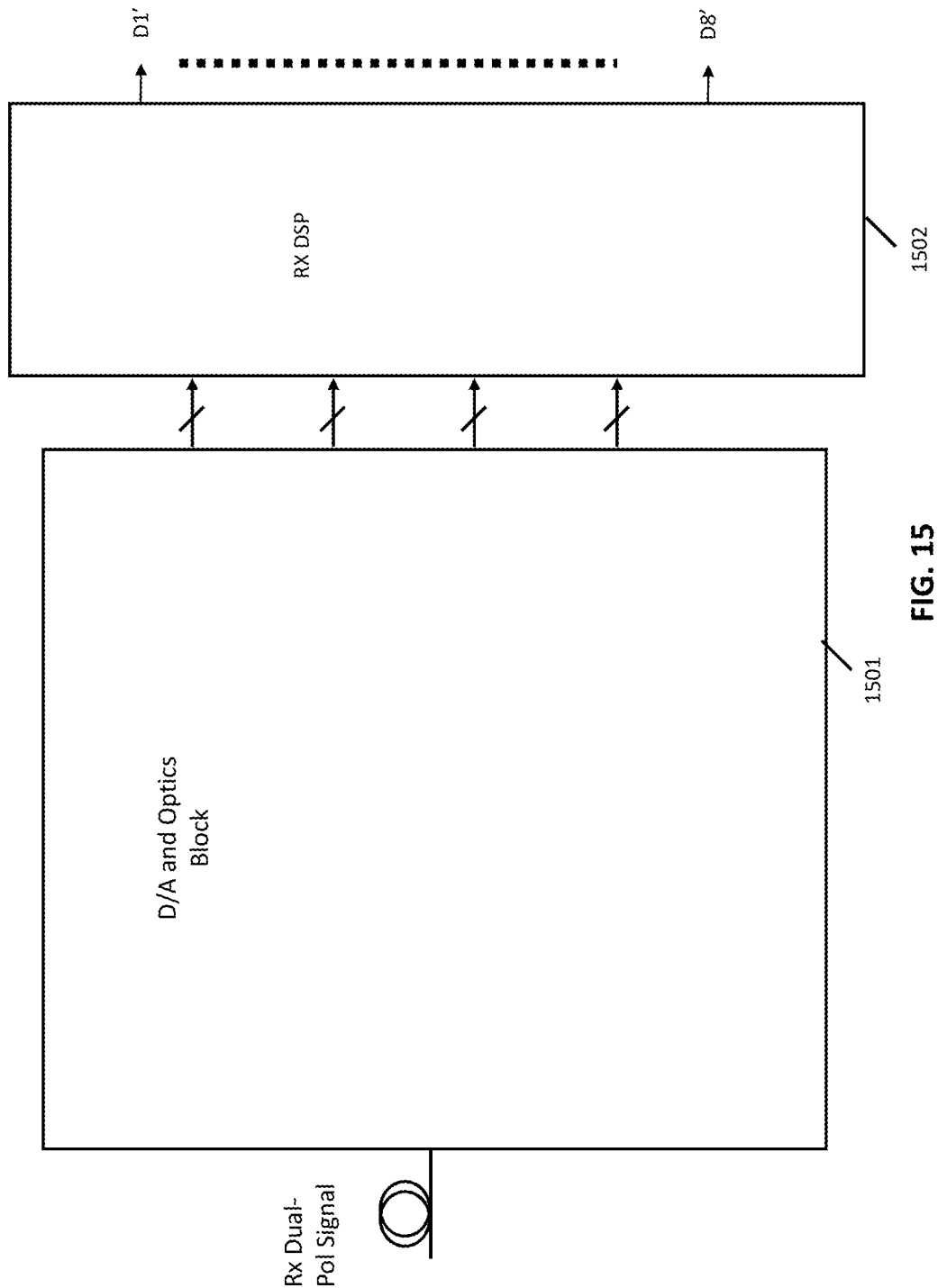
FIG. 15 is a diagram of an example hub node receiver.

FIG. 15 shows an example of hub node receiver 1500 in greater detail. The receiver 1500 includes an input 1550 for receiving optical signals (e.g., from one or more of the 108*a* and 108*b*). The receiver 1500 also includes an Rx optics and A/D block 1501 and a DSP 1502.

The Rx optics and A/D block 1501 can be similar to the Rx optics and A/D block 1200 described above. For example, the Rx optics and A/D block 1501 can receive one or more optical signals, and output corresponding X and Y polarized optical signals, each including I and Q components, to the DSP 1502

DSP 1502 may have a similar structure as the Rx processor 430 described above with reference to FIGS. 4A, 4B, the Rx processors 908*a* and 908*b* described above with reference to FIG. 9, and/or the DSP 1250 described above with reference to FIGS. 12 and 13. For example, the DSP 1502 can receive the optical signals from the Rx optics and A/D block 1501, and output data D1'-D8' transmitted by each of several leaf nodes.

In some instances, DSP 1502 may have a lower capacity than DSP 1250. For example, the number of circuits, such as overlap and save buffers, FFT circuits, demultiplexers, CDEQ circuits, PMDEQ circuits, IFFT circuits, carrier phase correction circuits, symbols-to-bits circuits, and FEC decoders may be reduced in accordance with the number of leaf nodes from which the hub node can receive data. Accordingly, fewer corresponding data outputs can be provided by the DSP 1502.

Figure 1B:
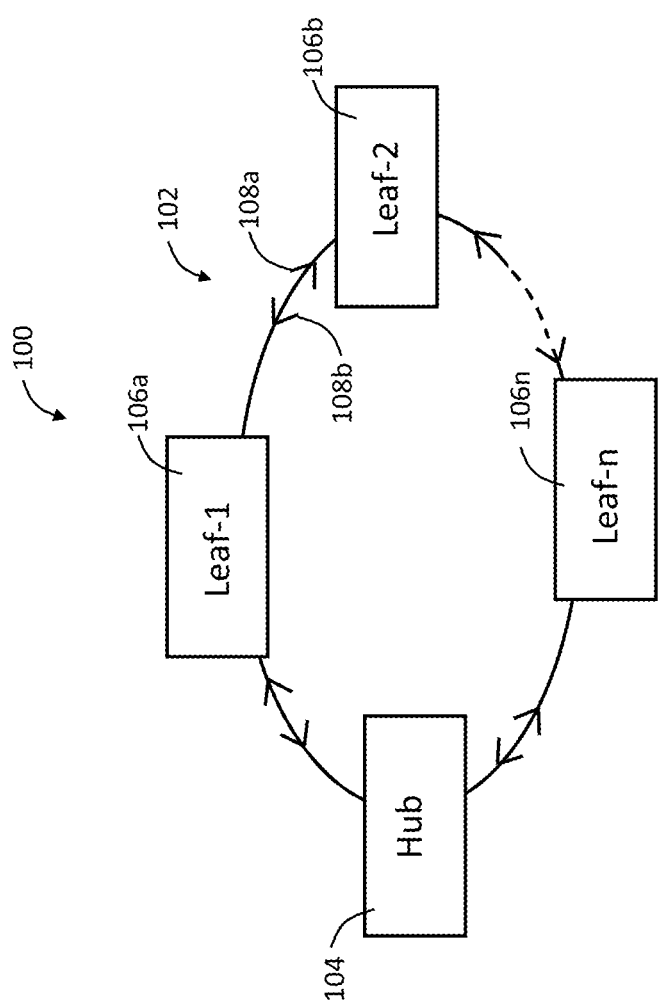
FIG. 1B is a diagram of another example optical communications network.

In the aforementioned examples, the optical links of a communications network 100 are shown and described as unidirectional optical links (e.g., optical signals propagate in a single direction along each optical link). However, this need not always be the case. For example, as shown in FIG. 1B, the access ring 102 can be implemented using several bidirectional optical links extending between respective ones of the nodes. In these implementations, the first optical path 108*a* can refer to the transmission of data a first direction along the optical links of the access ring (e.g., clockwise, in the example shown in FIG. 1B), and the second optical path 108*b* can refer to the transmission of data a second, opposite direction along the same optical links of the access ring (e.g., counterclockwise, in the example shown in FIG. 1B).

II. Example Processes for Performing the Techniques Described Herein

Figure 16A:
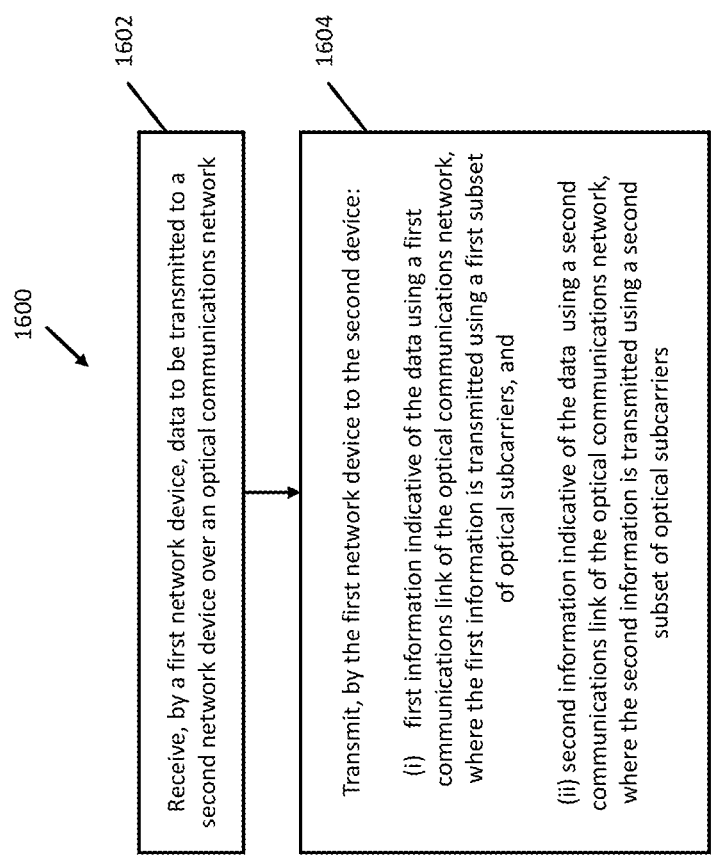
FIGS. 16A-16D are flow chart diagrams of example processes that can be performed using one or more of the systems described herein.

FIG. 16A shows an example process 1600 that can be performed using one or more of the systems described herein. For instance, the 1600 ### can be performed using an optical communications network 100 and/or one or more of the components thereof (e.g., as shown in FIGS. 1-15).

According to the process 1600, a first network device receives data to be transmitted to a second network device over an optical communications network (block 1602).

In some implementations, the first network device can include one or more hub network devices, and the second network device can include one or more leaf network devices, or vice versa. As an example, the first network device can include the node 104. As another example, the second network device can include one of the nodes 106*a*-106*n*.

The first network device transmits first information and second information to the second device (block 1604). The first information is indicative of the data using a first communications link of the optical communications network, and is transmitted using a first subset of optical subcarriers. The second information is indicative of the data using a second communications link of the optical communications network, and is transmitted using a second subset of optical subcarriers. The first subset of optical subcarriers is different from the second subset of optical subcarriers.

In some implementations, the first information and the second information can be identical. In some implementations, the first information can be different from the second information. For example, the first information and the second information can include the same data modulated according to different digital subcarriers. As another example, the first information and the second information can include the same data transmitted according to different forward error correction (FEC) schemes (e.g., include different FEC codes or bits).

In some implementations, the first communications link and the second communications link can form at least a portion of a communications ring that communicatively interconnects the first network device and the second network device. As an example, referring to FIG. 1, the first communications link can include at least a portion of the optical path 108a, and the second communications link can include at least a portion of the optical path 108b, or vice versa. In some implementations, the first communications link can be referred to as a "hub working Tx" path, and the second communications link can be referred to as a "hub protect Tx" path, or vice versa.

In some implementations, each of the optical subcarriers in the first subset of optical subcarriers and the second subset of optical subcarriers can be a respective Nyquist subcarrier. Further, in some implementations, each of the optical subcarriers are associated with respective frequencies that do not overlap one another in a frequency domain.

In some implementations, the first subset of optical subcarriers can be selected from a plurality of optical subcarriers allotted to the first network device. For example, referring to FIG. 3, the first network device can be allotted subcarriers S1-SC16 for use in communicating over an optical communications network. The first subset can be selected from among the subcarriers SC1-SC16.

In some implementations, the optical subcarriers of the first subset of optical subcarriers are associated with respective frequencies that are contiguous with one another in a frequency domain. As an example, referring to FIG. 3, the first subset of optical subcarriers can be SC1 and SC2.

In some implementations, the second subset of optical subcarriers can be selected from the plurality of optical subcarriers allotted to the first network device. For example, referring to FIG. 3, the first network device can be allotted one or more of the subcarriers S1-SC16 for use in communicating over an optical communications network (e.g., for transmitting data over the optical communications network). The second subset can be selected from among the subcarriers SC1-SC16.

In some implementations, the optical subcarriers of the second subset of optical subcarriers can be associated with respective frequencies that are contiguous with one another in a frequency domain. As an example, referring to FIG. 3, the second subset of optical subcarriers can be SC9 and SC10.

In some implementations, the first subset of optical subcarriers can be associated with one or more first frequencies, and the second subset of optical subcarriers can be associated with one or more second frequencies. In some implementations, the one or more first frequencies are not contiguous with the one or more second frequencies in a frequency domain. As an example, referring to FIG. 3, the first subset of optical subcarriers can be SC1, and the second subset of optical subcarriers can be SC9.

In some implementations, the first subset of optical subcarriers can be associated with one or more first frequencies, and the second subset of optical subcarriers can be associated with one or more second frequencies. Further, one or more additional optical subcarriers can be associated with one or more additional frequencies. Further, the one or more additional frequencies can be disposed between the one or more first frequencies and the one or more second frequencies in a frequency domain. As an example, referring to FIG. 3, the first subset of optical subcarriers can be SC1-SC4, and the second subset of optical subcarriers can be SC13-SC16, with the additional optical subcarriers SC5-SC12 disposed between them in the frequency domain.

In some implementations, the first subset of optical subcarriers can be associated with one or more first frequencies, and the second subset of optical subcarriers can be associated with one or more second frequencies. Further, the one or more first frequencies and the one or more second frequencies can be separated from one another by one or more additional frequencies in a frequency domain. As an example, referring to FIG. 3, a guard band (e.g., a frequency band spanning a range of frequencies) can separate the one or more first frequencies and the one or more second frequencies from one another.

In some implementations, a number of optical subcarriers in the first subset of optical subcarriers can be the same as a number of optical subcarriers in the second subset of optical subcarriers. For example, referring to FIG. 3, the first subset of optical subcarriers can be SC1, and the second subset of optical subcarriers can be SC9.

In some implementations, a number of optical subcarriers in the first subset of optical subcarriers can be different from a number of optical subcarriers in the second subset of optical subcarriers. For example, referring to FIG. 3, the first subset of optical subcarriers can be SC1 and SC2, and the second subset of optical subcarriers can be SC9.

In some implementations, the first information and the second information can be transmitted by performing one or more particular actions. The actions can include modulating an output of a laser to generate a modulated optical signal including the first subset of optical subcarriers and the second subsets of optical subcarriers, providing the modulated optical signal to an optical splitter, and splitting the modulated optical signal into a first portion and a second portion. Each of the first portion and the second portion can include the first subset of optical subcarriers and the second subset of optical subcarriers. Further, the actions can include selecting the first subset of optical subcarriers from the first portion of the modulated optical signal, selecting the second subset of subcarriers from the second portion of the modulated optical signal, transmitting the first subset of optical subcarriers to the second network device using the first communications link, and transmitting the second subset of optical subcarriers to the second network device using the second communications link. Example components for performing these actions are shown, for instance, in FIGS. 4A and 4B.

Figure 4B:
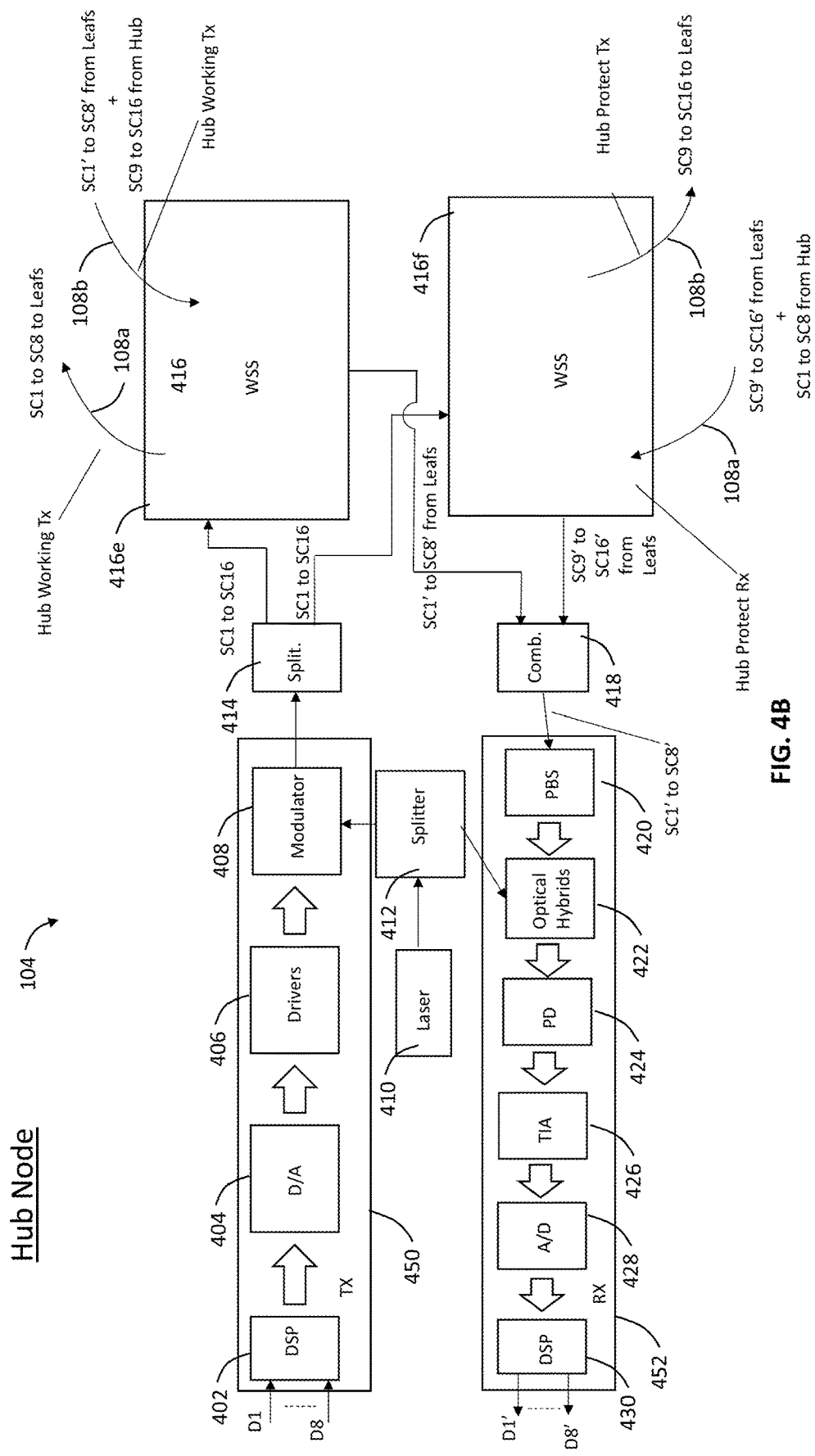

In some implementations, selecting the first subset of optical subcarriers can include selecting the first subset of optical subcarriers with a wavelength selective switch (e.g., as shown in FIGS. 4A and 4B. In some implementations, selecting the second subset of optical subcarriers can include selecting the second subset of optical subcarriers with the wavelength selective switch (e.g., as shown in FIGS. 4A and 4B).

Figure 16B:
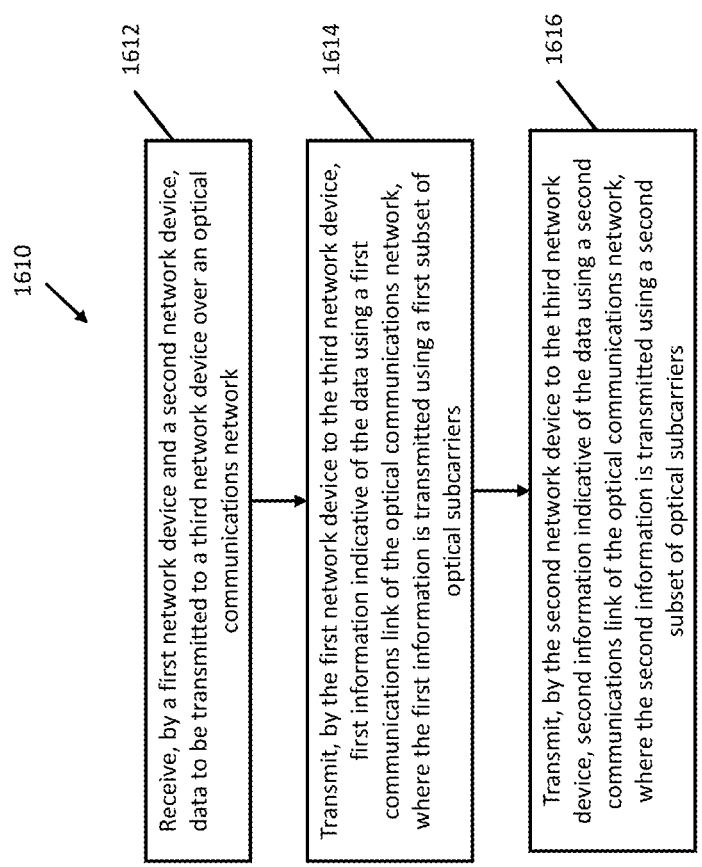

FIG. 16B shows another example process 1610 that can be performed using one or more of the systems described herein. For instance, the 1610 can be performed using an optical communications network 100 and/or one or more of the components thereof (e.g., as shown in FIGS. 1-15).

According to the process 1610, a first network device and a second network device receive data to be transmitted to a third network device over an optical communications network (block 1612).

In some implementations, each of the first network device and the second network device can include one or more hub network devices. Further, the third network device can include one or more leaf network devices. As an example, referring to FIG. 8, the first network device can include the node 104a, and the second network device can include the node 104b. As another example, the second network device can include one of the nodes 106a-106p.

The first network device transmits, to the third network device, first information indicative of the data using a first communications link of the optical communications network (block 1614). The first information is transmitted using a first subset of optical subcarriers; and The second network device transmits, to the third network device, second information indicative of the data using a second communications link of the optical communications network (block 1616). The second information is transmitted using a second subset of optical subcarriers. Further, the first subset of optical subcarriers is different from the second subset of optical subcarriers.

In some implementations, the first information and the second information can be identical. In some implementations, the first information can be different from the second information. For example, the first information and the second information can include the same data modulated according to different digital subcarriers. As another example, the first information and the second information can include the same data transmitted according to different forward error correction (FEC) schemes (e.g., include different FEC codes or bits).

In some implementations, the first communications link and the second communications link can form at least a portion of a communications ring that communicatively interconnects the first network device, the second network device, and the third network device. As an example, referring to FIG. 8, the first communications link can include at least a portion of the optical path 108a, and the second communications link can include at least a portion of the optical path 108b, or vice versa. In some implementations, the first communications link can be referred to as a "hub working Tx" path, and the second communications link can be referred to as a "hub protect Tx" path, or vice versa.

In some implementations, each of the optical subcarriers in the first subset of optical subcarriers and the second subset of optical subcarriers can be a respective Nyquist subcarrier. Further, in some implementations, each of the optical subcarriers are associated with respective frequencies that do not overlap one another in a frequency domain.

In some implementations, the first subset of optical subcarriers can be selected from a plurality of optical subcarriers allotted to the first network device. For example, the first network device can be allotted subcarriers S1-SC16 for use in communicating over an optical communications network. The first subset can be selected from among the subcarriers SC1-SC16.

In some implementations, the optical subcarriers of the first subset of optical subcarriers can be associated with respective frequencies that are contiguous with one another in a frequency domain. As an example, the first subset of optical subcarriers can be SC1 and SC2.

In some implementations, the second subset of optical subcarriers can be selected from the plurality of optical subcarriers allotted to the second network device. For example, the second network device can be allotted subcarriers S17-SC32 for use in communicating over an optical communications network. The second subset can be selected from among the subcarriers SC17-SC32.

In some implementations, the optical subcarriers of the second subset of optical subcarriers are associated with respective frequencies that are contiguous with one another in a frequency domain. As an example, the second subset of optical subcarriers can be SC9 and SC10.

In some implementations, the first subset of optical subcarriers can be associated with one or more first frequencies, and the second subset of optical subcarriers can be associated with one or more second frequencies. In some implementations, the one or more first frequencies are not contiguous with the one or more second frequencies in a frequency domain. As an example, the first subset of optical subcarriers can be SC1, and the second subset of optical subcarriers can be SC17.

In some implementations, the first subset of optical subcarriers can be associated with one or more first frequencies, the second subset of optical subcarriers can be associated with one or more second frequencies, and one or more additional optical subcarriers can be associated with one or more additional frequencies. The one or more additional frequencies can be disposed between the one or more first frequencies and the one or more second frequencies in a frequency domain. As an example, the first subset of optical subcarriers can be SC1-SC4, and the second subset of optical subcarriers can be SC29-SC32, with the additional optical subcarriers SC5-SC28 disposed between them in the frequency domain.

In some implementations, the first subset of optical subcarriers can be associated with one or more first frequencies, and the second subset of optical subcarriers can be associated with one or more second frequencies. Further, the one or more first frequencies and the one or more second frequencies can be separated from one another by one or more additional frequencies in a frequency domain. As an example, a guard band (e.g., a frequency band spanning a range of frequencies) can separate the one or more first frequencies and the one or more second frequencies from one another.

In some implementations, a number of optical subcarriers in the first subset of optical subcarriers can be the same as a number of optical subcarriers in the second subset of optical subcarriers. For example, the first subset of optical subcarriers can be SC1, and the second subset of optical subcarriers can be SC17.

In some implementations, a number of optical subcarriers in the first subset of optical subcarriers can be different from a number of optical subcarriers in the second subset of optical subcarriers. For example, the first subset of optical subcarriers can be SC1 and SC2, and the second subset of optical subcarriers can be SC17.

In some implementations, transmitting the first information can include modulating, by the first network device, an output of a first laser to generate a first modulated optical signal including the first subset of optical subcarriers. Further, the first modulated optical signal can be transmitted to the third network device using the first communications link. Example components for performing these actions are shown, for instance, in FIG. 9.

In some implementations, transmitting the second information can include modulating, by the second network device, an output of a second laser to generate a second modulated optical signal including the second subset of optical subcarriers. Further, the second modulated optical signal can be transmitted to the third network device using the first communications link. Example components for performing these actions are shown, for instance, in FIG. 9.

Figure 16C:
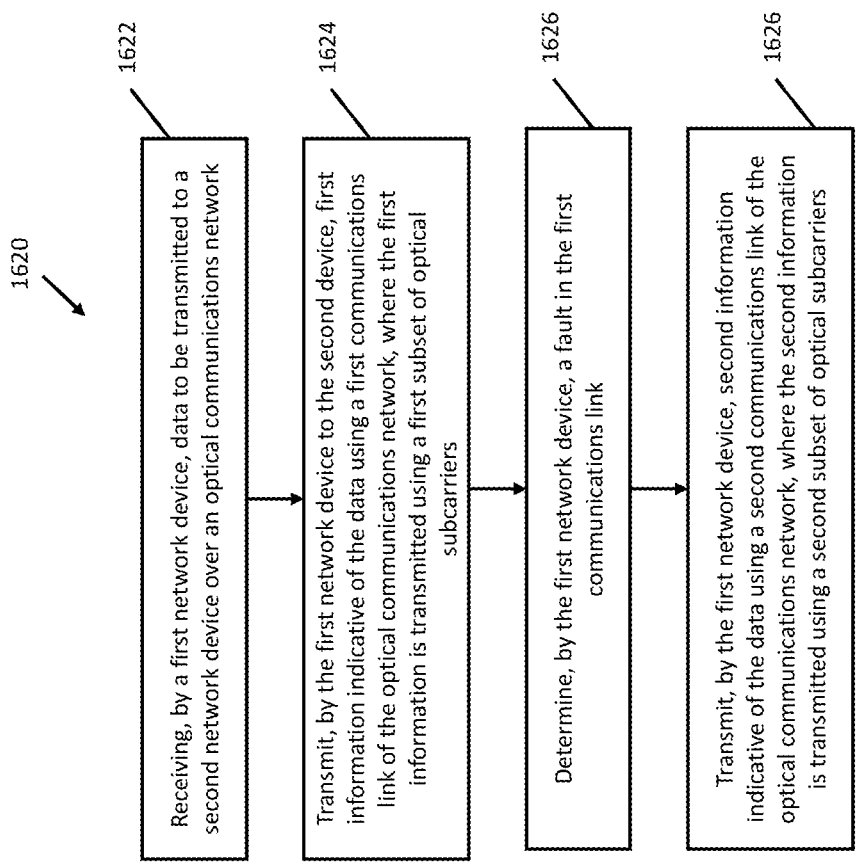

FIG. 16C shows another example process 1620 that can be performed using one or more of the systems described herein. For instance, the 1620 can be performed using an optical communications network 100 and/or one or more of the components thereof (e.g., as shown in FIGS. 1-15).

According to the process 1620, a first network device receives data to be transmitted to a second network device over an optical communications network (block 1622).

The first network device transmits, to the second device, first information indicative of the data using a first communications link of the optical communications network (block 1624). The first information is transmitted using a first subset of optical subcarriers.

In some implementations, the first network device can include one or more hub network devices, the second network device can include one or more leaf network devices, or vice versa. As an example, the first network device can include the node 104. As another example, the second network device can include one of the nodes 106a-106n.

The first network device determines a fault in the first communications link (block 1626).

In some implementations, determining the fault in the first communications link can include determining that an optical fiber of the first communications link has been severed and/or determining that a line system component of the first communications link is malfunctioning.

In response, the first network device transmits second information indicative of the data using a second communications link of the optical communications network (block 1628). The second information is transmitted using a second subset of optical subcarriers. The first subset of optical subcarriers is different from the second subset of optical subcarriers.

In some implementations, the first information and the second information can be identical. For example, the first information and the second information both can into the data modulated according to the same digital subcarrier or subcarriers. In some implementations, the first information can be different from the second information. For example, the first information and the second information can include the same data modulated according to different digital subcarriers. As another example, the first information and the second information can include the same data transmitted according to different forward error correction (FEC) schemes (e.g., include different FEC codes or bits).

In some implementations, the first communications link and the second communications link can form at least a portion of a communications ring that communicatively interconnects the first network device, the second network device, and the third network device. As an example, referring to FIG. 8, the first communications link can include at least a portion of the optical path 108a, and the second communications link can include at least a portion of the optical path 108b, or vice versa. In some implementations, the first communications link can be referred to as a "hub working Tx" path, and the second communications link can be referred to as a "hub protect Tx" path, or vice versa.

In some implementations, each of the optical subcarriers in the first subset of optical subcarriers and the second subset of optical subcarriers can be a respective Nyquist subcarrier. Further, in some implementations, each of the optical subcarriers are associated with respective frequencies that do not overlap one another in a frequency domain.

In some implementations, the first subset of optical subcarriers can be selected from a plurality of optical subcarriers allotted to the first network device. For example, the first network device can be allotted subcarriers S1-SC16 for use in communicating over an optical communications network. The first subset can be selected from among the subcarriers SC1-SC16.

In some implementations, the optical subcarriers of the first subset of optical subcarriers can be associated with respective frequencies that are contiguous with one another in a frequency domain. As an example, the first subset of optical subcarriers can be SC1 and SC2.

In some implementations, the optical subcarriers of the first subset of optical subcarriers are associated with respective frequencies that are contiguous with one another in a frequency domain. As an example, referring to FIG. 3, the first subset of optical subcarriers can be SC1 and SC2.

In some implementations, the second subset of optical subcarriers can be selected from the plurality of optical subcarriers allotted to the first network device. For example, referring to FIG. 3, the first network device can be allotted one or more of the subcarriers S1-SC16 for use in communicating over an optical communications network (e.g., for transmitting data over the optical communications network). The second subset can be selected from among the subcarriers SC1-SC16.

In some implementations, the optical subcarriers of the second subset of optical subcarriers can be associated with respective frequencies that are contiguous with one another in a frequency domain. As an example, referring to FIG. 3, the second subset of optical subcarriers can be SC9 and SC10.

In some implementations, the first subset of optical subcarriers can be associated with one or more first frequencies, and the second subset of optical subcarriers can be associated with one or more second frequencies. In some implementations, the one or more first frequencies are not contiguous with the one or more second frequencies in a frequency domain. As an example, referring to FIG. 3, the first subset of optical subcarriers can be SC1, and the second subset of optical subcarriers can be SC9.

In some implementations, the first subset of optical subcarriers can be associated with one or more first frequencies, and the second subset of optical subcarriers can be associated with one or more second frequencies. Further, one or more additional optical subcarriers can be associated with one or more additional frequencies. Further, the one or more additional frequencies can be disposed between the one or more first frequencies and the one or more second frequencies in a frequency domain. As an example, referring to FIG. 3, the first subset of optical subcarriers can be SC1-SC4, and the second subset of optical subcarriers can be SC13-SC16, with the additional optical subcarriers SC5-SC12 disposed between them in the frequency domain.

In some implementations, the first subset of optical subcarriers can be associated with one or more first frequencies, and the second subset of optical subcarriers can be associated with one or more second frequencies. Further, the one or more first frequencies and the one or more second frequencies can be separated from one another by one or more additional frequencies in a frequency domain. As an example, referring to FIG. 3, a guard band (e.g., a frequency band spanning a range of frequencies) can separate the one or more first frequencies and the one or more second frequencies from one another.

In some implementations, a number of optical subcarriers in the first subset of optical subcarriers can be the same as a number of optical subcarriers in the second subset of optical subcarriers. For example, referring to FIG. 3, the first subset of optical subcarriers can be SC1, and the second subset of optical subcarriers can be SC9.

In some implementations, a number of optical subcarriers in the first subset of optical subcarriers can be different from a number of optical subcarriers in the second subset of optical subcarriers. For example, referring to FIG. 3, the first subset of optical subcarriers can be SC1 and SC2, and the second subset of optical subcarriers can be SC9.

Figure 16D:
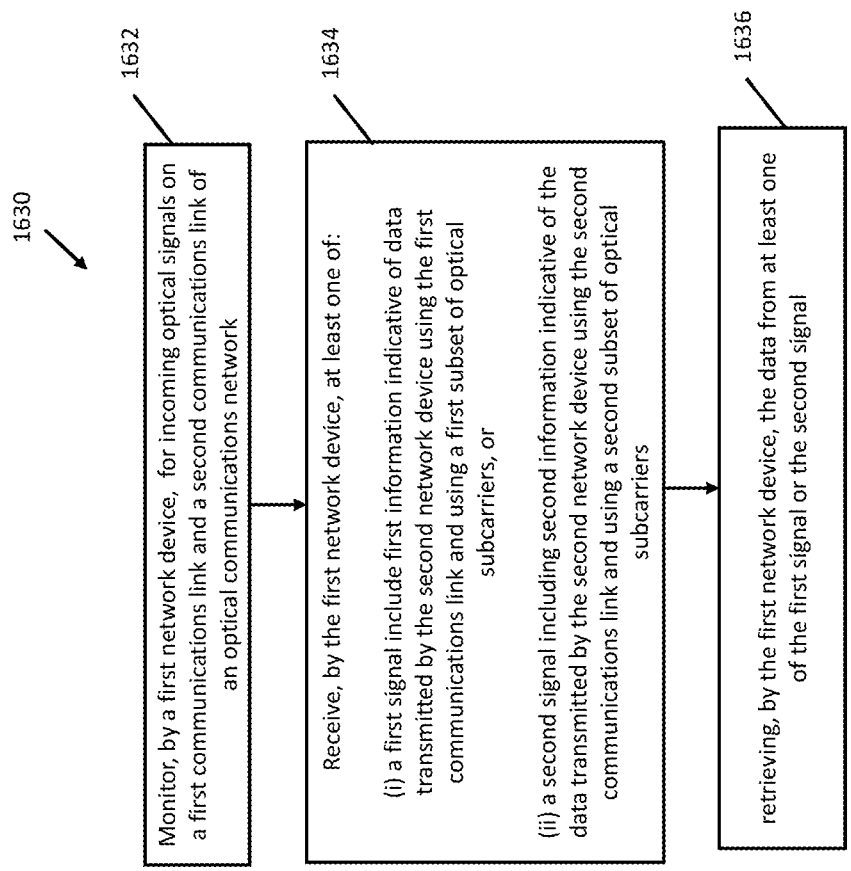

FIG. 16D shows another example process 1630 that can be performed using one or more of the systems described herein. For instance, the 1630 can be performed using an optical communications network 100 and/or one or more of the components thereof (e.g., as shown in FIGS. 1-15).

In some implementations, the first network device can include one or more hub network devices, and the second network device can include one or more leaf network devices, or vice versa. As an example, the first network device can include the node 104. As another example, the second network device can include one of the nodes 106a-106n.

According to the process 1630, a first network device monitors for incoming optical signals on a first communications link and a second communications link of an optical communications network (block 1632). Each of the first communications link and the second communications link communicatively interconnects the first network device and a second network device.

The first network device receives at least one of a first signal or a second signal (block 1634). The first signal includes first information indicative of data transmitted by the second network device using the first communications link and using a first subset of optical subcarriers. The second signal includes second information indicative of the data transmitted by the second network device using the second communications link and using a second subset of optical subcarriers. The first subset of optical subcarriers is different from the second subset of optical subcarriers.

The first network device retrieves the data from at least one of the first signal or the second signal (block 1636).

In some implementations, the process 1630 can also include transmitting the data to a third network device and/or transmitting the data to the third network device.

In some implementations, the first communications link and the second communications link can form at least a portion of a communications ring that communicatively interconnects the first network device and the second network device. As an example, referring to FIG. 1A, the first communications link can include at least a portion of the optical path 108a, and the second communications link can include at least a portion of the optical path 108b, or vice versa. In some implementations, the first communications link can be referred to as a "hub working Tx" path, and the second communications link can be referred to as a "hub protect Tx" path, or vice versa.

In some implementations, each of the optical subcarriers in the first subset of optical subcarriers and the second subset of optical subcarriers can be a respective Nyquist subcarrier.

Further, in some implementations, each of the optical subcarriers are associated with respective frequencies that do not overlap one another in a frequency domain.

In some implementations, the optical subcarriers of the first subset of optical subcarriers are associated with respective frequencies that are contiguous with one another in a frequency domain. As an example, referring to FIG. 3, the first subset of optical subcarriers can be SC1 and SC2.

In some implementations, the optical subcarriers of the second subset of optical subcarriers can be associated with respective frequencies that are contiguous with one another in a frequency domain. As an example, referring to FIG. 3, the second subset of optical subcarriers can be SC9 and SC10.

In some implementations, the first frequencies are not contiguous with the second frequencies in the frequency domain. As an example, referring to FIG. 3, the first subset of optical subcarriers can be SC1, and the second subset of optical subcarriers can be SC9.

In some implementations, one or more additional optical subcarriers can be associated with one or more additional frequencies, and the one or more additional frequencies can be disposed between the one or more first frequencies and the one or more second frequencies in the frequency domain. As an example, referring to FIG. 3, the first subset of optical subcarriers can be SC1-SC4, and the second subset of optical subcarriers can be SC13-SC16, with the additional optical subcarriers SC5-SC12 disposed between them in the frequency domain.

In some implementations, the first subset of optical subcarriers can be associated with one or more first frequencies, and the second subset of optical subcarriers can be associated with one or more second frequencies. Further, the one or more first frequencies and the one or more second frequencies can be separated from one another by one or more additional frequencies in the frequency domain. As an example, referring to FIG. 3, a guard band (e.g., a frequency band spanning a range of frequencies) can separate the one or more first frequencies and the one or more second frequencies from one another.

In some implementations, a number of optical subcarriers in the first subset of optical subcarriers can be the same as a number of optical subcarriers in the second subset of optical subcarriers. For example, referring to FIG. 3, the first subset of optical subcarriers can be SC1, and the second subset of optical subcarriers can be SC9.

In some implementations, data can be retrieved from at least one of the first signal or the second signal by performing one or more particular actions. The actions can include determining, by the first network device, that the first signal was not received from the second network device, and determining, by the first network device, that the second signal was received from the second network device. The actions can also include, responsive to these two determinations, retrieving, by the first network device, the data from the second signal.

In some implementations, monitoring for incoming optical signals on the first communications link and the second communications link can include tuning a receiver of the first network device to one or more first frequencies associated with the first subset of optical subcarriers, and in response to determining that the first signal was not received from the second network device, tuning the receiver of the first network device to one or more second frequencies associated with the second subset of optical subcarriers.

In some implementations, the data can be retrieved from at least one of the first signal or the second signal by performing one or more particular actions. The actions can include determining, by the first network device, that the first signal was received from the second network device, and determining, by the first network device, one or more first quality metrics associated with the first signal. The first quality metrics can include an indication of a latency associated with a transmission of the first signal using the first communications link and/or an indication of a pre-forward error correction quality factor (pre-FEC Q) associated with a transmission of the first signal using the first communications link.

The actions can also include determining, by the first network device, that the second signal was received from the second network device, and determining, by the first network device, one or more second quality metrics associated with the second signal. The second quality metrics can include an indication of a latency associated with a transmission of the second signal using the second communications link and/or an indication of a forward error correction quality factor (pre-FEC Q) associated with a transmission of the second signal using the second communications link.

The action can also include retrieving, based on the one or more first quality metrics and the one or more second quality metrics, the data from one of the first signal or the second signal.

III. Example Computer Systems

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, some or all of the components described herein can be implemented using digital electronic circuitry, or in computer software, firmware, or hardware, or in combinations of one or more of them. In another example, the process ### can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows also can be performed by, and apparatus also can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 17:
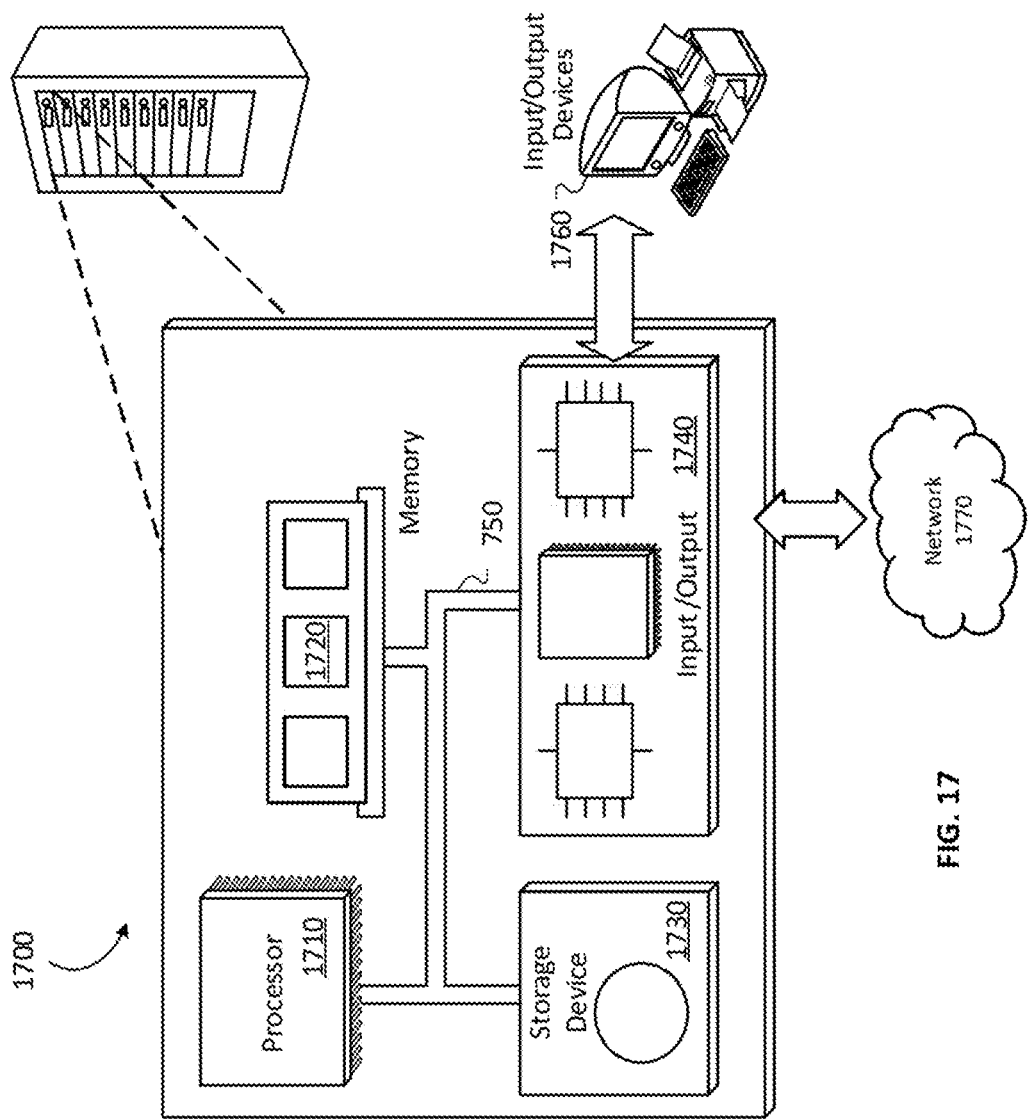
FIG. 17 is a diagram of an example computer system.

FIG. 17 shows an example computer system 1700 that includes a processor 1710, a memory 1720, a storage device 1730 and an input/output device 1740. Each of the components 1710, 1720, 1730 and 1740 can be interconnected, for example, by a system bus 1750. The processor 1710 is capable of processing instructions for execution within the system 1700. In some implementations, the processor 1710 is a single-threaded processor, a multi-threaded processor, or another type of processor. The processor 1710 is capable of processing instructions stored in the memory 1720 or on the storage device 1730. The memory 1720 and the storage device 1730 can store information within the system 1700.

The input/output device 1740 provides input/output operations for the system 1700. In some implementations, the input/output device 1740 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. for communicating with a network 1770 (e.g., via one or more network devices, such as switches, routers, and/or other network devices). In some implementations, the input/output device can include driver devices configured to receive input data and send output data to other input/output devices, e.g., keyboard, printer and display devices 1760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations also can be combined in the same implementation. Conversely, various features that are described in the context of a single implementation also can be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the claims.

What is claimed is:

1. An apparatus, comprising:
a digital signal processor that is operable to receive a plurality of bits of first information and provide a plurality of digital signals based on the plurality of bits of information;
digital-to-analog conversion circuitry operable to receive the digital signals from the digital signal processor and provide a plurality of analog signals based on the digital signals;
driver circuitry operable to output drive signals based on the analog signals;
a laser operable to provide an optical signal;
an optical modulator operable to modulate at least a portion of the optical signal based on the drive signals to provide a modulated optical signal, the modulated optical signal including a first optical subcarrier, the first optical subcarrier carrying data indicative of the plurality of bits of information;
an optical splitter operable to receive the modulated optical signal, the optical splitter having first and second outputs, the first output supplying a first portion of modulated optical signal to a first optical communication path including a first optical fiber and the second output supplying a second portion of the modulated optical signal to a second optical communication path including a second optical fiber;
an optical combiner operable to receive a second optical subcarrier from the first optical communication path and a third optical subcarrier from the second optical communication path, the second optical subcarrier carrying first forward error correction encoded information and the third optical subcarrier carrying second forward error correction encoded information; and
a receiver coupled to an output of the optical combiner, the receiver being operable to supply data associated with one of the second and third optical subcarrier.

2. An apparatus in accordance with claim 1, wherein the first portion of the modulated optical signal is a first power-split portion of the modulated optical signal and the second portion of the modulated optical signal is a second power-split portion of the modulated optical signal.

3. An apparatus in accordance with claim 1, the apparatus further includes:
a wavelength selective switch that receives the first portion of the modulated optical signal and supplies the first portion of the modulated optical signal to an optical communication path including an optical fiber.

4. An apparatus in accordance with claim 1, the apparatus further includes:
a first wavelength selective switch that receives the first portion of the modulated optical signal and provides the first portion of the modulated optical signal to a first optical communication path including a first optical fiber; and
a second wavelength selective switch that receives the second portion of the modulated optical signal and provides the second portion of the modulated optical signal to a second optical communication path including a second optical fiber.

5. An apparatus in accordance with claim 1, wherein the optical subcarrier is a Nyquist subcarrier.

6. An apparatus in accordance with claim 1, further including a wavelength selective switch that receives the first portion of the modulated optical signal and the second portion of the modulated optical signal.

7. An apparatus in accordance with claim 6, wherein the wavelength selective switch supplies the first portion of the modulated optical signal to the first optical communication path, and the wavelength selective switch supplies the second portion of the modulated optical signal to the second optical communication path.

8. An apparatus in accordance with claim 1, wherein the optical splitter is a first optical splitter, the apparatus further including a second optical splitter operable to receive the optical signal from the laser and supply said at least a portion of the optical signal to the modulator.

9. An apparatus, comprising:
a first digital signal processor that is operable to receive a first plurality of bits of information and provide a first plurality of digital signals based on the first plurality of bits of information;
digital-to-analog conversion circuitry operable to receive the first plurality of digital signals from the first digital signal processor and provide a plurality of analog signals based on the digital signals;
driver circuitry operable to output drive signals based on the analog signals;

an optical modulator operable to modulate an optical signal based on the drive signals to provide a first modulated optical signal, the first modulated optical signal including a first optical subcarrier, the first optical subcarrier carrying data indicative of the first plurality of bits of information;

a splitter operable to receive the first modulated optical signal, the splitter having first and second outputs, the first output being operable to provide a first portion of the first modulated optical signal and the second output being operable to provide a second portion of the first modulated optical signal;

a polarization beam splitter that is operable to receive a second modulated optical signal and a third modulated optical signal, the second modulated optical signal including a group of second optical subcarriers and a group of third optical subcarriers, the group of second optical subcarriers including a second optical subcarrier and the group of third optical subcarriers including a third optical subcarrier, the second optical subcarrier carrying second data including first forward error correction encoded information and the third optical subcarrier carrying third data including second forward error correction encoded information, the second data being indicative of a second plurality of bits of information and the third data being indicative of the second plurality of bits of information;

optical hybrid circuitry operable to receive outputs from the polarization beam splitter and supply a plurality of optical mixing products;

photodetector circuitry operable to supply electrical signals based on the plurality of optical mixing products;

analog-to-digital conversion circuitry operable to provide a second plurality of digital signals based on the electrical signals; and a second digital signal processor operable to output the second plurality of bits based on the second plurality of digital signals.

10. An apparatus in accordance with claim 9, wherein each subcarrier of the group of second optical subcarriers has a corresponding one of a first plurality of frequencies and each subcarrier of the group of third optical subcarriers has a corresponding one of a second plurality of frequencies, the first optical subcarrier having one of the first plurality of frequencies, and the second optical subcarrier having said one of the second plurality of frequencies.

11. An apparatus in accordance with claim 9, wherein each of the first optical subcarrier, the group of second optical subcarriers, and the group of third optical subcarriers is a Nyquist subcarrier.

12. An apparatus in accordance with claim 9, wherein a guard band spectrally separates first frequencies associated with the first optical subcarrier from second frequencies associated with the second group of optical subcarriers.

13. An apparatus in accordance with claim 9, further including an optical combiner having a first input that receives the group of second optical subcarriers and the group of third optical subcarriers.

14. An apparatus in accordance with claim 13, further including:
a first wavelength selective switch being operable to receive the first portion of the first modulated optical signal and supply the first portion of the first modulated optical signal to a first optical communication path including a first optical fiber; and
a second wavelength selective switch that receives the second portion of the first modulated optical signal and supplies the second portion of the first modulated optical signal to a second optical communication path including a second optical fiber.

15. An apparatus in accordance with claim 9, further including:
an optical combiner having a first and second inputs and an output;
a first wavelength selective switch operable to receive the first portion of the first modulated optical signal and the second modulated optical signal, wherein the first wavelength selective switch supplies the first portion of the modulated optical signal to a first optical communication path including a first optical fiber, and the first wavelength selective switch supplies the second modulated optical signal to the first input of the optical combiner; and
a second wavelength selective switch operable to receive the second portion of the first modulated optical signal and the third modulated optical signal, wherein the second wavelength selective switch supplies the second portion of the first modulated optical to a second optical communication path including a second optical fiber, and the second wavelength selective switch supplies the third modulated optical signal to the second input of the optical combiner, the output of the optical combiner providing the second and third modulated optical signals to the polarization beam splitter.

16. An apparatus in accordance with claim 9, further including an optical combiner having a first input that receives the second modulated optical signal, a second input that receives the third modulated optical signal, and an output that provides the second and third modulated optical signals to the polarization beam splitter.

* * * * *